(12) United States Patent
Kawai et al.

(10) Patent No.: US 9,456,129 B2
(45) Date of Patent: Sep. 27, 2016

(54) IMAGE PROCESSING DEVICE, IMAGING DEVICE, PROGRAM, AND IMAGE PROCESSING METHOD

(71) Applicant: FUJIFILM Corporation, Tokyo (JP)

(72) Inventors: Tomoyuki Kawai, Saitama (JP); Junji Hayashi, Saitama (JP); Katsutoshi Izawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/844,776

(22) Filed: Sep. 3, 2015

(65) Prior Publication Data

US 2015/0381883 A1   Dec. 31, 2015

Related U.S. Application Data

(63) Continuation of application No. PCT/JP2014/058407, filed on Mar. 26, 2014.

(30) Foreign Application Priority Data

Mar. 29, 2013 (JP) ................................ 2013-074278
Aug. 26, 2013 (JP) ................................ 2013-174876

(51) Int. Cl.
*H04N 5/232* (2006.01)
*G02B 7/34* (2006.01)
*H04N 5/369* (2011.01)

(52) U.S. Cl.
CPC ............ *H04N 5/23216* (2013.01); *G02B 7/34* (2013.01); *H04N 5/23212* (2013.01); *H04N 5/23222* (2013.01); *H04N 5/23293* (2013.01); *H04N 5/3696* (2013.01)

(58) Field of Classification Search
None
See application file for complete search history.

(56) References Cited

U.S. PATENT DOCUMENTS

| 4,599,653 | A | * | 7/1986 | Kimura | .............. | H04N 5/23212 348/333.02 |
| 7,099,575 | B2 | * | 8/2006 | Toji | .................... | H04N 5/23212 348/E5.045 |

(Continued)

FOREIGN PATENT DOCUMENTS

| JP | 2007-79929 A | 3/2007 |
| JP | 2009-237214 A | 10/2009 |

(Continued)

OTHER PUBLICATIONS

International Preliminary Report on Patentability (PCT/IPEA/409), issued in PCT/JP2014/058407, completed on Apr. 28, 2015.

(Continued)

*Primary Examiner* — Michael Osinski
(74) *Attorney, Agent, or Firm* — Birch, Stewart, Kolasch & Birch, LLP

(57) ABSTRACT

Provided are an image processing device, an imaging device, and an image processing method which can perform focusing control using an intuitive operation. First and second images based on image signals that are output from an imaging element including first and second pixel groups on which an object image that passes through first and second regions of an imaging lens and is pupil-divided is formed are combined and displayed on a display unit having a touch panel. It is detected whether an operation of selecting the first or the second image on the display image is performed. It is detected whether a moving operation in a direction intersecting a division direction is performed. When the selection operation and the moving operation are sequentially detected, control is performed such that a focus lens is moved in an optical axis direction of the focus lens in response to the moving operation.

34 Claims, 55 Drawing Sheets

(56) References Cited

U.S. PATENT DOCUMENTS

| | | | | |
|---|---|---|---|---|
| 8,085,337 | B2* | 12/2011 | Onuki | H04N 5/23212 |
| | | | | 348/222.1 |
| 8,279,318 | B2* | 10/2012 | Suzuki | G06T 11/00 |
| | | | | 348/333.01 |
| 8,717,478 | B2* | 5/2014 | Shiohara | H04N 5/23212 |
| | | | | 348/333.01 |
| 9,113,071 | B2* | 8/2015 | Shiohara | H04N 5/23212 |
| 9,167,153 | B2* | 10/2015 | Kawai | G02B 7/34 |
| 9,179,059 | B2* | 11/2015 | Kawai | G02B 7/34 |
| 9,344,620 | B2* | 5/2016 | Izawa | G02B 7/34 |
| 2004/0179128 | A1* | 9/2004 | Oikawa | H04N 5/23212 |
| | | | | 348/345 |
| 2007/0263997 | A1* | 11/2007 | Hirai | G03B 13/36 |
| | | | | 396/123 |
| 2009/0153693 | A1* | 6/2009 | Onuki | H04N 5/23212 |
| | | | | 348/222.1 |
| 2011/0141334 | A1* | 6/2011 | Kuriyama | G02B 7/36 |
| | | | | 348/333.11 |
| 2011/0248942 | A1* | 10/2011 | Yana | H04N 5/23212 |
| | | | | 345/173 |
| 2012/0173983 | A1 | 7/2012 | Song | |
| 2012/0212661 | A1 | 8/2012 | Yamaguchi et al. | |
| 2013/0028582 | A1* | 1/2013 | Batur | G03B 13/36 |
| | | | | 396/124 |
| 2013/0070145 | A1* | 3/2013 | Matsuyama | H04N 5/23216 |
| | | | | 348/333.12 |
| 2015/0103210 | A1* | 4/2015 | Inoue | G02B 7/346 |
| | | | | 348/239 |
| 2015/0172532 | A1* | 6/2015 | Izawa | H04N 5/23212 |
| | | | | 348/333.11 |
| 2015/0181194 | A1* | 6/2015 | Izawa | G02B 7/34 |
| | | | | 348/49 |
| 2015/0181196 | A1* | 6/2015 | Izawa | G03B 13/18 |
| | | | | 348/46 |
| 2015/0185585 | A1* | 7/2015 | Kawai | H04N 5/23212 |
| | | | | 348/333.11 |
| 2015/0201123 | A1* | 7/2015 | Koguchi | H04N 5/23212 |
| | | | | 348/239 |
| 2015/0281560 | A1* | 10/2015 | Inoue | H04N 5/23293 |
| | | | | 348/222.1 |
| 2015/0304529 | A1* | 10/2015 | Kawai | G02B 7/34 |
| | | | | 348/240.3 |
| 2015/0304546 | A1* | 10/2015 | Izawa | G02B 7/34 |
| | | | | 348/229.1 |
| 2016/0014329 | A1* | 1/2016 | Okigawa | H04N 5/23212 |
| | | | | 348/346 |
| 2016/0028940 | A1* | 1/2016 | Izawa | G03B 17/20 |
| | | | | 348/349 |

FOREIGN PATENT DOCUMENTS

| | | |
|---|---|---|
| JP | 2009-276426 A | 11/2009 |
| JP | 2011-151728 A | 8/2011 |
| JP | 2012-141978 A | 7/2012 |
| JP | 2012-173531 A | 9/2012 |

OTHER PUBLICATIONS

International Search Report issued in PCT/JP2014/058407, dated Jun. 24, 2014.
Written Opinion of the International Searching Authority issued in PCT/JP2014/058407, dated Jun. 24, 2014.

* cited by examiner

FIG. 4

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | G | R | G | G | B | G | G | R | G | G | B | G | G | R | G | G | B | G | G | R | G | G | B | G |
| 2 | B | G | B | R | G | R | B | G | B | R | G | R | B | G | B | R | G | R | B | G | B | R | G | R |
| 3 | G | R | G | G | B | G | G | R | G | G | B | G | G | R | G | G | B | G | G | R | G | G | B | G |
| 4 | G | B | G | G | R | G | G | B | G | G | R | G | G | B | G | G | R | G | G | B | G | G | R | G |
| 5 | R | G | R | B | G | B | R | G | R | B | G | B | R | G | R | B | G | B | R | G | R | B | G | B |
| 6 | G | B | G | G | R | G | G | B | G | G | R | G | G | B | G | G | R | G | G | B | G | G | R | G |
| 7 | G | R | G | G | B | G | G | R | G | G | B | G | G | R | G | G | B | G | G | R | G | G | B | G |
| 8 | B | G | B | R | G | R | B | G | B | R | G | R | B | G | B | R | G | R | B | G | B | R | G | R |
| 9 | G | R | G | G | B | G | G | R | G | G | B | G | G | R | G | G | B | G | G | R | G | G | B | G |
| 10 | G | B | G | G | R | G | G | B | G | G | R | G | G | B | G | G | R | G | G | B | G | G | R | G |
| 11 | R | G | R | B | G | B | R | G | R | B | G | B | R | G | R | B | G | B | R | G | R | B | G | B |
| 12 | G | B | G | G | R | G | G | B | G | G | R | G | G | B | G | G | R | G | G | B | G | G | R | G |
| 13 | G | R | G | G | B | G | G | R | G | G | B | G | G | R | G | G | B | G | G | R | G | G | B | G |
| 14 | B | G | B | R | G | R | B | G | B | R | G | R | B | G | B | R | G | R | B | G | B | R | G | R |
| 15 | G | R | G | G | B | G | G | R | G | G | B | G | G | R | G | G | B | G | G | R | G | G | B | G |
| 16 | G | B | G | G | R | G | G | B | G | G | R | G | G | B | G | G | R | G | G | B | G | G | R | G |
| 17 | R | G | R | B | G | B | R | G | R | B | G | B | R | G | R | B | G | B | R | G | R | B | G | B |
| 18 | G | B | G | G | R | G | G | B | G | G | R | G | G | B | G | G | R | G | G | B | G | G | R | G |
| 19 | G | R | G | G | B | G | G | R | G | G | B | G | G | R | G | G | B | G | G | R | G | G | B | G |
| 20 | B | G | B | R | G | R | B | G | B | R | G | R | B | G | B | R | G | R | B | G | B | R | G | R |
| 21 | G | R | G | G | B | G | G | R | G | G | B | G | G | R | G | G | B | G | G | R | G | G | B | G |
| 22 | G | B | G | G | R | G | G | B | G | G | R | G | G | B | G | G | R | G | G | B | G | G | R | G |
| 23 | R | G | R | B | G | B | R | G | R | B | G | B | R | G | R | B | G | B | R | G | R | B | G | B |
| 24 | G | B | G | G | R | G | G | B | G | G | R | G | G | B | G | G | R | G | G | B | G | G | R | G |

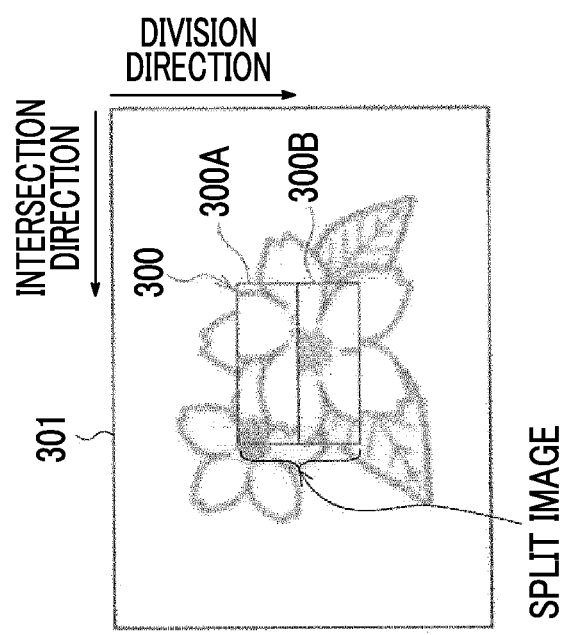

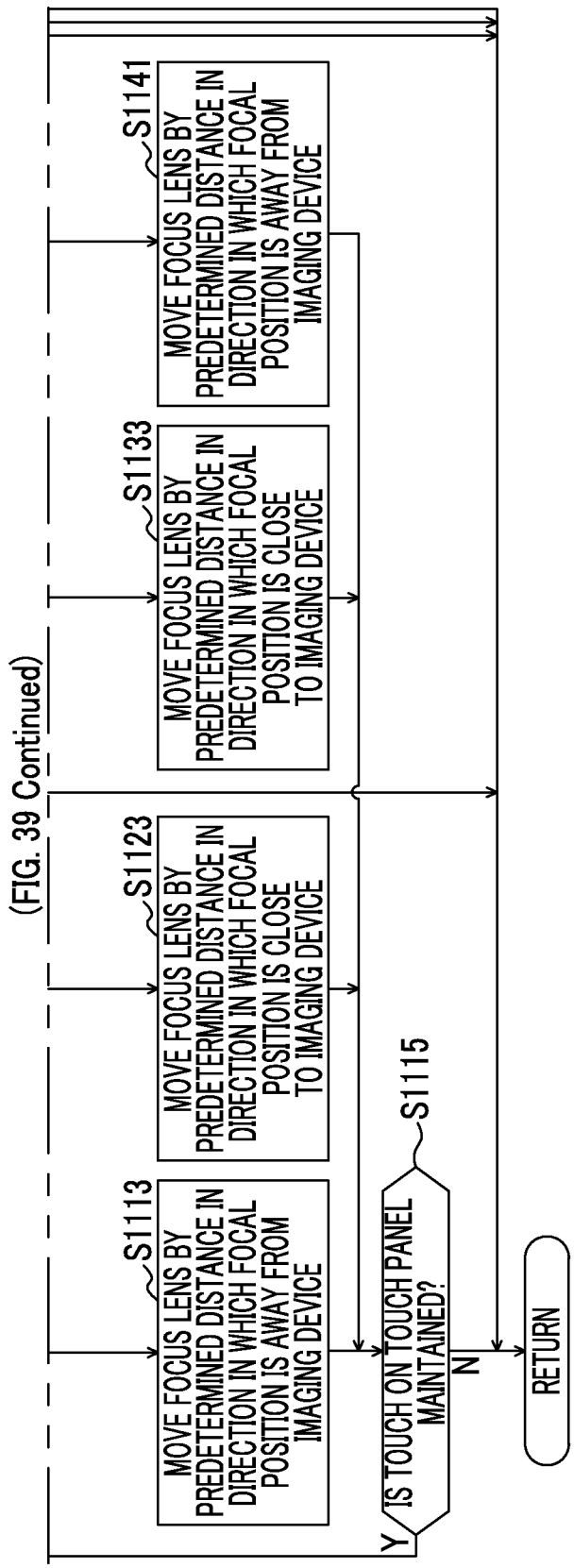

IMAGE PROCESSING DEVICE, IMAGING DEVICE, PROGRAM, AND IMAGE PROCESSING METHOD

CROSS-REFERENCE TO RELATED APPLICATIONS

This application is a Continuation of PCT International Application No. PCT/JP2014/058407 filed on Mar. 26, 2014, which claims priority under 35 U.S.C. §119(a) to Japanese Patent Application No. 2013-074278 filed on Mar. 29, 2013 and Japanese Patent Application No. 2013-174876 filed on Aug. 26, 2013. Each of the above application(s) is hereby expressly incorporated by reference, in its entirety, into the present application.

BACKGROUND OF THE INVENTION

1. Field of the Invention

The present invention relates to an image processing device, an imaging device, a program, and an image processing method, and more particularly, to an image processing device, an imaging device, a program, and an image processing method which generate an image for checking the focus state of an object image and display the image.

2. Description of the Related Art

In recent years, a technique has been used which displays a split image in a live view image (so-called through image) in order to facilitate an operation of manually adjusting a focus (so-called manual focus adjustment) in an imaging device, such as a digital camera or a mobile phone with a camera. The split image is an image obtained by combining a portion of a left eye image and a portion of a right eye image corresponding to a predetermined region of an object image. In the split image, the deviation between the left eye image and the right eye image occurs in a direction in which parallax occurs according to a focus state. The use of this technique makes it possible for the user to visually recognize the deviation between the left eye image and the right eye image in the split image and to check the focus state.

As a technique related to the above, JP2009-237214A discloses an imaging device which can display a split image and a portion of a live view image so as to be switched when a manual focus is performed. The imaging device converts an optical image formed by a light flux which is incident on an imaging optical system from an object into an electric signal and generates the image data of a live view image on the basis of the electric signal. In addition, the imaging device generates a split image corresponding to the phase difference between two optical images on the basis of signals obtained by performing photoelectric conversion for the two optical images formed by two separated light fluxes from the light flux. Then, the imaging device generates a partial image corresponding to a portion of the image data and displays the split image and the partial image on display means so as to be switched in the manual focus mode.

In addition, an imaging device has been proposed which includes a touch panel and can perform a portion of a focus adjustment process using a simple operation through the touch panel in the manual focus mode.

As a technique related to the imaging device, JP2011-151728A discloses an imaging device which can perform focusing control in a focus detection region designated by a touch panel, using a simple operation. The imaging device includes focus adjustment means for extracting a focus signal indicating the focus state of an object image included in the focus detection region within an imaging range and for adjusting the position of a focus lens on the basis of the focus signal. In addition, the imaging device includes a touch panel that is provided on the surface of a display unit for displaying an image and receives the designated position of the focus detection region in the imaging range. In the manual focus mode, the focus adjustment means extracts the focus signal in the focus detection region designated by the touch panel while moving the focus lens in a predetermined range based on the position of the focus lens which is moved by the operation of the user. Then, the focus adjustment means adjusts the position of the focus lens on the basis of the focus signal.

As a technique for performing a scroll operation on the touch panel, JP2012-141978A discloses a technique which performs a scroll operation in correspondence with an operation of drawing a circle using a circular drag touch as a touch screen scroll method.

SUMMARY OF THE INVENTION

In the technique disclosed in JP2009-237214A, in the manual focus mode, the split image and the partial image can be displayed so as to be switched. Therefore, it is possible to perform focus adjustment with high accuracy. However, in the manual focus mode, the operation is more complicated than that when focusing control is automatically performed (so-called automatic focus mode). In particular, when the user is unaccustomed to an operation in the manual focus mode, it is difficult for the user to understand an operation method. Therefore, a technique which can perform the manual focus using an intuitive operation is needed.

In the technique disclosed in JP2011-151728A, in the manual focus mode, the touch panel is operated to designate the focus detection region. Therefore, it is possible to omit a portion of the manual focus adjustment process. However, when adjusting the focus using the split image, the user adjusts the focus while checking the deviation between the right eye image and the left eye image in the split image. Therefore, when the focus is adjusted using the split image, the user is likely to feel that the operation of designating the focus detection region and adjusting the position of the focus lens is unnatural.

The technique disclosed in JP2012-141978A has been developed in order to scroll the entire screen using only one touch operation. Even when the technique is simply applied to the techniques disclosed in JP2009-237214A and JP2011-151728A, the user is likely to feel that the operation of adjusting the position of the focus lens is unnatural.

The invention has been made in view of the above-mentioned problems and an object of the invention is to provide an image processing device, an imaging device, a program, and an image processing method which can perform focusing control using a split image, using an intuitive operation.

In order to achieve the object, according to invention, there is provided an image processing device including: a generation unit that generates, on the basis of a first image based on an image signal output from a first pixel group and a second image based on an image signal output from a second pixel group in an imaging element including the first and second pixel groups on which an object image that passes through first and second regions of an imaging lens including a focus lens and is pupil-divided is formed, a display image which is used to check a focus and includes a first divided image that is selected from a plurality of divided images obtained by dividing the first image in a predetermined division direction and a second divided image that is selected from divided images other than a divided image indicating a divided region corresponding to the first divided image among a plurality of divided images obtained by dividing the second image in the division direction; a display unit that includes a display region and a touch panel which is provided on a surface of the display region; a display control unit that performs control such that the display image generated by the generation unit is displayed on the display unit; a first detection unit that detects whether an operation of selecting the first divided image or the second divided image on the display image is performed through the touch panel, with the display image displayed on the display unit; a second detection unit that detects whether a moving operation in a direction intersecting the division direction on the display image is performed through the touch panel; and a focusing control unit that controls a moving unit which moves the focus lens in an optical axis direction such that the focus lens is moved in response to the moving operation when the selection operation and the moving operation are sequentially detected by the first detection unit and the second detection unit, and the focusing control unit performs a first determination process which determines whether the selection operation detected by the first detection unit is an operation of selecting the first divided image or an operation of selecting the second divided image and a second determination process which determines whether the moving operation detected by the second detection unit is a moving operation in a first direction or a moving operation in a second direction along the intersection direction, determines a moving direction of the focus lens on the basis of the result of the first determination process and the result of the second determination process, and controls the moving unit such that the focus lens is moved.

According to the invention, the generation unit that generates the display image (corresponding to a split image) which is used to check a focus and includes the first divided image which is a portion of the plurality of divided images obtained by dividing the first image in a predetermined division direction and the second divided image which is a portion of the divided images other than the divided image indicating the divided region corresponding to the first divided image among the plurality of divided images obtained by dividing the second image in the division direction, on the basis of the first and second images based on the image signals output from the imaging element including the first and second pixel groups on which the object image that passes through the first and second regions of the imaging lens including the focus lens and is pupil-divided is formed. According to the invention, the display control unit performs control such that the display image generated by the generation unit is displayed on the display unit including the display region and the touch panel which is provided on the surface of the display region.

In the invention, the first detection unit detects whether the operation of selecting the first divided image or the second divided image on the display image is performed through the touch panel, with the display image displayed on the display unit. Furthermore, in the invention, the second detection unit detects whether the moving operation in the direction intersecting the division direction on the display image is performed through the touch panel. In addition, in the invention, the moving unit moves the focus lens in the optical axis direction. Then, in the invention, the focusing control unit controls the moving unit such that the focus lens is moved in response to the moving operation when the selection operation and the moving operation are sequentially detected by the first detection unit and the second detection unit.

As such, in the image processing device according to the invention, when the first divided image or the second divided image in the display image (split image) is selected through the touch panel and the moving operation is performed, the focus lens is moved in response to the moving operation. Therefore, the user can adjust the focal position of the focus lens while obtaining the sense of directly operating the split image. As a result, it is possible to perform focusing control using the split image, using an intuitive operation.

In the image processing device according to the invention, the generation unit may further generate a second display image which is used to check an imaging range on the basis of the image signal output from the imaging element. The display control unit may perform control such that the second display image generated by the generation unit is further displayed on the display unit. In the image processing device according to the invention, the imaging element may further include a third pixel group on which the object image that has passed through the imaging lens is formed without being pupil-divided and which outputs a third image. The generation unit may generate the second display image on the basis of the third image output from the third pixel group. According to this structure, it is possible to perform focusing control using the split image while checking the imaging range.

In the image processing device according to the invention, the focusing control unit perform a first determination process which determines whether the selection operation detected by the first detection unit is an operation of selecting the first divided image or an operation of selecting the second divided image and a second determination process which determines whether the moving operation detected by the second detection unit is a moving operation in a first direction or a moving operation in a second direction along the intersection direction, determine a moving direction of the focus lens on the basis of the result of the first determination process and the result of the second determination process, and perform control such that the focus lens is moved. According to this structure, it is possible to perform focusing control using a simple operation for a split image.

In the image processing device according to the invention, the first image may be a right eye image and the second image may be a left eye image. The focusing control unit may control the moving unit such that the focus lens is moved in a direction in which an in-focus position becomes closer to the imaging element than a current in-focus position when the result of the first determination process is the operation of selecting the right eye image and the result of the second determination process is the moving operation in a right direction as viewed from an operator who observes the display unit and such that the focus lens is moved in a direction in which the in-focus position becomes further away from the imaging element than the current in-focus position when the result of the first determination process is the operation of selecting the right eye image and the result of the second determination process is the moving operation in a left direction as viewed from the operator who observes the display unit. According to this structure, focusing control using the split image can be performed by a simple operation of operating only the right eye image.

In the image processing device according to the invention, the first image may be a right eye image and the second image may be a left eye image. The focusing control unit may control the moving unit such that the focus lens is moved in a direction in which an in-focus position becomes further away from the imaging element than a current in-focus position when the result of the first determination process is the operation of selecting the left eye image and the result of the second determination process is the moving operation in a right direction as viewed from an operator who observes the display unit and such that the focus lens is moved in a direction in which the in-focus position becomes closer to the imaging element than the current in-focus position when the result of the first determination process is the operation of selecting the left eye image and the result of the second determination process is the moving operation in a left direction as viewed from the operator who observes the display unit. According to this structure, focusing control using the split image can be performed by a simple operation of operating only the left eye image.

The image processing device according to the invention may further include a third detection unit that detects whether a moving operation which passes through a boundary line between the first divided image and the second divided image is performed through the touch panel. The first divided image and the second divided image may be arranged in the display image so as to be adjacent to each other in the division direction. The focusing control unit may control the moving unit such that the focus lens is moved in response to the moving operation when the selection operation and the moving operations are sequentially detected by the first detection unit and the second and third detection units. According to this structure, it is possible to perform focusing control using a simple operation for a split image.

In the image processing device according to the invention, the focusing control unit may perform a third determination process which determines the position of at least one of the first divided image and the second divided image relative to the boundary line, a fourth determination process which determines whether the moving operation detected by the second detection unit is a moving operation in a first direction or a moving operation in a second direction along the intersection direction, and a fifth determination process which determines whether the moving operation detected by the third detection unit is a moving operation in a third direction or a moving operation in a fourth direction along the division direction. The focusing control unit may determine a moving direction of the focus lens on the basis of the result of the third determination process, the result of the fourth determination process, and the result of the fifth determination process, and control the moving unit such that the focus lens is moved. According to this structure, it is possible to perform focusing control using a simple operation for a split image.

In the image processing device according to the invention, the first image may be a right eye image and the second image may be a left eye image. When the result of the third determination process indicates that the position of the second divided image is above the boundary line as viewed from an operator who observes the display unit, the focusing control unit may control the moving unit such that the focus lens is moved in a direction in which an in-focus position becomes further away from the imaging element than a current in-focus position in any of the following cases: the moving operations are sequentially detected by the second detection unit and the third detection unit, the result of the fourth determination process is a moving operation in a right direction as viewed from the operator who observes the display unit, and the result of the fifth determination process is a moving operation in a downward direction as viewed from the operator who observes the display unit; the moving operations are sequentially detected by the second detection unit and the third detection unit, the result of the fourth determination process is a moving operation in a left direction as viewed from the operator who observes the display unit, and the result of the fifth determination process is a moving operation in an upward direction as viewed from the operator who observes the display unit; the moving operations are sequentially detected by the third detection unit and the second detection unit, the result of the fourth determination process is the moving operation in the left direction, and the result of the fifth determination process is the moving operation in the downward direction; and the moving operations are sequentially detected by the third detection unit and the second detection unit, the result of the fourth determination process is the moving operation in the right direction, and the result of the fifth determination process is the moving operation in the upward direction. According to this structure, it is possible to perform focusing control using a simple moving operation for a split image in the clockwise direction.

In the image processing device according to the invention, the first image may be a right eye image and the second image may be a left eye image. When the result of the third determination process indicates that the position of the second divided image is above the boundary line as viewed from an operator who observes the display unit, the focusing control unit may control the moving unit such that the focus lens is moved in a direction in which an in-focus position becomes closer to the imaging element than a current in-focus position in any of the following cases: the moving operations are sequentially detected by the second detection unit and the third detection unit, the result of the fourth determination process is a moving operation in a left direction as viewed from the operator who observes the display unit, and the result of the fifth determination process is a moving operation in a downward direction as viewed from the operator who observes the display unit; the moving operations are sequentially detected by the second detection unit and the third detection unit, the result of the fourth determination process is a moving operation in a right direction as viewed from the operator who observes the display unit, and the result of the fifth determination process is a moving operation in an upward direction as viewed from the operator who observes the display unit; the moving operations are sequentially detected by the third detection unit and the second detection unit, the result of the fourth determination process is the moving operation in the left direction, and the result of the fifth determination process is the moving operation in the upward direction; and the moving operations are sequentially detected by the third detection unit and the second detection unit, the result of the fourth determination process is the moving operation in the right direction, and the result of the fifth determination process is the moving operation in the downward direction. According to this structure, it is possible to perform focusing control using a simple moving operation for a split image in the counterclockwise direction.

In the image processing device according to the invention, the first image may be a right eye image and the second image may be a left eye image. When the result of the third determination process indicates that the position of the first divided image is above the boundary line as viewed from an operator who observes the display unit, the focusing control unit may control the moving unit such that the focus lens is moved in a direction in which an in-focus position becomes closer to the imaging element than a current in-focus position in any of the following cases: the moving operations are sequentially detected by the second detection unit and the third detection unit, the result of the fourth determination process is a moving operation in a right direction as viewed from the operator who observes the display unit, and the result of the fifth determination process is a moving operation in a downward direction as viewed from the operator who observes the display unit; the moving operations are sequentially detected by the second detection unit and the third detection unit, the result of the fourth determination process is a moving operation in a left direction as viewed from the operator who observes the display unit, and the result of the fifth determination process is a moving operation in an upward direction as viewed from the operator who observes the display unit; the moving operations are sequentially detected by the third detection unit and the second detection unit, the result of the fourth determination process is the moving operation in the left direction, and the result of the fifth determination process is the moving operation in the downward direction; and the moving operations are sequentially detected by the third detection unit and the second detection unit, the result of the fourth determination process is the moving operation in the right direction, and the result of the fifth determination process is the moving operation in the upward direction. According to this structure, it is possible to perform focusing control using a simple moving operation for a split image in the clockwise direction.

In the image processing device according to the invention, the first image may be a right eye image and the second image may be a left eye image. When the result of the third determination process indicates that the position of the first divided image is above the boundary line as viewed from an operator who observes the display unit, the focusing control unit may control the moving unit such that the focus lens is moved in a direction in which an in-focus position becomes further away from the imaging element than a current in-focus position in any of the following cases: the moving operations are sequentially detected by the second detection unit and the third detection unit, the result of the fourth determination process is a moving operation in a left direction as viewed from the operator who observes the display unit, and the result of the fifth determination process is a moving operation in a downward direction as viewed from the operator who observes the display unit; the moving operations are sequentially detected by the second detection unit and the third detection unit, the result of the fourth determination process is a moving operation in a right direction as viewed from the operator who observes the display unit, and the result of the fifth determination process is a moving operation in an upward direction as viewed from the operator who observes the display unit; the moving operations are sequentially detected by the third detection unit and the second detection unit, the result of the fourth determination process is the moving operation in the left direction, and the result of the fifth determination process is the moving operation in the upward direction; and the moving operations are sequentially detected by the third detection unit and the second detection unit, the result of the fourth determination process is the moving operation in the right direction, and the result of the fifth determination process is the moving operation in the downward direction. According to this structure, it is possible to perform focusing control using a simple moving operation for a split image in the counterclockwise direction.

In the image processing device according to the invention, when the selection operation detected by the first detection unit is an operation of selecting both the first divided image and the second divided image and the moving operation detected by the second detection unit is an operation of moving the first divided image and the second divided image in different directions along the intersection direction, the focusing control unit may determine the moving direction of the focus lens on the basis of the directions of the operation of moving the first divided image and the operation of moving the second divided image and control the moving unit such that the focus lens is moved. According to this structure, it is possible to perform focusing control using a split image, using an intuitive operation, while preventing an operation error.

In the image processing device according to the invention, the first image may be a right eye image and the second image may be a left eye image. The focusing control unit may control the moving unit such that the focus lens is moved in a direction in which an in-focus position becomes closer to the imaging element than a current in-focus position when the selection operation detected by the first detection unit is the operation of selecting both the first divided image and the second divided image, the right eye image moving operation detected by the second detection unit is a moving operation in a right direction, as viewed from an operator who observes the display unit, along the intersection direction, and the left eye image moving operation detected by the second detection unit is a moving operation in a left direction, as viewed from the operator who observes the display unit, along the intersection direction, and such that the focus lens is moved in a direction in which the in-focus position becomes further away from the imaging element than the current in-focus position when the selection operation detected by the first detection unit is the operation of selecting both the first divided image and the second divided image, the right eye image moving operation detected by the second detection unit is the moving operation in the left direction, and the left eye image moving operation detected by the second detection unit is the moving operation in the right direction. According to this structure, since both the right eye image and the left eye image are designated, it is possible to prevent an operation error and focusing control using a split image can be performed by an intuitive operation.

In the image processing device according to the invention, while a touch operation on the touch panel in the moving operation detected by the second detection unit is maintained, the focusing control unit may control the moving unit such that the focus lens is moved in the optical axis direction, with the movement of a touch position in the touch operation. According to this structure, it is possible to finely adjust the focal position of the imaging lens using an intuitive operation.

In the image processing device according to the invention, the focusing control unit may control the moving unit such that the focus lens is continuously moved in a moving direction corresponding to the moving operation in the optical axis direction. According to this structure, focusing control using a split image can be simply performed by an intuitive operation.

In the image processing device according to the invention, the focusing control unit may control the moving unit such that the focus lens is moved at a moving speed corresponding to an operation speed in the moving operation. According to this structure, it is possible to adjust the moving speed of the focus lens using an intuitive and simple operation.

In the image processing device according to the invention, the focusing control unit may control the moving unit such that the focus lens is moved by the amount of movement corresponding to the amount of operational movement in the moving operation. According to this structure, it is possible to adjust the moving speed of the focus lens using an intuitive and simple operation.

In the image processing device according to the invention, when the operation speed in the moving operation is less than a first predetermined threshold value, the focusing control unit may not control the moving unit such that the focus lens is moved. According to this structure, it is possible to prevent an operation error.

The image processing device according to the invention may further include a fourth detection unit that detects whether a touch operation is performed at any position in the display region through the touch panel after the selection operation for the touch panel is cancelled once while the focus lens is being moved by the moving unit. When the touch operation is detected by the fourth detection unit, the focusing control unit may control the moving unit such that the movement of the focus lens is stopped. According to this structure, it is possible to stop the movement of the focus lens using a simple operation.

In the image processing device according to the invention, after the movement of the focus lens starts, the focusing control unit may control the moving unit such that a moving speed of the focus lens is reduced according to the movement and the focus lens is stopped. According to this structure, it is possible to finely adjust the focal position of the focus lens using a simple operation.

In the image processing device according to the invention, the focusing control unit may control the moving unit such that the focus lens is moved in the optical axis direction according to a touch position in a touch operation while the touch operation on the touch panel in the moving operation detected by the second detection unit is maintained when a movement time in the moving operation detected by the second detection unit is equal to or greater than a second predetermined threshold value, and such that the focus lens is continuously moved in a moving direction corresponding to the touch position in the optical axis direction when the movement time is less than the second threshold value. According to this structure, it is possible to switch between the rough adjustment and fine adjustment of the focal position of the focus lens using an intuitive operation.

The image processing device according to the invention may further include a fifth detection unit that detects a focus state of the display image while the focus lens is being moved by the focusing control unit. The focusing control unit may control the moving unit such that the movement of the focus lens is stopped when the fifth detection unit detects that the display image is in focus. According to this structure, it is possible to move the focal position of the focus lens using a simple operation.

The image processing device according to the invention may further include a fifth detection unit that detects a focus state of the display image while the focus lens is being moved by the focusing control unit and an informing unit that, when the fifth detection unit detects that the display image is in focus, informs that the display image is in focus. In the image processing device according to the invention, the informing unit may vibrate a touched portion of the touch panel to inform that the display image has been in focus. According to this structure, it is possible to reliably and rapidly inform that an image has been in focus.

In the image processing device according to the invention, the fifth detection unit may detect the focus state of the display image on the basis of the contrast of the display image. According to this structure, it is possible to rapidly determine whether the captured image has been focused by the focus lens.

In the image processing device according to the invention, the fifth detection unit may detect the focus state of the display image on the basis of a phase difference between the first divided image and the second divided image in the display image. According to this structure, it is possible to accurately determine whether the captured image has been focused by the focus lens.

The image processing device according to the invention may further include a third detection unit that detects whether a moving operation which passes through a boundary line between the first divided image and the second divided image is performed through the touch panel. The first divided image and the second divided image may be arranged in the display image so as to be adjacent to each other in the division direction. When the third detection unit detects the moving operations which are not sequentially detected by the second detection unit, the display control unit may perform control such that the display image is enlarged or reduced according to the direction of the moving operation detected by the third detection unit. According to this structure, it is easy to see the object image. Therefore, it is easy to check the focus state.

The image processing device according to the invention may further include a third detection unit that detects whether a moving operation which passes through a boundary line between the first divided image and the second divided image is performed through the touch panel. The first divided image and the second divided image may be arranged in the display image so as to be adjacent to each other in the division direction. when the third detection unit detect the moving operations which are not sequentially detected by the second detection unit, the display control unit may perform control such that the display image is enlarged when the third detection unit detects two touch positions in a touch operation on the touch panel and detects a moving operation in a direction in which the two touch positions separate from each other. The display control unit may perform control such that the display image is reduced when the third detection unit detects two touch positions in a touch operation on the touch panel and detects a moving operation in a direction in which the two touch positions become closer to each other. According to this structure, it is possible to prevent an operation error, as compared to a case in which one position is touched.

In the image processing device according to the invention, the display control unit may stop the control for enlarging the display image when the size of the display image is equal to the size of the entire display region due to the control for enlarging the display image. In the image processing device according to the invention, the display control unit may perform control such that a portion of the display image is displayed in the display region when the size of the display image is larger than the size of the entire display region due to the control for enlarging the display image. According to this structure, it is possible to easily check the focus state of a split image.

In the image processing device according to the invention, in a case in which the display image is reduced after the enlargement of the display image, when the size of the display image is equal to the size before the enlargement, the display control unit may stop the control for reducing the display image. According to this structure, it is possible to prevent difficulty in seeing a split image.

In order to achieve the object, according to the invention, there is provided an imaging device including the image processing device according to the invention, an imaging lens, an imaging element including first and second pixel groups, and a storage unit that stores an image which is generated on the basis of an image signal output from the imaging element.

Therefore, since the imaging device according to the invention has the same operation as the image processing device according to the invention, focusing control using a split image can be performed by an intuitive operation, similarly to the image processing device according to the invention.

In order to achieve the object, according to the invention, there is provided a non-transitory computer readable medium storing a program that causes the image processing device to function as: the generation unit that generates, on the basis of the first image based on the image signal output from the first pixel group and the second image based on the image signal output from the second pixel group in the imaging element including the first and second pixel groups on which the object image that passes through first and second regions of the imaging lens including the focus lens and is pupil-divided is formed, the display image which is used to check the focus and includes the first divided image that is selected from the plurality of divided images obtained by dividing the first image in the predetermined division direction and the second divided image that is selected from divided images other than the divided image indicating the divided region corresponding to the first divided image among the plurality of divided images obtained by dividing the second image in the division direction; the display control unit that performs control such that the display image generated by the generation unit is displayed on the display unit including the display region and the touch panel which is provided on the surface of the display region; the first detection unit that detects whether the operation of selecting the first divided image or the second divided image on the display image is performed through the touch panel, with the display image displayed on the display unit; the second detection unit that detects whether the moving operation in the direction intersecting the division direction on the display image is performed through the touch panel; and the focusing control unit that controls the moving unit which moves the focus lens in the optical axis direction such that the focus lens is moved in response to the moving operation when the selection operation and the moving operation are sequentially detected by the first detection unit and the second detection unit, and the focusing control unit performs the first determination process which determines whether the selection operation detected by the first detection unit is the operation of selecting the first divided image or the operation of selecting the second divided image and the second determination process which determines whether the moving operation detected by the second detection unit is the moving operation in the first direction or the moving operation in the second direction along the intersection direction, determines the moving direction of the focus lens on the basis of the result of the first determination process and the result of the second determination process, and controls the moving unit such that the focus lens is moved.

Therefore, since the non-transitory computer readable medium storing the program according to the invention causes the image processing device to function as the image processing device according to the invention, focusing control using a split image can be performed by an intuitive operation, similarly to the image processing device according to the invention.

In order to achieve the object, according to the invention, there is provided an image processing method using the image processing device including: a generation step of generating, on the basis of the first image based on the image signal output from the first pixel group and the second image based on the image signal output from the second pixel group in the imaging element including the first and second pixel groups on which the object image that passes through first and second regions of the imaging lens including the focus lens and is pupil-divided is formed, the display image which is used to check the focus and includes the first divided image that is selected from the plurality of divided images obtained by dividing the first image in the predetermined division direction and the second divided image that is selected from divided images other than the divided image indicating the divided region corresponding to the first divided image among the plurality of divided images obtained by dividing the second image in the division direction; a display control step of performing control such that the display image generated in the generation step is displayed on the display unit including the display region and the touch panel which is provided on the surface of the display region; a first detection step of detecting whether the operation of selecting the first divided image or the second divided image on the display image is performed through the touch panel, with the display image displayed on the display unit; a second detection step of detecting whether the moving operation in the direction intersecting the division direction on the display image is performed through the touch panel; and a focusing control step of controlling the moving unit which moves the focus lens in the optical axis direction such that the focus lens is moved in response to the moving operation when the selection operation and the moving operation are sequentially detected in the first detection step and the second detection step, and the focusing control step performs the first determination process which determines whether the selection operation detected by the first detection step is the operation of selecting the first divided image or the operation of selecting the second divided image and the second determination process which determines whether the moving operation detected by the second detection step is the moving operation in the first direction or the moving operation in the second direction along the intersection direction, determines the moving direction of the focus lens on the basis of the result of the first determination process and the result of the second determination process, and controls the moving unit such that the focus lens is moved.

Therefore, since the image processing method according to the invention has the same operation as the image processing device according to the invention, focusing control using a split image can be performed by an intuitive operation, similarly to the image processing device according to the invention.

According to the invention, focusing control using a split image can be performed by an intuitive operation.

BRIEF DESCRIPTION OF THE DRAWINGS

FIG. 4 is a diagram schematically illustrating an example of the arrangement of color filters and light shielding members in an imaging element of the imaging device according to the first embodiment.

FIG. 10A is a front view illustrating an example of the display aspect of a normal image and a split image according to the first embodiment.

DESCRIPTION OF THE PREFERRED EMBODIMENTS

Hereinafter, examples of embodiments of an imaging device according to the invention will be described with reference to the accompanying drawings.

First Embodiment

Figure 1:
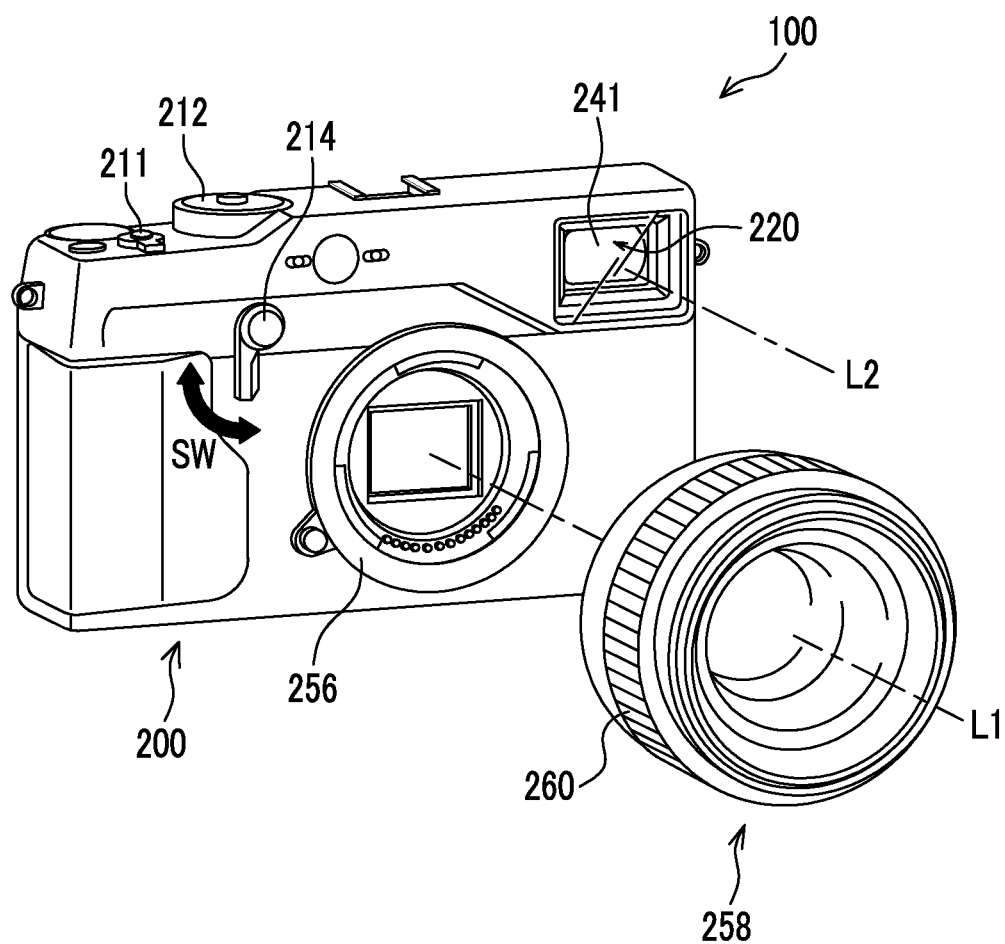
FIG. 1 is a perspective view illustrating an example of the outward appearance of an imaging device which is an interchangeable lens camera according to a first embodiment.

An imaging device 100 according to this embodiment is an interchangeable lens camera. As illustrated in FIG. 1, the imaging device 100 is a digital camera that includes a camera body 200 and an interchangeable lens 258, which is a zoom lens interchangeably mounted on the camera body 200, and does not include a reflex mirror. The interchangeable lens 258 includes an imaging lens 16 having a focus lens 302 that can be moved in an optical axis direction, a focus ring 260, a slide mechanism 303, and a motor 304 (see FIG. 3 which will be described in detail below). In addition, a hybrid finder (registered trademark) 220 is provided in the camera body 200. The hybrid finder 220 means, for example, a finder in which an optical viewfinder (hereinafter, referred to as an "OVF") and an electronic viewfinder (hereinafter, referred to as an "EVF") are selectively used.

A mount 256 provided in the camera body 200 and a mount 346 (see FIG. 3) which is provided in the interchangeable lens 258 and corresponds to the mount 256 are coupled to each other such that the interchangeable lens 258 is interchangeably mounted on the camera body 200. In addition, the focus ring 260 which is used in a manual focus mode is provided in a lens barrel of the interchangeable lens 258. In the imaging device 100, the focus lens 302 is moved in the optical axis direction with the rotation of the focus ring 260 to focus object light on an imaging element 20 (see FIG. 3), which will be described below, at an in-focus position corresponding to the distance to the object.

A finder window 241 of the OVF included in the hybrid finder 220 is provided on the front surface of the camera body 200. In addition, a finder switching lever 214 is provided on the front surface of the camera body 200. When the finder switching lever 214 is rotated in the direction of an arrow SW, an image is switched between an optical image which can be viewed through the OVF and an electronic image (live view image) which can be viewed through the EVF (which will be described below). Further, an optical axis L2 of the OVF is different from an optical axis L1 of the interchangeable lens 258. Further, a release switch 211 and a dial 212 for setting, for example, an imaging mode or a reproduction mode are generally provided on an upper surface of the camera body 200.

The release switch 211 serving as an imaging preparation instruction unit and an imaging instruction unit is configured such that a two-stage pressing operation, that is, an imaging preparation instruction state and an imaging instruction state can be detected. The imaging preparation instruction state means a state in which the release switch 211 is pressed from a standby position to an intermediate position (halfway pressed position). The imaging instruction state means a state in which the release switch 211 is pressed to a finally pressed position (fully pressed position) through the intermediate position. Hereinafter, the "state in which the release switch 211 is pressed from the standby position to the halfway pressed position" is referred to as a "halfway pressed state" and the "state in which the release switch 211 is pressed from the standby position to the fully pressed position" is referred to as a "fully pressed state".

In the imaging device 100 according to the first embodiment, the imaging mode and the reproduction mode as the operation modes are selectively set in response to an instruction from the user. In the imaging mode, the manual focus mode and the automatic focus mode are selectively set in response to an instruction from the user. In the automatic focus mode, the state of the release switch 211 is changed to the halfway pressed state to perform an imaging control process, which will be described below, and the state of the release switch 211 is changed to the fully pressed state to perform exposure (imaging).

Figure 2:
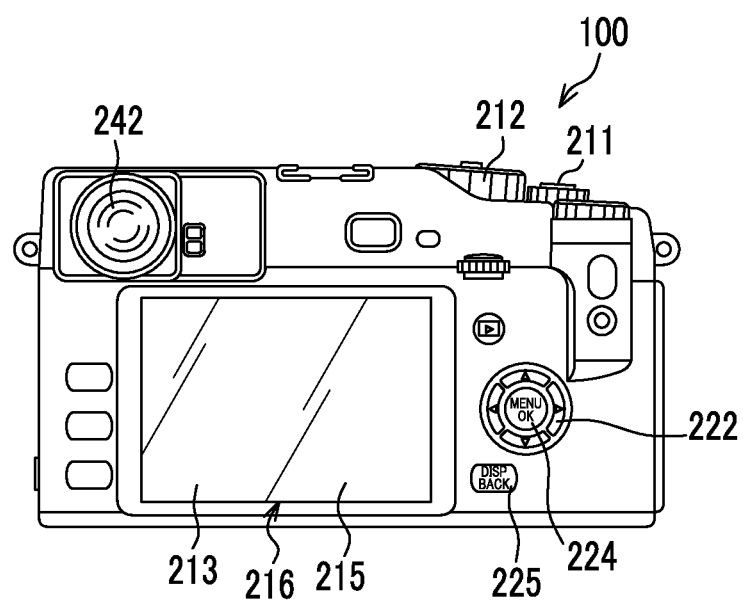
FIG. 2 is a rear view illustrating the rear surface side of the imaging device according to the first embodiment.

As illustrated in FIG. 2, a finder eyepiece 242 of the OVF, a display input unit 216, a cross key 222, a MENU/OK key 224, and a BACK/DISP button 225 are provided on the rear surface of the camera body 200.

In this embodiment, the display input unit 216 is a so-called touch panel display which displays, for example, images (still images and moving images) or text information to visually transmit information to the user and detects the operation of the user corresponding to the displayed information. That is, the display input unit 216 includes a display unit 213 and a touch panel 215. The display unit 213 is implemented by, for example, a liquid crystal display (LCD) or an organic electroluminescence (EL) display. The display unit 213 is used to display a continuous frame image (live view image) which is obtained by continuously capturing frames in the imaging mode. In addition, the display unit 213 is used to display a single-frame image (for example, a still image) which is obtained by capturing a single frame when an instruction to capture a still image is issued. For example, the display unit 213 is also used to display a reproduction image in the reproduction mode or to display a menu screen.

The touch panel 215 is a device that is provided on the display unit 213 such that an image displayed on a display surface of the display panel 213 is visually recognized and detects coordinates indicating the touch position of a finger of the user or a stylus. When the touch panel 215 is operated by a finger of the user or a stylus, the touch panel 215 outputs a detection signal indicating the touch position, which is generated by the operation, to a CPU 12.

The size of the display region of the display unit 213 may be exactly equal to the size of the touch panel 215. However, the sizes are not necessarily equal to each other. Examples of a position detecting method which is used in the touch panel 215 include a matrix switching method, a resistive layer method, a surface elastic wave method, an infrared method, an electromagnetic induction method, and a capacitive sensing method. Any method may be used.

The cross key 222 functions as a multi-function key which is used to select a menu item and to output various kinds of command signals, such as a zoom signal and a frame advance signal. The MENU/OK key 224 is an operation key having both the function of a menu button for issuing a command to display a menu on a screen of the display unit 213 and the function of an OK button for issuing a command to confirm and execute the selected content. For example, the BACK/DISP button 225 is used to delete a desired target, such as a selected item, to cancel the designated content, or to return to the previous operation state.

Figure 3:
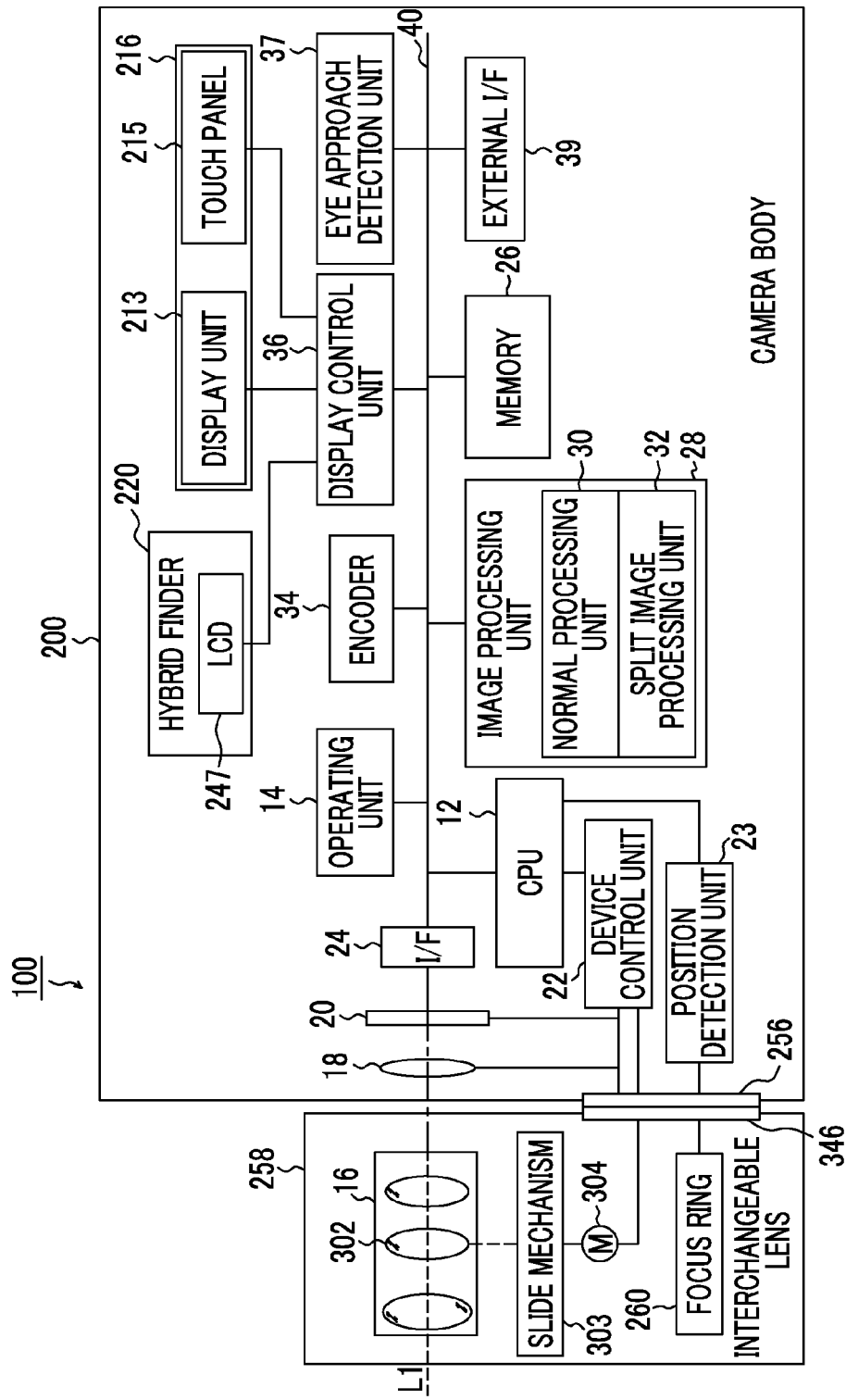
FIG. 3 is a block diagram illustrating an example of the hardware configuration of the imaging device according to the first embodiment.

FIG. 3 is a block diagram illustrating an example of the hardware configuration of the imaging device 100 according to this embodiment.

The interchangeable lens 258 includes a slide mechanism 303 and a motor 304 which are an example of a moving unit according to the invention. The slide mechanism 303 moves the focus lens 302 in the direction of the optical axis L1 when the focus ring 260 is operated. The focus lens 302 which can slide in the direction of the optical axis L1 is attached to the slide mechanism 303. In addition, the motor 304 is connected to the slide mechanism 303 and the slide mechanism 303 is driven by the motor 304 to slide the focus lens 302 in the direction of the optical axis L1.

The motor 304 is connected to the camera body 200 through the mounts 256 and 346 and the driving of the motor 304 is controlled in response to a command from the camera body 200. In this embodiment, a stepping motor is applied as an example of the motor 304. The motor 304 is operated in synchronization with pulse power in response to a command from the camera body 200.

The imaging device 100 is a digital camera that records captured still images and moving images. The overall operation of the camera is controlled by the central processing unit (CPU) 12 illustrated in FIG. 3. As illustrated in FIG. 3, the imaging device 100 includes an operating unit 14, an interface unit 24, a memory 26, and an encoder 34, in addition to the CPU 12. In addition, the imaging device 100 includes a display control unit 36 which is an example of a display control unit according to the invention, an eye approach detection unit 37, and an external interface (I/F) 39. The imaging device 100 further includes an image processing unit 28.

The CPU 12, the operating unit 14, the interface unit 24, the memory 26, the image processing unit 28, the encoder 34, the display control unit 36, the eye approach detection unit 37, and the external interface (I/F) 39 are connected to each other through a bus 40. The memory 26 includes a non-volatile storage area (for example, an EEPROM) which stores, for example, parameters and programs and a volatile storage area (for example, an SDRAM) which temporarily stores, for example, various kinds of information of images.

In the imaging device 100 according to the first embodiment, the CPU 12 controls the driving of a focus adjustment motor to perform focus control such that the contrast value of the captured image is a maximum. In addition, the CPU 12 calculates AE information which is a physical amount indicating the brightness of the captured image. When the release switch 211 is in the halfway pressed state, the CPU 12 calculates a shutter speed and an F number corresponding to the brightness of the image indicated by the AE information. Then, the CPU 12 controls each related unit such that the shutter speed and the F number become the calculated values to set an exposure state.

The operating unit 14 is an user interface which is operated by the operator to input various instructions to the imaging device 100. Various instructions received by the operating unit 14 are input as operation signals to the CPU 12. The CPU 12 performs processes corresponding to the operation signals input from the operating unit 14.

The operating unit 14 includes the release switch 211, the dial 212, the display unit 213, the finder switching lever 214, the cross key 222, the MENU/OK key 224, and the BACK/DISP button 225.

The camera body 200 includes a position detection unit 23. The position detection unit 23 is connected to the CPU 12. The position detection unit 23 is connected to the focus ring 260 through the mounts 256 and 346, detects the rotation angle of the focus ring 260, and outputs rotation angle information indicating the detected rotation angle to the CPU 12. The CPU 12 performs a process corresponding to the rotation angle information input from the position detection unit 23.

When the image mode is set by the dial 212, image light indicating the object is focused on a light receiving surface of a color imaging element (for example, a CMOS sensor) 20 through a shutter 18 and the imaging lens 16 including the focus lens 302 which can be moved by a manual operation. The signal charge stored in the imaging element 20 is sequentially read as a digital signal corresponding to the signal charge (voltage) by a read signal transmitted from the device control unit 22. The imaging element 20 has a so-called electronic shutter function and performs the electronic shutter function to control the charge storage time (shutter speed) of each photo sensor on the basis of the timing of the read signal. The imaging element 20 according to the first embodiment is a CMOS image sensor, but is not limited thereto. For example, the imaging element 20 may be a CCD image sensor.

For example, a color filter 21 illustrated in FIG. 4 is provided in the imaging element 20. For example, as illustrated in FIG. 4, the color filter 21 includes a first filter G corresponding to green (G) which most contributes to obtaining a brightness signal, a second filter R corresponding to red (R), and a third filter B corresponding to blue (B). In the example illustrated in FIG. 4, the G filter, the R filter, and the B filter are arranged for each of pixels of the imaging element 20 so as to have predetermined periodicity in a row direction (horizontal direction) and a column direction (vertical direction). Therefore, when performing a synchronization (interpolation) process for R, G, and B signals, the imaging device 100 can perform the process according to a repetitive pattern. The synchronization process is a process which calculates information of all colors for each pixel from a mosaic image corresponding to a color filter array of a single-plate color imaging element. For example, in the case of an imaging element including three color filters, that is, R, G, and B filters, the synchronization process means a process which calculates the color information of all of R, G, and B for each pixel from a mosaic image including R, G, and B.

In addition, the imaging device 100 according to this embodiment has a phase difference AF function. The imaging element 20 according to this embodiment includes a plurality of phase difference detecting pixels which are used when the phase difference AF function is performed. The plurality of phase difference detecting pixels are arranged in a predetermined pattern.

The phase difference detecting pixel is a first pixel L having a shielded left half in the horizontal direction or a second pixel R having a shielded right half in the horizontal direction. Hereinafter, when the first pixel L and the second pixel R do not need to be distinguished from each other, they are referred to as "phase difference pixels".

Figure 5:
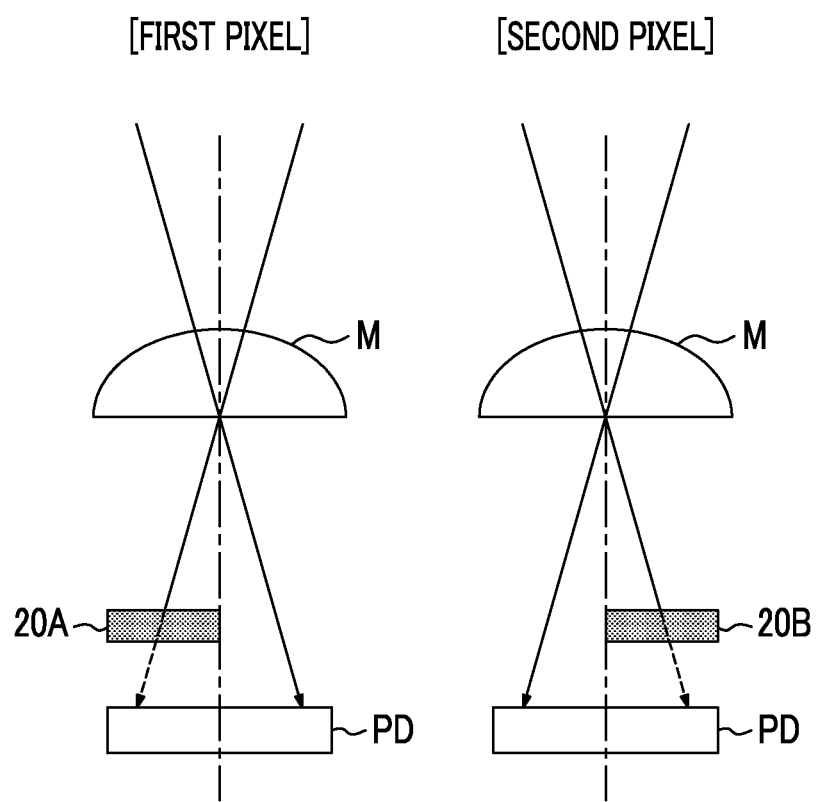
FIG. 5 is a diagram schematically illustrating an example of the structure of phase difference pixels (a first pixel and a second pixel) in the imaging element of the imaging device according to the first embodiment.

For example, as illustrated in FIG. 5, the first pixel L has a light shielding member 20A and the second pixel R has a light shielding member 20B. The light shielding member 20A is provided on the front surface side (on the side of a microlens M) of a photodiode PD and shields the left half of the light receiving surface of the photodiode PD. The light shielding member 20B is provided on the front surface side of the photodiode PD and shields the right half of the light receiving surface of the photodiode PD.

The microlens M and the light shielding members 20A and 20B function as a pupil division portion. The first pixel L receives only a light flux on the left side of the optical axis among the light fluxes which pass through the exit pupil of the imaging lens 16. The second pixel R receives only a light flux on the right side of the optical axis among the light fluxes which pass through the exit pupil of the imaging lens 16. As such, the light flux which passes through the exit pupil are divided into left and right light fluxes by the microlens M and the light shielding members 20A and 20B serving as the pupil division portion and the left and right light fluxes are incident on the first pixel L and the second pixel R, respectively.

Figure 6:
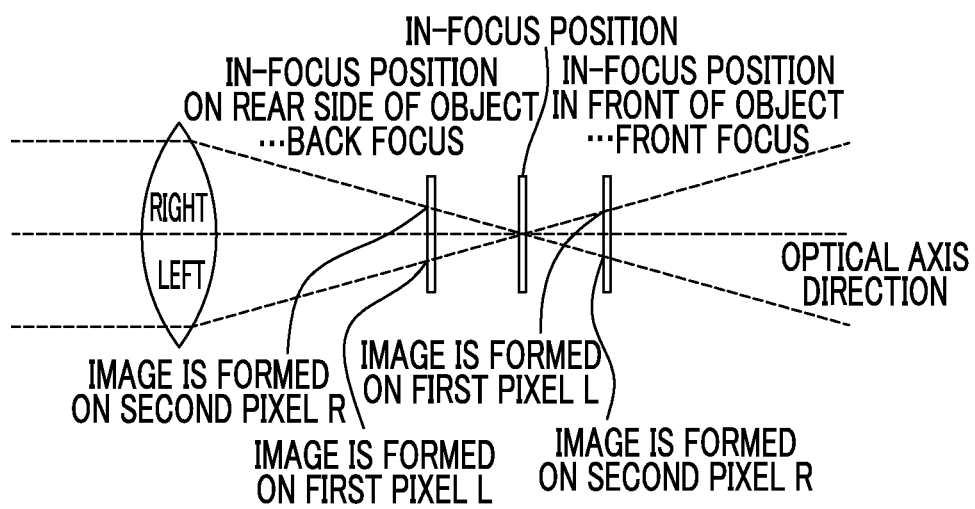
FIG. 6 is a side view schematically illustrating the relationship between the focal position of an imaging lens and an in-focus position.

As illustrated in FIG. 6, in an object image (left eye image) corresponding to the left light flux and an object image (right eye image) corresponding to the right light flux among the light beams which pass through the exit pupil of the imaging lens 16, portions which are in focus (in a focused state) are formed at the same position (in-focus position) on the imaging element 20. In contrast, a so-called front-focused region in which the focus is formed at a position that is closer to the imaging device 100 than the object or a so-called back-focused region in which the focus is formed at a position that is further away from the imaging device 100 than the object are incident on different positions on the imaging element 20 (a phase shift occurs).

Figure 7:
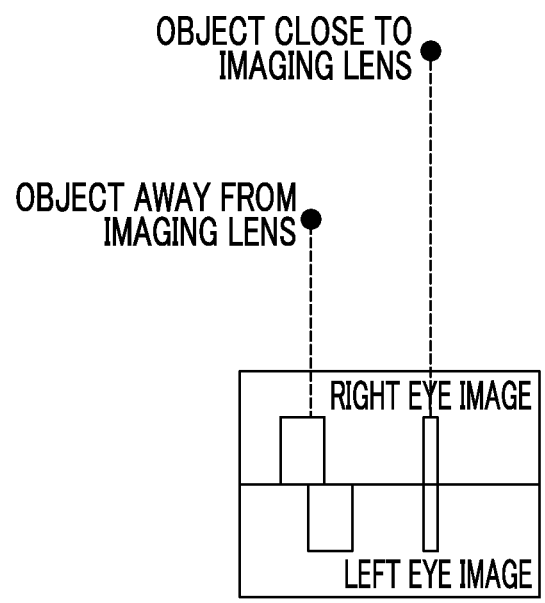
FIG. 7 is a front view schematically illustrating the relationship between the focal position of the imaging lens and a direction in which a right eye image and a left eye image deviate from each other in an intersection direction.
Figure 8:
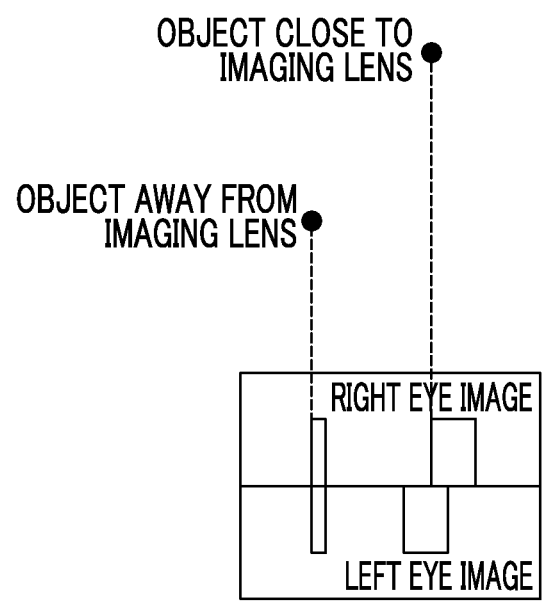
FIG. 8 is a front view schematically illustrating the relationship between the focal position of the imaging lens and the direction in which the right eye image and the left eye image deviate from each other in the intersection direction.

FIGS. 7 and 8 illustrate examples of a split image obtained when the imaging device 100 captures an image of two columns having different object distances (here, for example, two columns having the same shape, size, and color) as objects. Here, the split image means an image in which a right eye divided image and a left eye divided image are arranged so as to be adjacent to each other in a predetermined direction (for example, a direction perpendicular to a direction in which parallax occurs). The right eye divided image means a divided image which is selected from a plurality of divided images obtained by dividing the right eye image in a predetermined division direction (for example, the direction perpendicular to the direction in which parallax occurs). The left eye divided image means a divided image which is selected from a plurality of divided images obtained by dividing the left eye image in the division direction except for an image indicating the divided region corresponding to the right eye divided image. In the examples illustrated in FIGS. 7, 8, 13, 14, 23, 24, 25A, 25B, 36, 37, 38, 46, and 47, for convenience of explanation, a column image which indicates a column included in the right eye divided image is referred to as a right eye image and a column image which indicates a column included in the left eye divided image is referred to as a left eye image.

For example, as illustrated in FIG. 7, in the back-focused region (in which a column which has a longer object distance (is distant from the imaging lens 16) of two columns is focused), the right eye image (the right eye image which is the column image indicating a column having a shorter object distance of the two columns) is shifted to the left (the left in the front view of FIG. 7) as viewed from the operator who observes the display unit 213. In the back-focused region, the left eye image (the left eye image which is the column image indicating a column having a shorter object distance of the two columns) is shifted to the right (the right in the front view of FIG. 7) as viewed from the operator who observes the display unit 213. For example, as illustrated in FIG. 8, the front-focused region (in which a column which has a shorter object distance (is close to the imaging lens 16) of two columns is focused), the right eye image (the right eye image which is the column image indicating the column having a longer object distance of the two columns) is shifted to the right and the left eye image (the left eye image which is the column image indicating the column having a longer object distance of the two columns) is shifted to the left. As such, the imaging device 100 according to this embodiment can acquire a parallax image having parallaxes in the right eye image and the left eye image.

The imaging device 100 according to this embodiment detects the amount of phase shift on the basis of the value of the first pixel L and the value of the second pixel R. Then, the imaging device 100 presents the detected amount of phase shift to assist the user in adjusting the focal position of the focus lens 302. Hereinafter, when the light shielding members 20A and 20B do not need to be distinguished from each other, they are referred to as "light shielding members" without a reference numeral.

The imaging element 20 according to this embodiment is divided into a first pixel group, a second pixel group, and a third pixel group. The first pixel group indicates, for example, a plurality of first pixels L. The second pixel group indicates, for example, a plurality of second pixels R. The third pixel group indicates, for example, a plurality of normal pixels. The "normal pixels" indicate, for example, pixels (for example, pixels without the light shielding members 20A and 20B) other than the phase difference pixels. Hereinafter, a RAW image indicated by image signals output from the first pixel group is referred to as a "first image". A RAW image indicated by image signals output from the second pixel group is referred to as a "second image". A RAW image indicated by image signals output from the third pixel group is referred to as a "third image".

Each pixel included in the first pixel group and the second pixel group is arranged so as to be located in the range of one pixel in the horizontal direction in the first pixel group and the second pixel group. In addition, each pixel included in the first pixel group and the second pixel group is arranged so as to be located in the range of one pixel in the vertical direction in the first pixel group and the second pixel group. In the example illustrated in FIG. 4, the first pixels L and the second pixels R are alternately arranged in the horizontal direction and the vertical direction at intervals corresponding to a plurality of pixels therebetween (in this embodiment, two pixels). That is, the pixel L and the pixel R are included in the same column and the same row.

In the example illustrated in FIG. 4, each pixel included in the first and second pixel groups is arranged in the range of one pixel in each of the horizontal direction and the vertical direction. However, each pixel may be located in the range of a predetermined number of pixels (for example, two pixels or less) in at least one of the horizontal direction and the vertical direction. For example, as illustrated in FIG. 4, it is preferable that each pixel included in the first and second pixel groups is located in the range of one pixel in each of the horizontal direction and the vertical direction, in order to minimize the occurrence of image deviation caused by factors other than defocus.

For example, as illustrated in FIG. 4, the phase difference pixel is provided for a G filter in a square array corresponding to 2×2 pixels (for example, a pixel in the third row and the third column, a pixel in the third row and the fourth column, a pixel in the fourth row and the third column, and a pixel in the fourth row and the fourth column from the upper left side in the front view of FIG. 4). In this embodiment, a pixel at the lower right corner among the G filters corresponding to 2×2 pixels in the front view of FIG. 4 is allocated as the phase difference pixel.

As such, in the color filter 21, the light shielding member is provided in the pixel at the lower right corner among the G filters corresponding to 2×2 pixels. The phase difference pixels are arranged in the vertical direction and the horizontal direction at regular intervals corresponding to a plurality of pixels. Therefore, since a relatively large number of normal pixels are arranged around the phase difference pixel, it is possible to improve the accuracy of interpolation when the value of the phase difference pixel is interpolated from the values of the normal pixels. In addition, since the pixels included in the first to third pixel groups are arranged such that the normal pixels used for interpolation do not overlap each other between the phase difference pixels, the accuracy of interpolation is expected to be further improved.

Returning to FIG. 3, the imaging element 20 outputs an image signal (a digital signal indicating the value of each first pixel) indicating the first image from the first pixel group and outputs an image signal (a digital signal indicating the value of each second pixel) indicating the second image from the second pixel group. In addition, the imaging element 20 outputs an image signal (a digital signal indicating the value of each normal pixel) indicating the third image from the third pixel group. The third image is a chromatic color image and is, for example, a color image having the same color array as the array of the normal pixels. Image data indicating the first image, the second image, and the third image is temporarily stored in the volatile storage area of the memory 26 via the interface unit 24.

The image processing unit 28 includes a normal processing unit 30. The normal processing unit 30 processes R, G, and B signals corresponding to the third pixel group to generate a chromatic color normal image which is an example of a second display image. In addition, the image processing unit 28 includes a split image processing unit 32. The split image processing unit 32 processes G signals corresponding to the first pixel group and the second pixel group to generate an achromatic split image which is an example of a first display image. The image processing unit 28 according to this embodiment is implemented by, for example, an application specific integrated circuit (ASIC) which is an integrated circuit obtained by integrating circuits for implementing a plurality of functions related to image processing. The CPU 12 executes an imaging control processing program, which will be described below, to perform control such that the split image processing unit 32 generates a split image and the display unit 213 displays the generated split image. However, the hardware configuration of the image processing unit 28 is not limited to the ASIC. For example, the image processing unit 28 may have other hardware configurations such as a programmable logic device or a computer including a CPU, a ROM, and a RAM.

The encoder 34 converts an input signal into a signal of another format and outputs the converted signal. The hybrid finder 220 includes an LCD 247 which displays an electronic image. The number of pixels in a predetermined direction (for example, the number of pixels in the horizontal direction in which parallax occurs) in the LCD 247 is less than the number of pixels in the same direction in the display unit 213. The display control unit 36 is connected to the display unit 213 and the LCD 247 and selectively controls the LCD 247 and the display unit 213 such that the LCD 247 or the display unit 213 displays images. Hereinafter, when the display unit 213 and the LCD 247 do not need to be distinguished from each other, they are referred to as "display devices".

The imaging device 100 according to this embodiment is configured such that the operation mode can be switched between the manual focus mode and the automatic focus mode by the dial 212. When one of the focus modes is selected, the display control unit 36 directs the display device to display the live view image with which the split image is combined. In addition, when the automatic focus mode is selected by the dial 212, the CPU 12 operates as a phase difference detection unit and an automatic focus adjustment unit. The phase difference detection unit detects a phase difference between the first image output from the first pixel group and the second image output from the second pixel group. The automatic focus adjustment unit controls the motor 304 through the mounts 256 and 346 on the basis of the detected phase difference such that the focus lens 302 is moved to the in-focus position and the amount of defocus of the focus lens 302 is zero, in response to an instruction from the device control unit 22. The "amount of defocus" means, for example, the amount of phase shift between the first image and the second image.

The eye approach detection unit 37 detects whether the user looks through the finder eyepiece 242 and outputs the detection result to the CPU 12. Therefore, the CPU 12 can check whether the finder eyepiece 242 is used on the basis of the detection result of the eye approach detection unit 37.

The external I/F 39 is connected to a communication network, such as a local area network (LAN) or the Internet, and transmits and receives various kinds of information between an external apparatus (for example, a printer) and the CPU 12 through the communication network. Therefore, when a printer is connected as the external apparatus, the imaging device 100 can output the captured still image to the printer such that the still image is printed by the printer. When a display is connected as the external apparatus, the imaging device 100 can output the captured still image or live view image to the display such that the image is displayed on the display.

Figure 9:
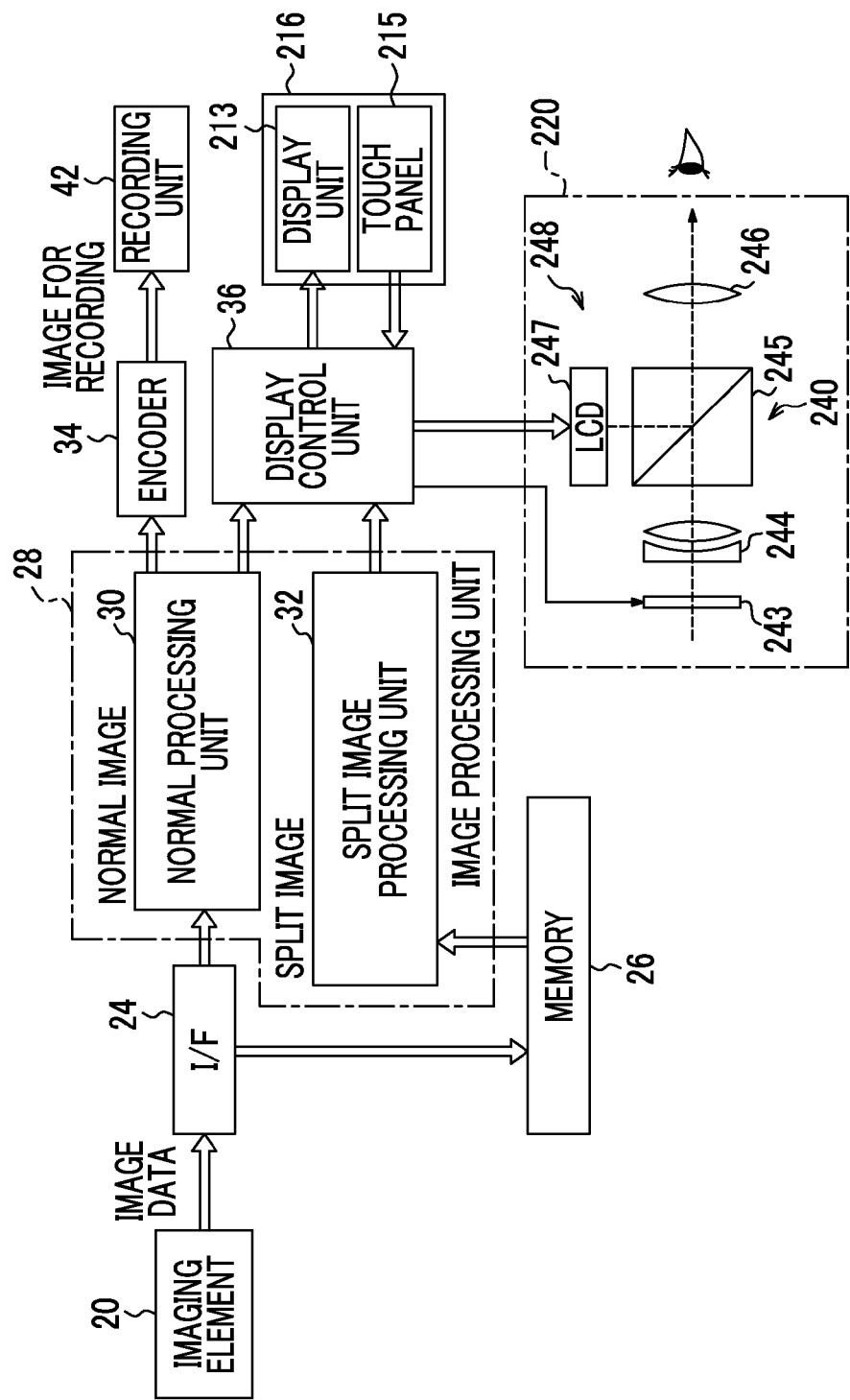
FIG. 9 is a block diagram illustrating an example of the functions of a main portion of an image processing unit in the imaging device according to the first embodiment.

As illustrated in FIG. 9, the normal processing unit 30 and the split image processing unit 32 each include a WB gain unit, a gamma correction unit, and a synchronization processing unit (not illustrated). Each processing unit sequentially performs signal processing on the original digital signal (RAW image) which is temporarily stored in the memory 26. That is, the WB gain unit adjusts the gain of the R, G, and B signals to perform white balance (WB) correction. The gamma correction unit performs gamma correction on the R, G, and B signals whose white balance (WB) has been corrected by the WB gain unit. The synchronization processing unit performs a color interpolation process corresponding to the array of the color filters 21 in the imaging element 20 to generate R, G, and B signals which are synchronized with each other. Whenever the imaging element 20 acquires a RAW image corresponding to one screen, the normal processing unit 30 and the split image processing unit 32 perform image processing on the RAW image in parallel.

When R, G, and B RAW images are input from the interface unit 24, the normal processing unit 30 interpolates the pixels which are shielded in the phase difference image among the R, G, and B pixels of the third pixel group using neighboring pixels (for example, adjacent G pixels) of the same color in the first pixel group and the second pixel group. The normal processing unit 30 may use the image obtained by the interpolation as a normal image for display and a normal image for recording.

In addition, the normal processing unit 30 outputs the image data of the generated normal image for recording to the encoder 34. The R, G, and B signals processed by the normal processing unit 30 are converted (encoded) into signals for recording by the encoder 34 and are recorded in a recording unit 42 (see FIG. 9). The normal processing unit 30 outputs the image data of the generated normal image for display to the display control unit 36. Hereinafter, for convenience of explanation, when the "normal image for recording" and the "normal image for display" do not need to be distinguished from each other, they are referred to as "normal images" without the words "for recording" and "for display".

The imaging element 20 can change the exposure conditions (for example, an electronic shutter speed) of the first pixel group and the second pixel group to acquire images with different exposure conditions at the same time. Therefore, the image processing unit 28 can generate an image in a wide dynamic range on the basis of the images with different exposure conditions. In addition, it is possible to simultaneously acquire a plurality of images under the same exposure conditions and the images can be added to generate a high-sensitivity image with little noise or a high-resolution image.

The split image processing unit 32 extracts the G signals of the first pixel group and the second pixel group from the RAW image which is temporarily stored in the memory 26 and generates an achromatic split image on the basis of the G signals of the first pixel group and the second pixel group. As described above, each of the first pixel group and the second pixel group extracted from the RAW image is a pixel group including the pixels provided with the G filters. Therefore, the split image processing unit 32 can generate a left eye image, which is an achromatic left parallax image, and a right eye image, which is an achromatic right parallax image, on the basis of the G signals of the first pixel group and the second pixel group.

The split image processing unit 32 divides the right eye image in a predetermined division direction (the up-down direction in the front view of FIGS. 10A and 10B) to acquire a plurality of (in this embodiment, two) divided images and selects some of the plurality of divided images to obtain a right eye divided image. In addition, the split image processing unit 32 divides the left eye image in the division direction to acquire a plurality of (in this embodiment, two) divided images and selects a left eye divided image from the plurality of divided images except for an image indicating a divided region corresponding to the right eye divided image. Then, the split image processing unit 32 arranges the right eye divided image and the left eye divided image in corresponding regions to generate a split image. The image data of the generated split image is output to the display control unit 36.

Figure 10B:
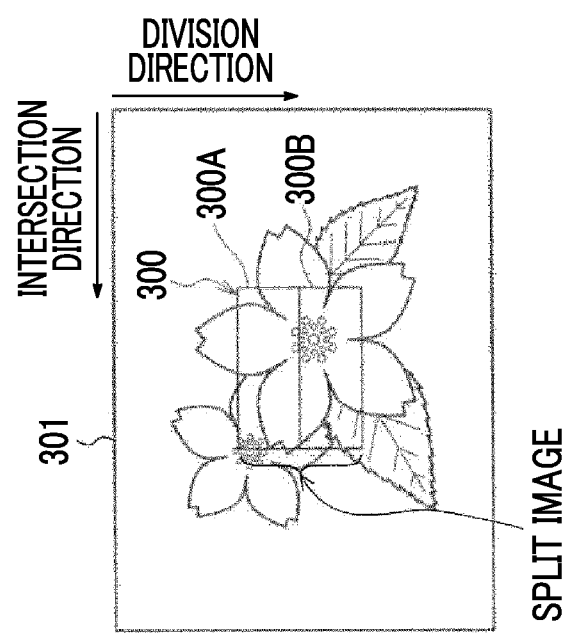
FIG. 10B is a front view illustrating an example of the display aspect of the normal image and the split image according to the first embodiment.

For example, as illustrated in FIGS. 10A and 10B, in a split image 300, a right eye image 300A and a left eye image 300B are alternately arranged in the division direction. When the focus of the imaging lens 16 deviates from the in-focus position, in the split image 300, each of the right eye image 300A and the left eye image 300B deviates by an amount corresponding to the amount of deviation from the in-focus position in a direction (the left-right direction in the front view of FIGS. 10A and 10B; hereinafter, referred to as an "intersection direction") intersecting the division direction, as illustrated in FIG. 10A. In contrast, when the focus is aligned with the in-focus position, in the split image 300, the right eye image 300A and the left eye image 300B are arranged at the same position in the intersection direction, as illustrated in FIG. 10B.

In the imaging device 100 according to this embodiment, display region information indicating a display region of the split image 300 in the display unit 213 is stored in the memory 26 in advance. The display region information is information indicating the range of a display region (in this embodiment, a central portion of a normal image 301) indicated by a predetermined coordinate system in the display region of the display unit 213. In addition, in this embodiment, division direction information indicating the division direction of the split image 300 and division number information indicating the number of divisions of the split image 300 are stored in the memory 26 in advance.

The split image processing unit 32 reads the division direction information from the memory 26 and determines the division direction of the right eye image 300A and the left eye image 300B. In addition, the split image processing unit 32 reads the division number information from the memory 26 and determines the number of divisions of the split image 300. Then, the split image processing unit 32 generates the split image 300 on the basis of the division direction and the number of divisions obtained by the above-mentioned process.

The display control unit 36 generates image data for display on the basis of image data for recording corresponding to the third pixel group which is input from the normal processing unit 30 and the image data of the split image corresponding to the first and second pixel groups which is input from the split image processing unit 32. For example, the display control unit 36 combines the split image 300 which is indicated by the image data input from the split image processing unit 32 with the display region of the normal image indicated by the image data for recording corresponding to the third pixel group which is input from the normal processing unit 30. Then, the combined image data is output to the display device.

In this embodiment, when the split image 300 is combined with the normal image 301, the split image 300 is inserted instead of a portion of the normal image 301. However, a combination method is not limited thereto. For example, a combination method which superimposes the split image 300 on the normal image 301 may be used. In addition, when the split image 300 is superimposed, a combination method may be used which appropriately adjusts the transmissivities of the split image 300 and a portion of the normal image 301 corresponding to a region on which the split image 300 is superimposed. Alternatively, the normal image 301 and the split image 300 may be displayed on different layers. In this case, it is possible to display the split image 300 in a display region of the normal image in the live view image. The live view image is an image indicating an object image when a continuously captured object image is continuously displayed on the screen of the display device.

As illustrated in FIG. 9, the hybrid finder 220 includes the OVF 240 and the EVF 248. The OVF 240 is an inverted Galilean finder including an objective lens 244 and an eyepiece lens 246. The EVF 248 includes the LCD 247, a prism 245, and the eyepiece lens 246.

A liquid crystal shutter 243 is provided in front of the objective lens 244. The liquid crystal shutter 243 shields light such that no optical image is incident on the objective lens 244 when the EVF 248 is used.

The prism 245 reflects an electronic image or various kinds of information displayed on the LCD 247 to the eyepiece lens 246 and combines the optical image and information (the electronic image and various kinds of information) displayed on the LCD 247.

Whenever the finder switching lever 214 is rotated in the direction of the arrow SW illustrated in FIG. 1, the operation mode is alternately switched between an OVF mode in which an optical image can be viewed through the OVF 240 and an EVF mode in which an electronic image can be viewed through the EVF 248.

In the OVF mode, the display control unit 36 performs control such that the liquid crystal shutter 243 does not shield light and an optical image can be viewed through the finder eyepiece 242. In addition, only the split image 300 is displayed on the LCD 247. Therefore, it is possible to display a finder image in which the split image 300 is superimposed on a portion of the optical image.

In contrast, in the EVF mode, the display control unit 36 performs control such that the liquid crystal shutter 243 shields light and only the electronic image displayed on the LCD 247 can be viewed through the finder eyepiece 242. In addition, the same image data as that, with which the split image 300 output to the display unit 213 is combined, is input to the LCD 247. Therefore, the display control unit 36 can display an electronic image in which the split image 300 is combined with a portion of the normal image 301, similarly to the display unit 213.

It is assumed that image signals indicating the normal image 301 and the split image 300 are input to the display device. In this case, for example, as illustrated in FIGS. 10A and 10B, the display device displays the split image 300 indicated by the input image signal in a rectangular display region of the split image 300 which is arranged at the center of the screen. In addition, the display device displays the normal image 301 indicated by the input image signal in an outer circumferential region of the split image 300. When the image signal indicating the split image 300 is not input and only the image signal indicating the normal image 301 is input, the display device displays the normal image 301 indicated by the input image signal in the entire display region of the display device. When the image signal indicating the normal image 301 is not input and only the image signal indicating the split image 300 is input, the display device displays the split image 300 indicated by the input image signal in the display region and leaves the outer circumferential region blank.

However, when the split image 300 is displayed on the display unit 213 and the operation of the user on the split image 300 through the touch panel 215 is detected, the imaging device 100 according to this embodiment performs focus adjustment on the basis of the detection result.

In the imaging device 100 according to this embodiment, a scroll operation, a flick operation, and an opposite moving operation are applied as the operations for the split image 300.

The scroll operation means an operation which designates a desired position on the touch panel 215 with a finger and maintains the movement of the designated position for a first time (in this embodiment, 100 milliseconds) or more. The flick operation means an operation which designates a desired position on the touch panel 215 with a finger, moves the desired position, and separates the finger from the touch panel 215 within a second time (in this embodiment, 100 milliseconds) after the start of the moving operation.

An operation which designates one point in the region of the right eye image 300A or the left eye image 300B with a finger and selects any of the right eye image 300A and the left eye image 300B is performed just before the scroll operation and the flick operation are performed.

The opposite moving operation means an operation which designates one point in the region of each of the right eye image 300A and the left eye image 300B to select each of the right eye image 300A and the left eye image 300B and then performs the scroll operation or the flick operation to move the designated positions in the opposite direction along the intersection direction.

Figure 11:
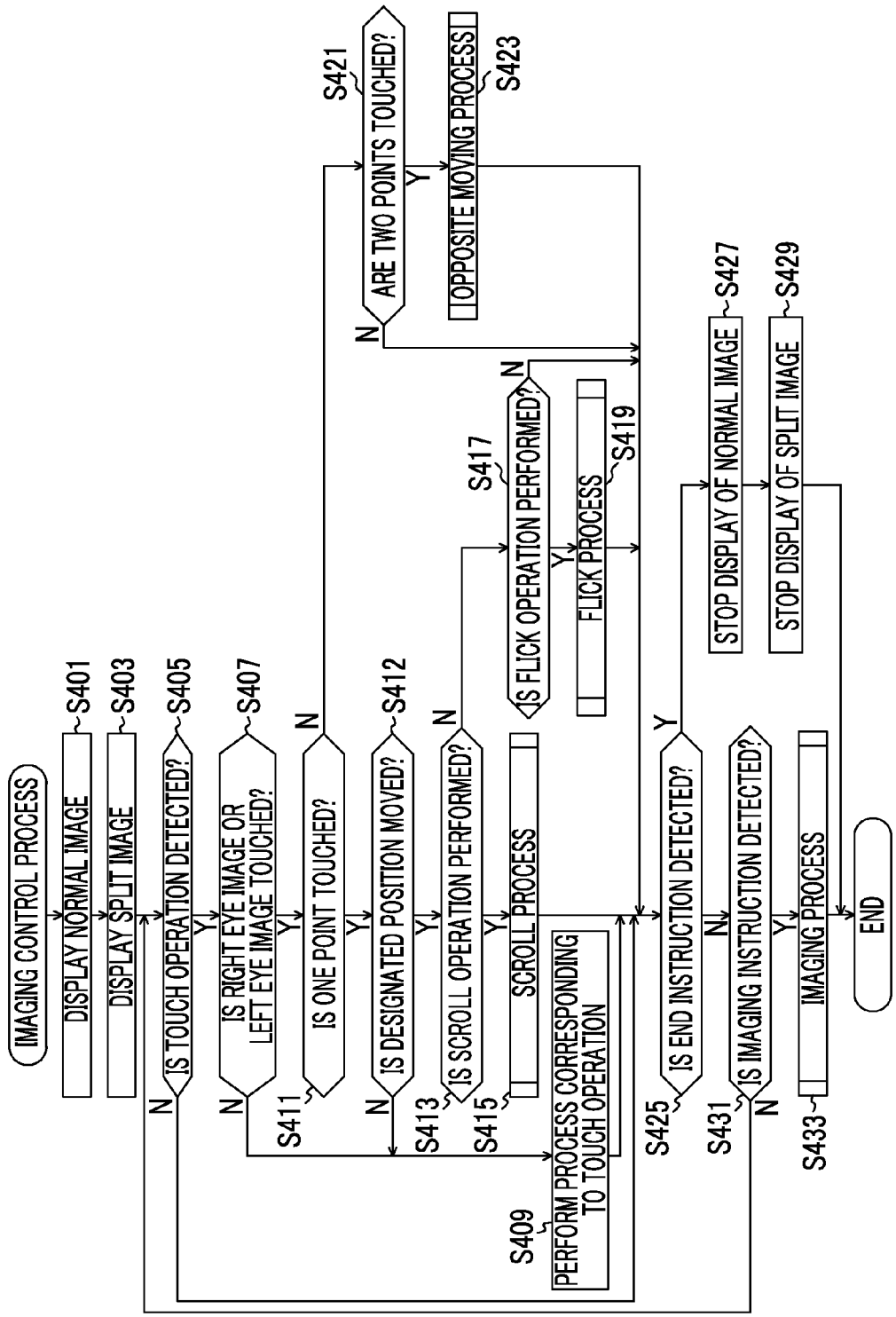
FIG. 11 is a flowchart illustrating the flow of the process of an imaging control processing program according to the first embodiment.

Next, the operation of the imaging device 100 according to this embodiment will be described with reference to FIG. 11. FIG. 11 is a flowchart illustrating the flow of the process of the imaging control processing program executed by the CPU 12 when the imaging device 100 is set to the manual focus mode and the dial 212 is set to the imaging mode. In this embodiment, the program is stored in a predetermined storage area of the memory 26 in advance.

First, in Step S401, the imaging device 100 acquires image data indicating the normal image 301 based on the image signal which is output from the third pixel group through the interface unit 24 and performs control such that the normal image 301 is displayed on the display unit 213.

As such, the imaging device 100 according to this embodiment acquires the image data indicating the normal image 301 from the third pixel group. However, an image data acquisition method is not limited thereto. For example, the imaging device 100 may generate the image data indicating the normal image 301 from image data indicating the right eye image 300A based on the image signal which is output from the first pixel group and image data indicating the left eye image 300B based on the image signal which is output from the second pixel group.

For example, a method which uses the image data indicating the right eye image 300A or the left eye image 300B as the image data indicating the normal image 301, without any change, may be given as an example of a method for generating the image data indicating the normal image 301. In addition, the following method may be used: an interpolation pixel is provided between adjacent pixels in the image data indicating the right eye image 300A or the left eye image 300B; and the image data indicating the normal image 301 is generated, using the average value of the values of the pixels around the interpolation pixel as the value of the interpolation pixel. As a method for generating the normal image 301, a method may be used which combines the image data indicating the right eye image 300A and the image data indicating the left eye image 300B to generate the image data indicating the normal image 301.

Then, in Step S403, the CPU 12 performs control such that the split image processing unit 32 generates the split image 300 and the generated split image 300 is displayed on the display unit 213. In the imaging device 100 according to this embodiment, the CPU 12 displays the split image 300 so as to be superimposed on a central portion of the normal image 301.

As such, in the imaging device 100 according to this embodiment, the CPU 12 displays both the normal image 301 and the split image 300 on the display unit 213. However, the invention is not limited thereto. The CPU 12 may display only the split image 300 on the display unit 213.

Then, in Step S405, it is determined whether the touch panel 215 detects a touch operation. When the determination result in Step S405 is "Yes", the process proceeds to Step S407. When the determination result is "No", the process proceeds to Step S425 which will be described below.

In Step S407, it is determined whether the touch operation detected in Step S405 is a touch on the right eye image 300A or the left eye image 300B. When the determination result in Step S407 is "Yes", the process proceeds to Step S411 which will be described below.

On the other hand, when the determination result in Step S407 is "No", the process proceeds to Step S409 and a process corresponding to the touch operation is performed. Then, the process proceeds to Step S425 which will be described below. Examples of the process corresponding to the touch operation include a process of performing automatic focusing control in a region including the position designated by the touch operation and the periphery of the designated position and a process of enlarging and displaying the peripheral region.

In Step S411, it is determined whether the touch operation detected in Step S405 is a touch operation of designating one point. When the determination result in Step S411 is "Yes", the process proceeds to Step S412. On the other hand, when the determination result in Step S411 is "No", the process proceeds to Step S421 which will be described below.

In Step S412, it is determined whether the position designated by the touch operation has been moved. In the imaging device 100 according to this embodiment, when the designated position has been moved by a predetermined distance (in this embodiment, 10 pixels) or more, it is determined that the designated position has been moved. When the determination result in Step S412 is "Yes", the process proceeds to Step S413. On the other hand, when the determination result in Step S412 is "No", the process proceeds to Step S409.

In Step S413, it is determined whether the touch operation detected in Step S405 is the scroll operation. At that time, the CPU 12 determines that the touch operation is the scroll operation when the moving operation in the touch operation is maintained for the first time or more and the designated position is moved by the moving operation by a first predetermined distance (in this embodiment, 10 pixels) or more in the intersection direction.

As such, in the imaging device 100 according to this embodiment, it is determined whether the touch operation is the scroll operation on the basis of the duration of the touch operation. However, a method for determining the scroll operation is not limited thereto. For example, it may be determined whether the operation is the scroll operation on the basis of whether a predetermined operation which is applied to the scroll operation is performed through the operation unit 14, whether the touch operation is maintained for the first time or more, and whether the designated position is moved by the first distance or more by the moving operation.

When the determination result in Step S413 is "Yes", the process proceeds to Step S415 and the scroll process, which will be described below, is performed. On the other hand, when the determination result in Step S413 is "No", the process proceeds to Step S417.

In Step S417, it is determined whether the touch operation detected in Step S405 is the flick operation. At that time, the CPU 12 determines that the touch operation is the flick operation when the moving operation in the touch operation is not maintained for the first time or more and the designated position is moved by the moving operation by the first distance or more in the intersection direction.

As such, in the imaging device 100 according to this embodiment, it is determined whether the touch operation is the flick operation on the basis of the duration of the touch operation and the moving distance of the designated position. However, a method for determining the flick operation is not limited thereto. For example, it may be determined whether the operation is the flick operation on the basis of whether a predetermined operation which is applied to the flick operation is performed through the operation unit 14, whether the touch operation is not maintained for the first time or more, and whether the designated position is moved by the first distance or more by the moving operation.

When the determination result in Step S417 is "Yes", the process proceeds to Step S419 and the flick process, which will be described below, is performed. On the other hand, when the determination result in Step S417 is "No", the process proceeds to Step S425.

In Step S421, it is determined whether the touch operation detected in Step S405 is a touch operation of designating two points. When the determination result in Step S421 is "Yes", the process proceeds to Step S423 and an opposite moving process, which will be described below, is performed. On the other hand, when the determination result in Step S421 is "No", the process proceeds to Step S425.

In Step S425, it is determined whether the dial 212 is set to a mode other than the imaging mode to determine whether an imaging control processing program end instruction is input. When the determination result in Step S425 is "Yes", the process proceeds to Step S427. On the other hand, when the determination result in Step S425 is "No", the process proceeds to Step S431.

In Step S427, the CPU 12 performs control such that the display of the normal image 301 on the display unit 213 in Step S401 is stopped. Then, in Step S429, the CPU 12 performs control such that the display of the split image 300 on the display unit 213 in Step S403 is stopped and the imaging control processing program ends.

In Step S431, it is determined whether an operation of fully pressing the release switch 211 is detected and it is determined whether an imaging instruction is input on the basis of the determination result. When the determination result in Step S431 is "No", the process returns to S405. On the other hand, when the determination result in Step S425 is "Yes", the process proceeds to Step S433.

In Step S433, an imaging process which records the image data indicating the normal image 301 in the memory 26 is performed and the imaging control processing program ends. Since the imaging process is generally performed, the detailed description thereof will be omitted.

In the imaging device 100 according to this embodiment, it is determined whether the touch operation is the scroll operation or the flick operation on the basis of the duration of the touch operation. However, a determination method is not limited thereto. For example, it may be determined whether the touch operation is the scroll operation or the flick operation on the basis of the moving distance in the moving operation. In this case, when the moving distance in the moving operation is equal to or greater than a predetermined value, it may be determined that the touch operation is the scroll operation. When the moving distance is less than the predetermined value, it may be determined that the touch operation is the flick operation. In addition, it may be determined whether the touch operation is the scroll operation or the flick operation on the basis of a moving speed in the moving operation. In this case, when the moving speed in the moving operation is equal to or greater than a predetermined value, it may be determined that the touch operation is the flick operation. When the moving speed is less than the predetermined value, it may be determined that the touch operation is the scroll operation.

Figure 12:
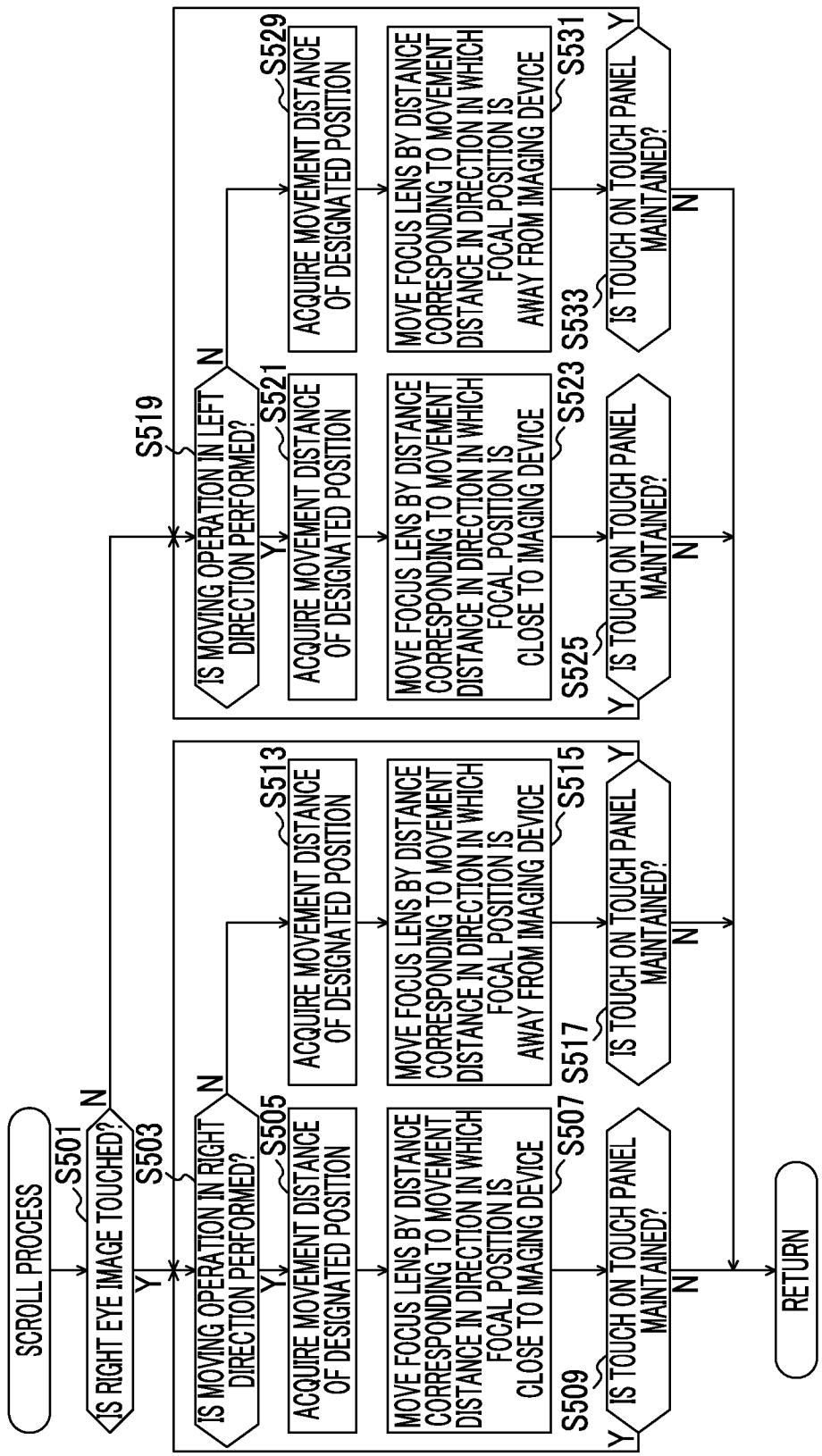
FIG. 12 is a flowchart illustrating the flow of the process of a scroll processing routine program according to the first embodiment.

Next, the operation of the imaging device 100 when the scroll process is performed will be described with reference to FIG. 12. FIG. 12 is a flowchart illustrating the flow of the process of a scroll processing routine program executed by the CPU 12 while the imaging control processing program is being executed. In this embodiment, the program is stored in a predetermined storage area of the memory 26 in advance.

First, in Step S501, it is determined whether the touch operation detected in Step S405 is a touch on the right eye image 300A. When the determination result in Step S501 is "Yes", the process proceeds to Step S503. On the other hand, when the determination result in Step S501 is "No", the touch operation detected in Step S405 is regarded as a touch on the left eye image 300B and the process proceeds to Step S519 which will be described below.

In Step S503, it is determined whether the moving operation in the touch operation detected in Step S405 is a moving operation in the right direction. When the determination result in Step S503 is "Yes", the process proceeds to Step S505. On the other hand, when the determination result in Step S503 is "No", the moving operation is regarded as a moving operation in the left direction and the process proceeds to Step S513 which will be described below.

In Step S505, the moving distance of the designated position in the intersection direction in the touch operation detected in Step S405 is acquired. When Step S505 is a first acquisition process after the scroll processing routine program is executed, the CPU 12 acquires, as the moving distance, a distance from the designated position when the touch operation starts to the current designated position in the intersection direction. On the other hand, when Step S505 is the second or more acquisition process after the scroll processing routine program is executed, the CPU 12 acquires, as the moving distance, a distance from the previous designated position to the current designated position.

Then, in Step S507, the CPU 12 moves the focus lens 302 by a distance corresponding to the moving distance acquired in Step S505 in a direction (a direction in which the focal position becomes closer to the imaging device 100) in which the focus lens 302 becomes focused on an object closer to the imaging device than the current in-focus position in the optical axis direction of the focus lens 302. In the imaging device 100 according to this embodiment, a value obtained by multiplying the moving distance of the designated position by a first predetermined coefficient is used as the moving distance of the focus lens 302.

An example of the first coefficient is a value obtained by the movable distance of the focus lens 302 in the optical axis direction by the length of a detectable region of the touch panel 215 in the intersection direction. However, the first coefficient is not limited thereto. The focus lens 302 can be more accurately moved as the first coefficient decreases and the focus lens 302 can be moved at a higher speed as the first coefficient increases. The user may input information indicating the first coefficient through the operation unit 14.

Figure 13:
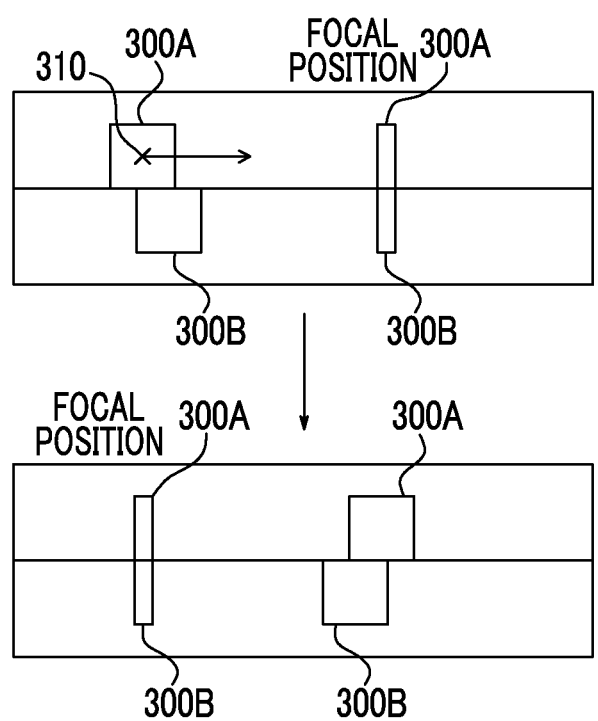
FIG. 13 is a front view illustrating an example of the display state of the split image when a scroll operation is performed in the imaging device according to the first embodiment.

For example, as illustrated on the upper side of FIG. 13, in the back-focused state, it is assumed that a designated position 310 on the right eye image 300A is moved to the right by the operation of the user through the touch panel 215. In this case, as illustrated on the lower side of FIG. 13, the CPU 12 moves the focus lens 302 in a direction in which the focal position becomes closer to the imaging device 100 along the optical axis direction such that the focus of the focus lens 302 becomes closer to the in-focus position.

The moving distance of the designated position 310 in the intersection direction is acquired in the above-mentioned Step S505 and the focus lens 302 is moved by a distance corresponding to the moving distance in the above-mentioned Step S507. However, the invention is not limited thereto. For example, in the above-mentioned Step S505, the moving distance of the designated position 310 in the intersection direction may be acquired and the focus lens 302 may be moved by a distance corresponding to the moving speed (for example, a distance which is proportional to the moving speed).

Then, in Step S509, it is determined whether the touch with the touch panel 215 is maintained in the touch operation detected in Step S405. When the determination result in Step S509 is "Yes", the process returns to Step S503. On the other hand, when the determination result in Step S509 is "No", the scroll processing routine program ends and the process proceeds to Step S425 in the imaging control processing program (main routine).

In Step S513, similarly to Step S505, the moving distance of the designated position 310 in the intersection direction in the touch operation detected in Step S405 is acquired.

Then, in Step S515, the focus lens 302 is moved by a distance corresponding to the moving distance acquired in Step S513 in a direction (a direction in which the focal position becomes more distant from the imaging device 100)

in which the focus lens 302 becomes focused on an object further away from the imaging device than the current in-focus position in the optical axis direction of the focus lens 302. In the imaging device 100 according to this embodiment, a value obtained by multiplying the moving distance of the designated position 310 by the first coefficient is used as the moving distance of the focus lens 302.

Figure 14:
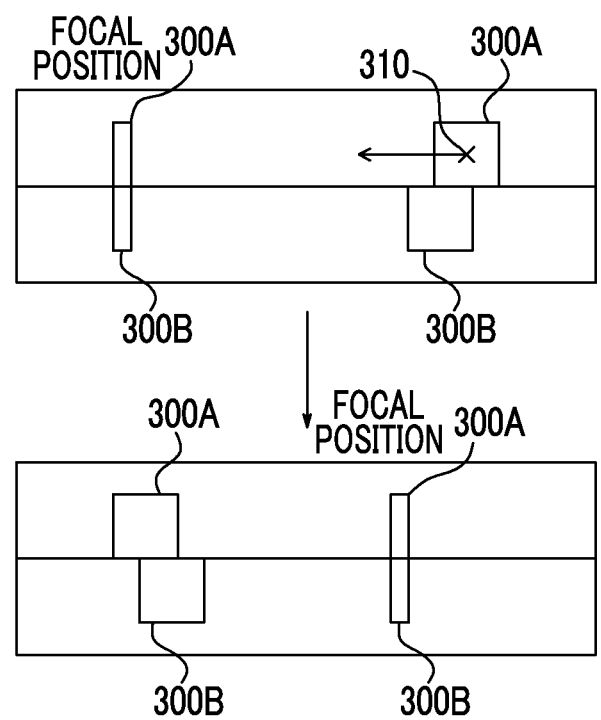
FIG. 14 is a front view illustrating another example of the display state of the split image when the scroll operation is performed in the imaging device according to the first embodiment.

As illustrated on the upper side of FIG. 14, in the front-focused state, it is assumed that the designated position 310 on the right eye image 300A is moved to the left by the operation of the user through the touch panel 215. In this case, as illustrated on the lower side of FIG. 14, the CPU 12 moves the focus lens 302 in a direction in which the focal position becomes further away from the imaging device 100 along the optical axis direction of the focus lens 302 such that the focus of the focus lens 302 becomes closer to the in-focus position.

Then, in Step S517, it is determined whether the touch operation detected in Step S405 is maintained. When the determination result in Step S517 is "Yes", the process returns to Step S503. On the other hand, when the determination result in Step S517 is "No", the process proceeds to Step S425.

In Step S519, it is determined whether the moving operation in the touch operation detected in Step S405 is a moving operation in the left direction. When the determination result in Step S519 is "Yes", the process proceeds to Step S521. On the other hand, when the determination result in Step S519 is "No", the moving operation is regarded as a moving operation in the right direction and the process proceeds to Step S529 which will be described below.

In Step S521, similarly to Step S505, the moving distance of the designated position 310 in the intersection direction in the touch operation detected in Step S405 is acquired.

Then, in Step S523, similarly to Step S507, the focus lens 302 is moved by a distance corresponding to the moving distance acquired in Step S521 in a direction in which the focal position becomes closer to the imaging device 100 in the optical axis direction of the focus lens 302. In the imaging device 100 according to this embodiment, a value obtained by multiplying the moving distance of the designated position 310 by the first coefficient is used as the moving distance of the focus lens 302.

Then, in Step S525, it is determined whether the touch operation detected in Step S405 is maintained. When the determination result in Step S525 is "Yes", the process returns to Step S519. On the other hand, when the determination result in Step S525 is "No", the process proceeds to Step S425.

In Step S529, similarly to Step S505, the moving distance of the designated position 310 in the intersection direction in the touch operation detected in Step S405 is acquired.

Then, in Step S531, similarly to Step S515, the focus lens 302 is moved by a distance corresponding to the moving distance acquired in Step S529 in a direction in which the focal position becomes further away from the imaging device 100 in the optical axis direction of the focus lens 302.

Then, in Step S533, it is determined whether the touch operation detected in Step S405 is maintained. When the determination result in Step S533 is "Yes", the process returns to Step S519. On the other hand, when the determination result in Step S533 is "No", the process proceeds to Step S425.

Figure 15:
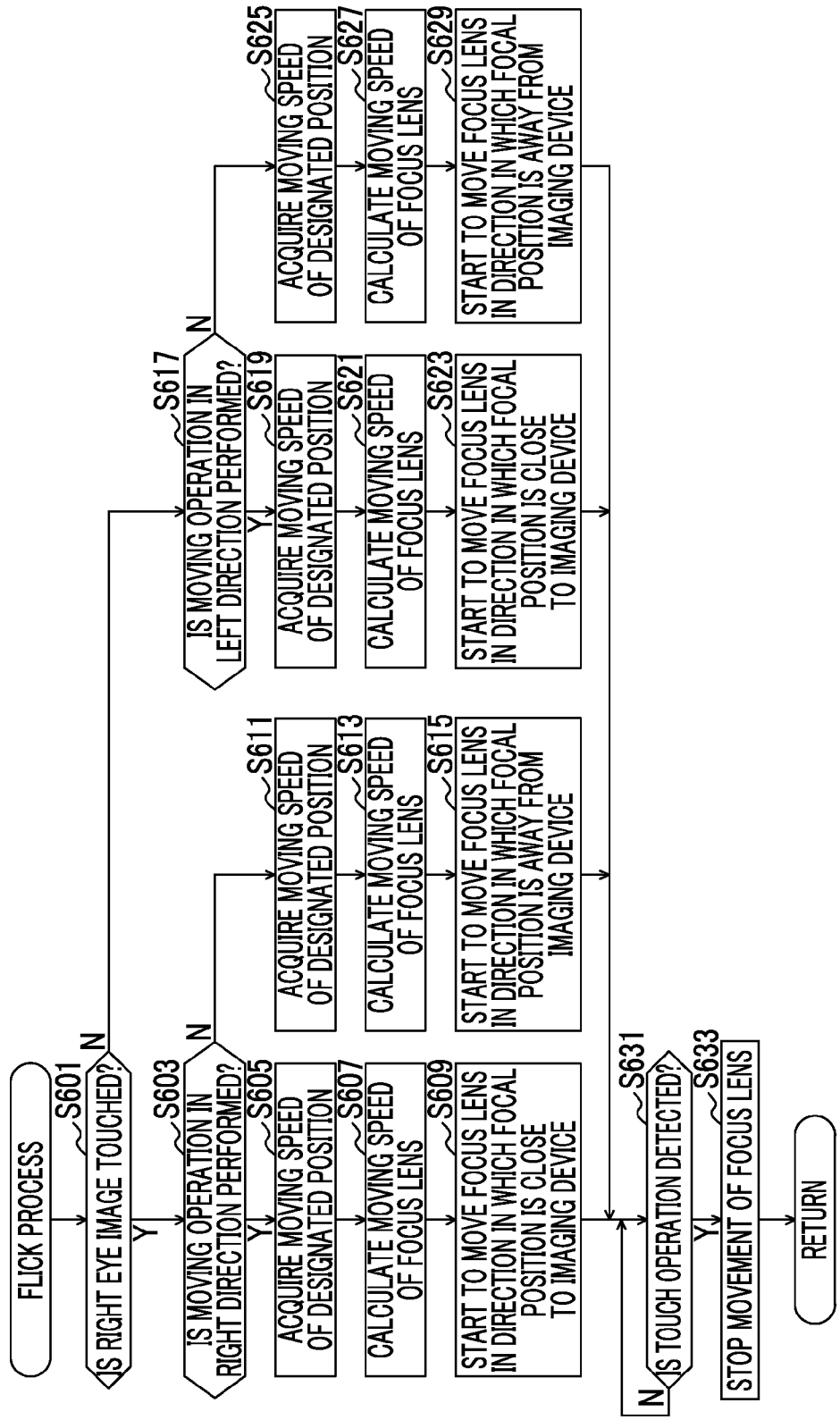
FIG. 15 is a flowchart illustrating the flow of the process of a flick processing routine program according to the first embodiment.

Next, the operation of the imaging device 100 when the flick process is performed will be described with reference to FIG. 15. FIG. 15 is a flowchart illustrating the flow of the process of a flick processing routine program executed by the CPU 12 while the imaging control processing program is being executed. In this embodiment, the program is stored in a predetermined storage area of the memory 26 in advance.

Figure 16:
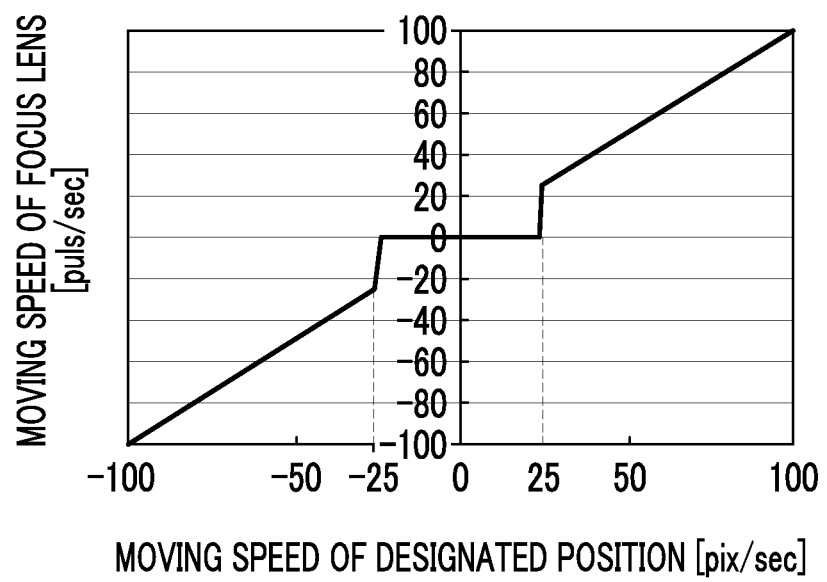
FIG. 16 is a graph illustrating the relationship between the moving speed of a designated position on a touch panel and the moving speed of a focus lens in the imaging device according to the first embodiment.

In addition, in this embodiment, the memory 26 stores, for example, correspondence information indicating the relationship between the moving speed of the designated position 310 in the moving operation during the flick operation and the moving speed of the focus lens 302, as illustrated in FIG. 16. In a graph illustrated in FIG. 16, the horizontal axis indicates the moving speed of the designated position 310 in the moving operation during the flick operation and the vertical axis indicates the moving speed of the focus lens 302. In addition, for the moving speed of the designated position, the right direction is a positive direction and the left direction is a negative direction. As illustrated in FIG. 16, in the imaging device 100 according to this embodiment, as the moving speed of the designated position 310 increases, the moving speed of the focus lens 302 increases. However, when the moving speed of the designated position 310 is in the range from a first predetermined threshold value (in this embodiment, −25 pixels/second) to a second predetermined threshold value (in this embodiment, 25 pixels/second), the moving speed of the focus lens 302 is 0 (zero). The reason for this is as follows. When the moving speed in the moving operation is in the range from the first threshold value to the second threshold value, the possibility of the designated position 310 being moved by, for example, the shaking of fingers against the user's intention is higher than the possibility of the designated position 310 being moved by the user's intention.

As such, in the imaging device 100 according to this embodiment, when the flick operation is performed through the touch panel 215, the moving speed of the focus lens 302 is determined on the basis of the moving speed in the moving operation during the flick operation.

First, in Step S601, it is determined whether the touch operation detected in Step S405 is a touch on the right eye image 300A. When the determination result in Step S601 is "Yes", the process proceeds to Step S603. On the other hand, when the determination result in Step S601 is "No", the touch operation detected in Step S405 is regarded as a touch on the left eye image 300B and the process proceeds to Step S617 which will be described below.

In Step S603, it is determined whether the moving operation in the touch operation detected in Step S405 is a moving operation in the right direction. When the determination result in Step S603 is "Yes", the process proceeds to Step S605. On the other hand, when the determination result in Step S603 is "No", the moving operation is regarded as a moving operation in the left direction and the process proceeds to Step S611 which will be described below.

In Step S605, the moving speed of the designated position 310 in the intersection direction in the touch operation detected in Step S405 is acquired. The CPU 12 acquires, as the moving speed, a value obtained by dividing the moving distance of the designated position 310 in the moving operation by the time from the start to the end of the movement.

Then, in Step S607, the moving speed of the focus lens 302 is calculated. In the imaging device 100 according to this embodiment, correspondence information is read from the memory 26 and a moving speed corresponding to the moving speed acquired in Step S605 is calculated from the correspondence information. As such, in the imaging device 100 according to this embodiment, the moving speed of the focus lens 302 is calculated on the basis of the moving speed of the designated position 310 and the correspondence information. However, the invention is not limited thereto. For example, the moving speed of the focus lens 302 may be calculated on the basis of the moving speed of the designated position 310, using a predetermined calculation formula which calculates the moving speed of the focus lens 302 using the moving speed of the designated position 310 as a variable.

Then, in Step S609, the focus lens 302 starts to be moved at a speed corresponding to the moving speed calculated in Step S607 in a direction in which the focal position becomes closer to the imaging device 100 in the optical axis direction of the focus lens 302. Then, the process proceeds to Step S631 which will be described below.

In Step S611, similarly to Step S605, the moving speed of the designated position 310 in the intersection direction in the touch operation detected in Step S405 is acquired.

Then, in Step S613, similarly to Step S607, the moving speed of the focus lens 302 is calculated.

Then, in Step S615, the CPU 12 performs control such that the focus lens 302 starts to be moved at a speed corresponding to the moving speed calculated in Step S613 in a direction in which the focal position becomes further away from the imaging device 100 in the optical axis direction of the focus lens 302. Then, the process proceeds to Step S631 which will be described below.

In Step S617, it is determined whether the moving operation in the touch operation detected in Step S405 is a moving operation in the left direction. When the determination result in Step S617 is "Yes", the process proceeds to Step S619. On the other hand, when the determination result in Step S617 is "No", the moving operation is regarded as a moving operation in the right direction and the process proceeds to Step S625 which will be described below.

Then, in Step S619, similarly to Step S605, the moving speed of the designated position 310 in the intersection direction in the touch operation detected in Step S405 is acquired.

Then, in Step S621, similarly to Step S607, the moving speed of the focus lens 302 is calculated.

Then, in Step S623, the focus lens 302 starts to be moved at a speed corresponding to the moving speed calculated in Step S621 in the direction in which the focal position becomes closer to the imaging device 100 in the optical axis direction of the focus lens 302. Then, the process proceeds to Step S631 which will be described below.

In Step S625, similarly to Step S605, the moving speed of the designated position 310 in the intersection direction in the touch operation detected in Step S405 is acquired.

Then, in Step S627, similarly to Step S607, the moving speed of the focus lens 302 is calculated.

Then, in Step S629, the CPU 12 performs control such that the focus lens 302 starts to be moved at a speed corresponding to the moving speed calculated in Step S627 in the direction in which the focal position becomes further away from the imaging device 100 in the optical axis direction of the focus lens 302. Then, the process proceeds to Step S631.

In Step S631, the movement of the focus lens 302 which is started by any of Steps S609, S615, S623, and S629 is continuously performed until the touch operation is detected again. Then, the process proceeds to Step S633. In the imaging device 100 according to this embodiment, when any position on the entire region of the touch panel 215 is designated again after the flick operation is performed, it is determined that the touch operation is detected again.

In Step S633, the CPU 12 performs control such that the movement of the focus lens 302 is stopped and ends the flick processing routine program.

As described above, in the flick process, the imaging device 100 according to this embodiment moves the focus lens 302 on the basis of the execution of the flick operation and stops the movement of the focus lens 302 on the basis of the re-execution of the touch operation.

In this embodiment, when the touch operation is performed again, the movement of the focus lens 302 is stopped. However, the invention is not limited thereto. For example, the moving speed of the focus lens 302 may be gradually reduced to stop the movement of the focus lens 302. Hereinafter, Example 1 of the flick process will be described.

Figure 17:
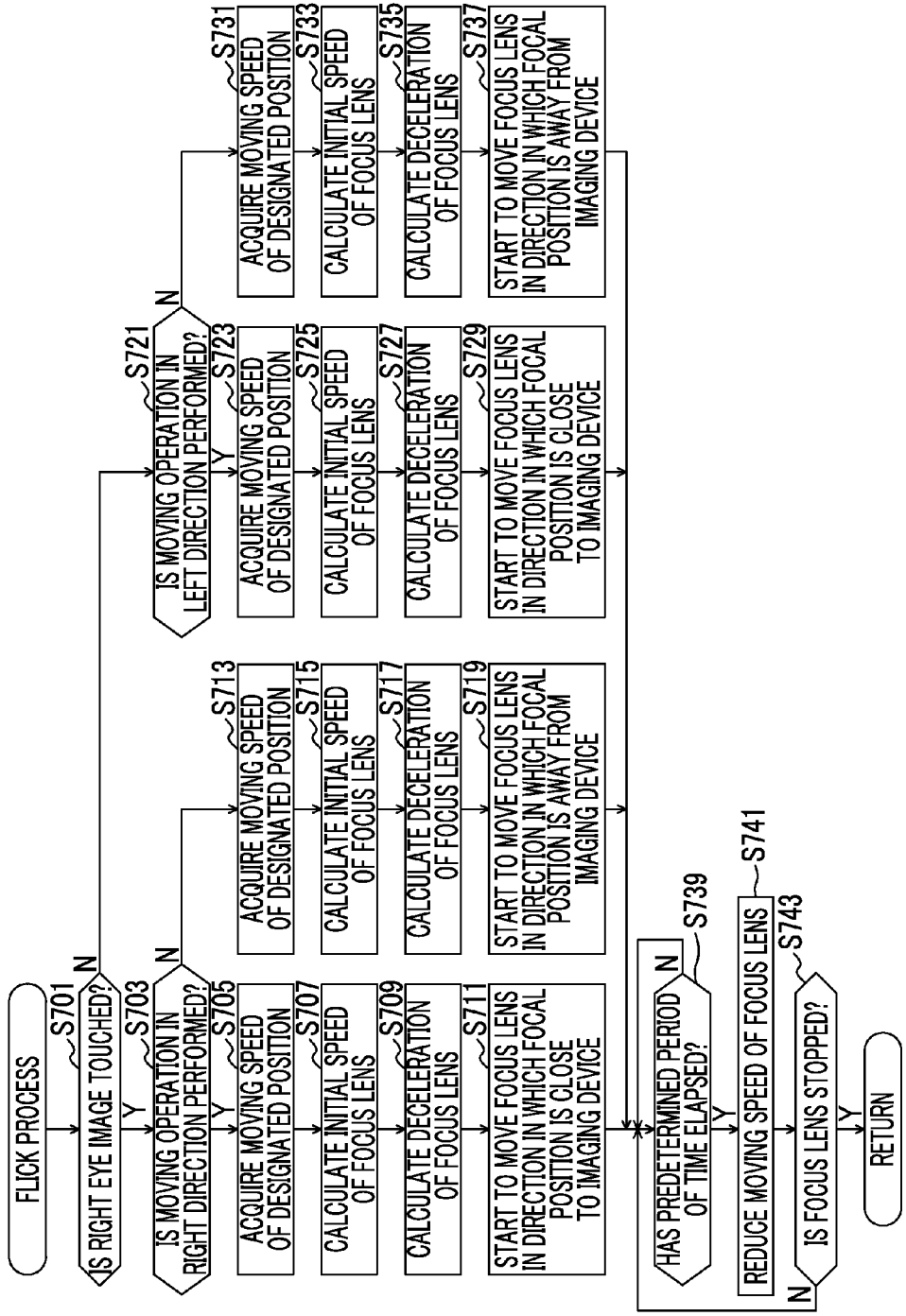
FIG. 17 is a flowchart illustrating the flow of the process of Example 1 of the flick processing routine program according to the first embodiment.

Next, the operation of the imaging device 100 when Example 1 of the flick process is performed will be described with reference to FIG. 17. FIG. 17 is a flowchart illustrating the flow of the process of the flick processing routine program executed by the CPU 12 while the imaging control processing program is being executed. In this embodiment, the program is stored in a predetermined storage area of the memory 26 in advance.

In addition, in this embodiment, the memory 26 stores stopping time information indicating a stopping time from the start to the end of the movement of the focus lens 302 in advance.

First, in Step S701, it is determined whether the touch operation detected in Step S405 is a touch on the right eye image 300A. When the determination result in Step S701 is "Yes", the process proceeds to Step S703. On the other hand, when the determination result in Step S701 is "No", the touch operation detected in Step S405 is regarded as a touch on the left eye image 300B and the process proceeds to Step S721 which will be described below.

In Step S703, it is determined whether the moving operation in the touch operation detected in Step S405 is a moving operation in the right direction. When the determination result in Step S703 is "Yes", the process proceeds to Step S705. On the other hand, when the determination result in Step S703 is "No", the moving operation is regarded as a moving operation in the left direction and the process proceeds to Step S713 which will be described below.

In Step S705, similarly to Step S605, the moving speed of the designated position 310 in the intersection direction in the touch operation detected in Step S405 is acquired.

Then, in Step S707, similarly to Step S607, a moving speed, which is the initial speed of the focus lens 302, is calculated.

Then, in Step S709, deceleration with respect to a predetermined time (in this embodiment, one second) for reducing the moving speed of the focus lens 302 is calculated. First, in the imaging device 100 according to this embodiment, the stopping time information is read from the memory 26. Then, in the imaging device 100 according to this embodiment, when the focus lens 302 starts to be moved at the moving speed calculated in Step S707, the deceleration for stopping the movement of the focus lens 302 during the time until the stopping time has elapsed after the start time is calculated. In the imaging device 100 according to this embodiment, the deceleration is a value obtained by dividing the moving speed calculated in Step S707 by the time from the start of the movement of the focus lens 302 to the stopping time.

Then, in Step S711, the CPU 12 performs control such that the focus lens 302 starts to be moved at a speed corresponding to the moving speed calculated in Step S707 in the direction in which the focal position becomes closer to the imaging device 100 in the optical axis direction of the focus lens 302. Then, the process proceeds to Step S739 which will be described below.

In Step S713, similarly to Step S705, the moving speed of the designated position 310 in the intersection direction in the touch operation detected in Step S405 is acquired.

In Step S715, similarly to Step S707, a moving speed, which is the initial speed of the designated position 310, in the intersection direction in the touch operation detected in Step S405 is calculated.

Then, in Step S717, similarly to Step S709, the deceleration of the focus lens 302 with respect to a predetermined time is calculated.

Then, in Step S719, the CPU 12 performs control such that the focus lens 302 starts to be moved at a speed corresponding to the moving speed calculated in Step S715 in the direction in which the focal position becomes further away from the imaging device 100 in the optical axis direction of the focus lens 302. Then, the process proceeds to Step S739 which will be described below.

In Step S721, it is determined whether the moving operation in the touch operation detected in Step S405 is a moving operation in the left direction. When the determination result in Step S721 is "Yes", the process proceeds to Step S723. On the other hand, when the determination result in Step S721 is "No", the moving operation is regarded as a moving operation in the right direction and the process proceeds to Step S731 which will be described below.

In Step S723, similarly to Step S705, the moving speed of the designated position 310 in the intersection direction in the touch operation detected in Step S405 is acquired.

Then, in Step S725, similarly to Step S707, a moving speed, which is the initial speed of the focus lens 302, is calculated.

Then, in Step S727, similarly to Step S709, the deceleration of the focus lens 302 with respect to a predetermined time is calculated.

Then, in Step S729, the CPU 12 performs control such that the focus lens 302 starts to be moved at a speed corresponding to the moving speed calculated in Step S725 in the direction in which the focal position becomes closer to the imaging device 100 in the optical axis direction of the focus lens 302. Then, the process proceeds to Step S739 which will be described below.

In Step S731, similarly to Step S705, the moving speed of the designated position 310 in the intersection direction in the touch operation detected in Step S405 is acquired.

Then, in Step S733, similarly to Step S707, a moving speed, which is the initial speed of the focus lens 302, in the touch operation detected in Step S405 is calculated.

Then, in Step S735, similarly to Step S709, the deceleration of the focus lens 302 with respect to a predetermined time is acquired.

Then, in Step S737, the CPU 12 performs control such that the focus lens 302 starts to be moved at a speed corresponding to the moving speed calculated in Step S733 in the direction in which the focal position becomes further away from the imaging device 100 in the optical axis direction of the focus lens 302. Then, the process proceeds to Step S739.

In Step S739, the CPU 12 waits until a predetermined period of time (in this embodiment, one second) elapses and then proceeds to Step S741.

In Step S741, the CPU 12 performs control such that a speed corresponding to the deceleration calculated by any of Steps S709, S717, S727, and S735 is reduced from the moving speed of the focus lens 302.

Then, in Step S743, it is determined whether the movement of the focus lens 302 has stopped. When the determination result in Step S743 is "No", the process returns to Step S739. On the other hand, when the determination result in Step S743 is "Yes", the flick processing routine program ends.

Figure 18:
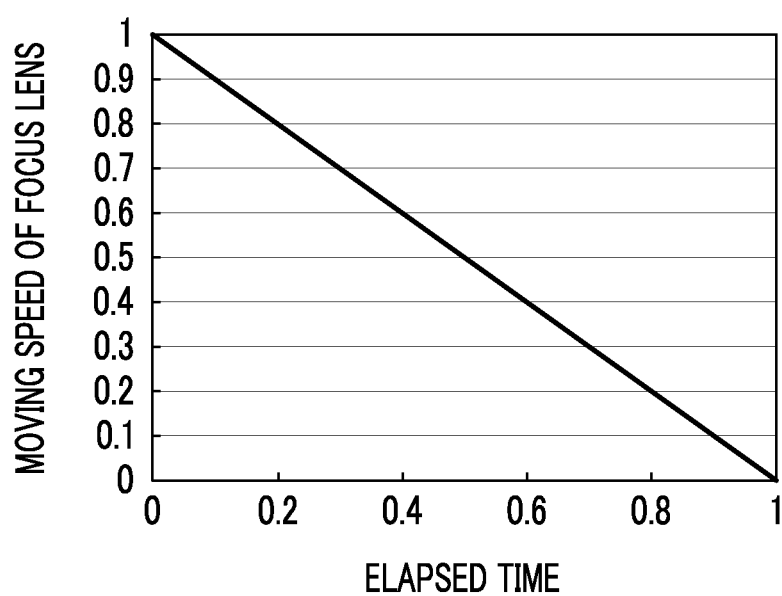
FIG. 18 is a graph illustrating the relationship between an elapsed time which is standardized with respect to the time from the start to the end of the movement of the focus lens and the moving speed of the focus lens which is standardized with respect to an initial speed when the focus lens is moved in the imaging device according to the first embodiment.

FIG. 18 is a graph illustrating an example of the relationship between the time elapsed from the start of the movement of the focus lens 302 and the moving speed of the focus lens 302 in the imaging device 100 according to this embodiment. In the graph illustrated in FIG. 18, the horizontal axis indicates the time elapsed from the start of the movement of the focus lens 302 and the vertical axis indicates the moving speed of the focus lens 302. In FIG. 18, the time elapsed from the start of the movement of the focus lens 302 is standardized such that the time from the start to the end of the movement of the focus lens 302 is 1.

For example, in the graph illustrated in FIG. 18, in the imaging device 100 according to this embodiment, as the elapsed time increases, the moving speed of the focus lens 302 is reduced and the moving speed is 0 (zero) during the time until the stopping time has elapsed after the start of the movement of the focus lens 302. As such, in the imaging device 100 according to this embodiment, when the flick operation is performed through the touch panel 215, the moving speed of the focus lens 302 is gradually reduced as the time elapses from the start of the movement of the focus lens 302 increases and the focus lens 302 is stopped.

As described above, in the flick process, the imaging device 100 according to this embodiment may move the focus lens 302 on the basis of the execution of the flick operation and gradually reduce the moving speed of the focus lens 302 to stop the focus lens 302.

A method for stopping the focus lens 302 is not limited to the method for gradually reducing the moving speed of the focus lens 302. For example, the focus lens 302 may be moved by the amount of movement corresponding to the moving distance of the designated position 310 and then stopped. For example, when the focus lens 302 is driven by a pulse motor, it is assumed that 1000 pulses are allocated to the entire driving range of the focus lens 302. When the amount of movement of the designated position 310 is 10% of the entire screen range of the display unit 312 (for example, 64 pixels in the longitudinal direction in the case of a VGA (640×210)), the focus lens 302 is moved by a distance corresponding to 100 pulses and is then stopped.

The time when the focus lens 302 is stopped in the flick process is not limited to those in these methods. When the captured image is focused by the focus lens 302, the movement of the focus lens 302 may be stopped. Hereinafter, Example 2 of the flick process will be described.

Figure 19:
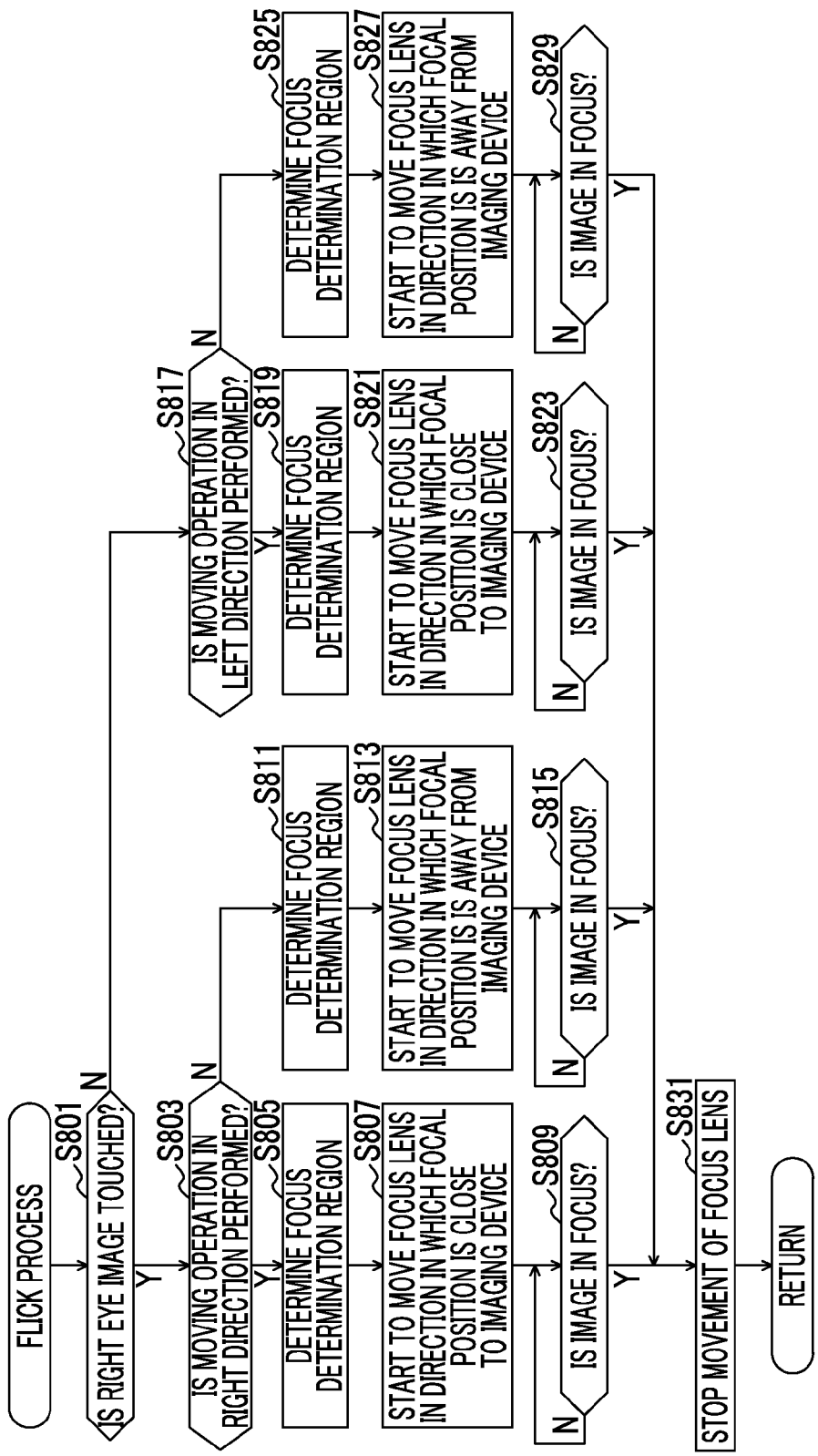
FIG. 19 is a flowchart illustrating the flow of the process of Example 2 of the flick processing routine program according to the first embodiment.

Next, the operation of the imaging device 100 when the flick process is performed will be described with reference to FIG. 19. FIG. 19 is a flowchart illustrating the flow of the process of the flick processing routine program executed by the CPU 12 while the imaging control processing program is being executed. In this embodiment, the program is stored in a predetermined storage area of the memory 26 in advance.

First, in Step S801, it is determined whether the touch operation detected in Step S405 is a touch on the right eye image 300A. When the determination result in Step S801 is "Yes", the process proceeds to Step S803. On the other hand, when the determination result in Step S801 is "No", the touch operation detected in Step S405 is regarded as a touch on the left eye image 300B and the process proceeds to Step S817 which will be described below.

In Step S803, it is determined whether the moving operation in the touch operation detected in Step S405 is a moving operation in the right direction. When the determination result in Step S803 is "Yes", the process proceeds to Step S805. On the other hand, when the determination result in Step S803 is "No", the moving operation is regarded as a moving operation in the left direction and the process proceeds to Step S811 which will be described below.

In Step S805, a focus determination region, which is a region for checking a focus state, on the right eye image 300A is determined. In the imaging device 100 according to this embodiment, the focus determination region is a circular region with a predetermined radius (in this embodiment, for example, 500 pixels) which has, as the center, the designated position 310 (see FIGS. 13 and 14) when a selection operation is performed. However, a method for determining the focus determination region is not limited thereto. For example, the focus determination region may be, for example, a circular or rectangular region which is located at the center of the right eye image 300A. In addition to a circular or rectangular region, for example, the focus determination region may be a circular region with a predetermined radius (in the example illustrated on the upper side of FIG. 13, the radius of a circle including the right eye image 300A (the right eye image 300A which is a column image indicating a column with a shorter object distance of two columns that are objects) and the left eye image 300B (the left eye image 300B which is a column image indicating a column with a shorter object distance of the two columns that are objects)) which has, as the center, an intersection point between a boundary line 311 between the right eye image 300A and the left eye image 300B and a perpendicular line which is drawn from the designated position 310 to the boundary line 311.

Then, in Step S807, the CPU 12 performs control such that the focus lens 302 starts to be moved at a predetermined moving speed (in this embodiment, 50 pixels/second) in the direction in which the focal position becomes closer to the imaging device 100 in the optical axis direction of the focus lens 302.

Then, in Step S809, determining whether the normal image 301 is in focus is repeatedly performed. When it is determined that the normal image is in focus, the process proceeds to Step S831 which will be described below. In the imaging device 100 according to this embodiment, for example, a phase difference between the pixels of the right eye image 300A (in the example illustrated on the upper side of FIG. 13, the right eye image 300A which is a column image indicating a column with a short object distance of two columns that are objects) and the left eye image 300B (in the example illustrated on the upper side of FIG. 13, the left eye image 300B which is a column image indicating a column with a short object distance of the two columns that are objects) in the focus determination region is calculated. When the calculated phase difference is within a predetermined range including 0 (zero), it is determined that the normal image is in focus.

At that time, in the imaging device 100 according to this embodiment, it is determined that the normal image is in focus when a main object is present in the focus determination region and a region (for example, in the example illustrated on the upper side of FIG. 13, the right eye image 300A which is a column image indicating a column with a short object distance of two columns (an example of a plurality of main objects) and the left eye image 300B which is a column image indicating a column with a short object distance of the two columns) corresponding to the main object (when there are a plurality of main objects, any one of the plurality of main objects) in the focus determination region is in focus.

Figure 20:
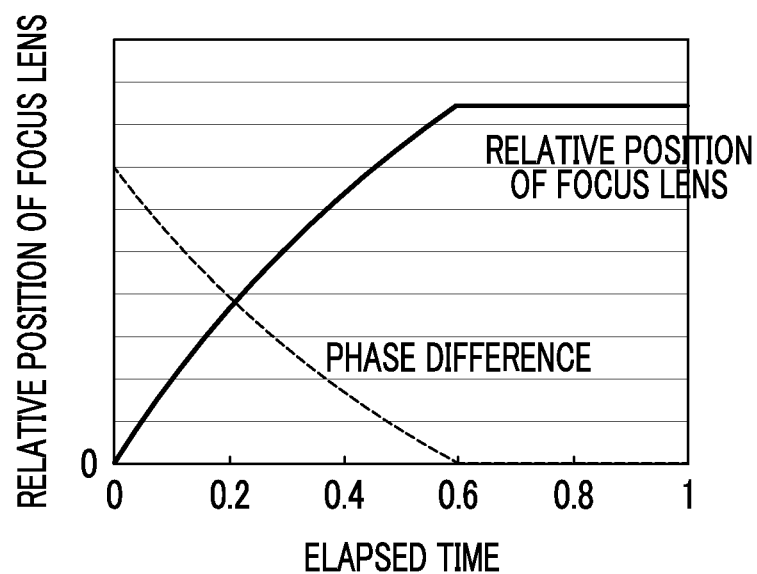
FIG. 20 is a graph illustrating the relationship between the elapsed time which is standardized with respect to the time from the start to the end of the movement of the focus lens and the position of the focus lens when focusing control is performed on the basis of a phase difference between the right eye image and the left eye image in the imaging device according to the first embodiment.

FIG. 20 is a graph illustrating an example of the relationship between the time elapsed from the start of the movement of the focus lens 302 and the relative position of the focus lens 302 in the imaging device 100 according to this embodiment. In the graph illustrated in FIG. 20, the horizontal axis indicates the time elapsed from the start of the movement of the focus lens 302 and the vertical axis indicates the relative position of the focus lens 302. In FIG. 20, similarly to FIG. 18, the time elapsed from the start of the movement of the focus lens 302 is standardized such that the time from the start to the end of the movement of the focus lens 302 is 1. In FIG. 20, the relative position of the focus lens 302 is a relative position when the position of the focus lens 302 is 0 (zero) during an operation of selecting the designated position 310.

For example, as illustrated in FIG. 20, in the imaging device 100 according to this embodiment, the focus lens 302 is moved to reduce the phase difference between the right eye image 300A and the left eye image 300B and the movement of the focus lens 302 is stopped at the position where the phase difference is 0 (zero).

As such, in this embodiment, it is determined that the normal image is in focus when the phase difference between the right eye image 300A and the left eye image 300B is 0 (zero). However, a method for determining whether the normal image 301 is in focus is not limited thereto.

Figure 21:
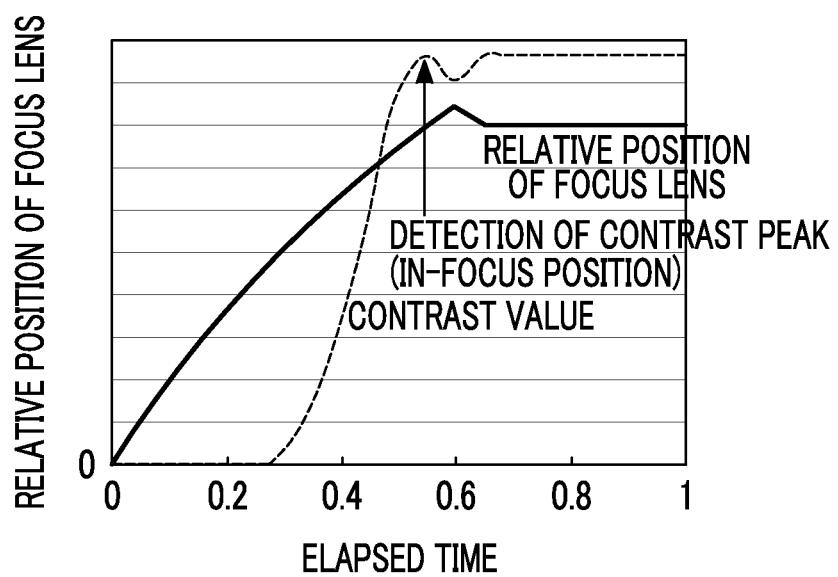
FIG. 21 is a graph illustrating the relationship between the elapsed time which is standardized with respect to the time from the start to the end of the movement of the focus lens and the position of the focus lens when focusing control is performed on the basis of the contrast of the right eye image and the left eye image in the imaging device according to the first embodiment.

FIG. 21 is a graph illustrating an example of the relationship between the time elapsed from the start of the movement of the focus lens 302 and the relative position of the focus lens 302 in the imaging device 100 according to this embodiment, similarly to FIG. 20. In the graph illustrated in FIG. 21, similarly to FIG. 20, the horizontal axis indicates the time elapsed from the start of the movement of the focus lens 302 and the vertical axis indicates the relative position of the focus lens 302. In FIG. 21, similarly to FIGS. 18 and 20, the time elapsed from the start of the movement of the focus lens 302 is standardized such that the time from the start to the end of the movement of the focus lens 302 is 1. In FIG. 21, the relative position of the focus lens 302 is a relative position when the position of the focus lens 302 is 0 (zero) during the operation of selecting the designated position 310.

For example, as illustrated in FIG. 21, the contrast value of the split image 300 is calculated while the focus lens 302 is being moved and the movement of the focus lens 302 is stopped at the position where the contrast value is the maximum.

As such, in this embodiment, focus determination is performed on the basis of the contrast value of the split image 300. However, the invention is not limited thereto. For example, focus determination may be performed on the basis of the contrast value of the normal image 301.

When the focus state of the normal image 301 is checked, the use of the phase difference between the right eye image 300A and the left eye image 300B makes it possible to rapidly check the focus state. In contrast, the use of the contrast value makes it possible to accurately check the focus state.

In Step S811, similarly to Step S805, a focus determination region which is a region for checking the focus state on the right eye image 300A is determined.

Then, in Step S813, similarly to Step S807, the CPU 12 performs control such that the focus lens 302 starts to be moved at a predetermined moving speed (in this embodiment, 50 pixels/second) in the direction in which the focal position becomes further away from the imaging device 100 in the optical axis direction of the focus lens 302.

Then, in Step S815, similarly to Step S809, determining whether the normal image 301 is in focus is repeatedly performed. When it is determined that the normal image 301 is in focus, the process proceeds to Step S831 which will be described below.

In Step S817, it is determined whether the moving operation in the touch operation detected in Step S405 is a moving operation in the left direction. When the determination result in Step S817 is "Yes", the process proceeds to Step S819. On the other hand, when the determination result in Step S817 is "No", the moving operation is regarded as a moving operation in the right direction and the process proceeds to Step S825 which will be described below.

Then, in Step S819, similarly to Step S805, a focus determination region which is a region for checking the focus state on the left eye image 300B is determined.

Then, in Step S821, similarly to Step S807, the CPU 12 performs control such that the focus lens 302 starts to be moved at a predetermined moving speed (in this embodiment, 50 pixels/second) in the direction in which the focal position becomes closer to the imaging device 100 in the optical axis direction of the focus lens 302.

Then, in Step S823, similarly to Step S809, determining whether the normal image 301 is in focus is repeatedly performed. When it is determined that the normal image 301 is in focus, the process proceeds to Step S831 which will be described below.

In Step S825, similarly to Step S805, a focus determination region which is a region for checking the focus state on the left eye image 300B is determined.

Then, in Step S827, similarly to Step S807, the CPU 12 performs control such that the focus lens 302 starts to be moved at a predetermined moving speed (in this embodiment, 50 pixels/second) in the direction in which the focal position becomes further away from the imaging device 100 in the optical axis direction of the focus lens 302.

Then, in Step S829, similarly to Step S809, determining whether the normal image 301 is in focus is repeatedly performed. When it is determined that the normal image 301 is in focus, the process proceeds to Step S831 which will be described below.

In Step S831, the movement of the focus lens 302 started by any one of Steps S807, S813, S821, and S827 is stopped and the flick processing routine program ends.

Figure 22:
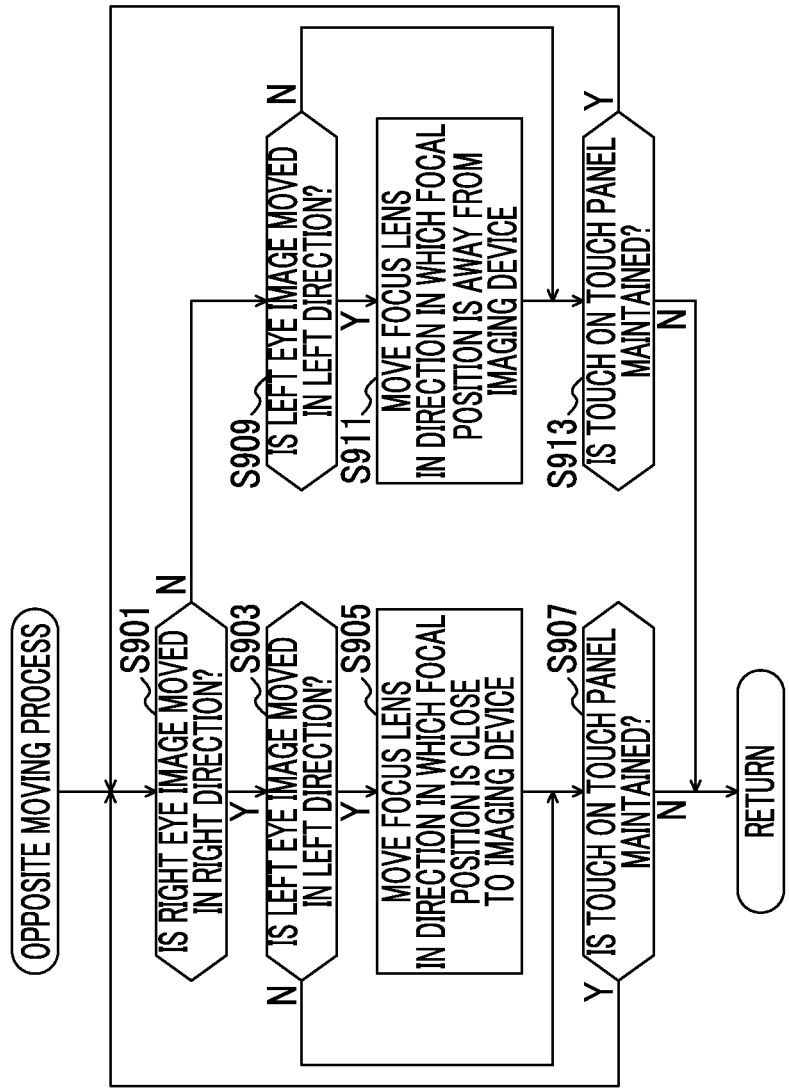
FIG. 22 is a flowchart illustrating the flow of the process of an opposite movement processing routine program according to the first embodiment.

Next, the operation of the imaging device 100 when the opposite moving process is performed will be described with reference to FIG. 22. FIG. 22 is a flowchart illustrating the flow of the process of the opposite movement processing routine program executed by the CPU 12 while the imaging control processing program is being executed. In this embodiment, the program is stored in a predetermined storage area of the memory 26 in advance.

In Step S901, it is determined whether a moving operation for the right eye image 300A in the touch operation detected in Step S405 is a moving operation in the right direction. When the determination result in Step S901 is "Yes", the process proceeds to Step S903. On the other hand, when the determination result in Step S901 is "No", the moving operation is regarded as a moving operation in the left direction and the process proceeds to Step S909 which will be described below.

In Step S903, it is determined whether a moving operation for the left eye image 300B in the touch operation detected in Step S405 is a moving operation in the left direction. When the determination result in Step S903 is "Yes", the process proceeds to Step S905. On the other hand, when the determination result in Step S903 is "No", the process proceeds to Step S907.

Then, in Step S905, similarly to Step S507, the focus lens 302 is moved in the direction in which the focal position becomes closer to the imaging device 100 in the optical axis direction of the focus lens 302.

Figure 23:
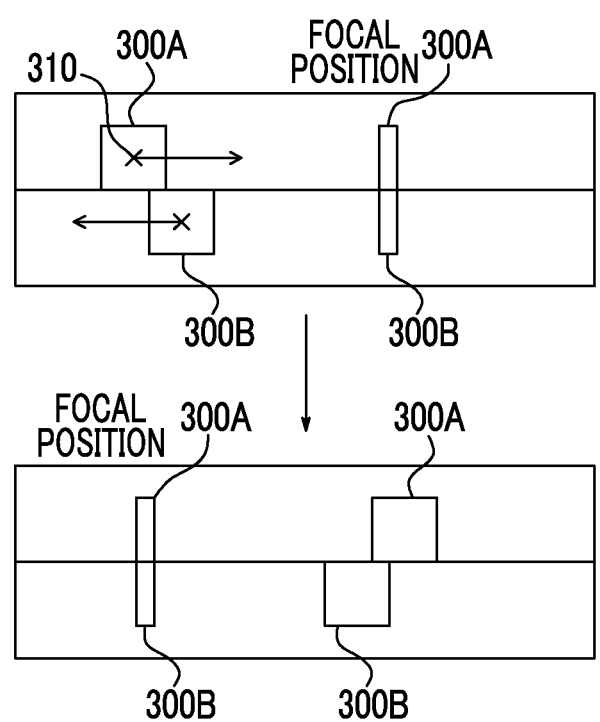
FIG. 23 is a front view illustrating an example of the display state of the split image when an opposite moving operation is performed in the imaging device according to the first embodiment.

For example, as illustrated on the upper side of FIG. 23, in the back-focused state, it is assumed that the designated position 310 on the right eye image 300A is moved to the right and the designated position 310 on the left eye image 300B is moved to the left by the operation of the user through the touch panel 215. In this case, as illustrated on the lower side of FIG. 23, the CPU 12 moves the focus lens 302 in the direction in which the focal position becomes closer to the imaging device 100 along the optical axis direction such that the focus of the focus lens 302 becomes closer to the in-focus position.

Then, in Step S907, it is determined whether the touch on the touch panel 215 in the touch operation detected in Step S405 is maintained. When the determination result in Step S907 is "Yes", the process returns to Step S901. On the other hand, when the determination result in Step S907 is "No", the opposite movement processing routine program ends and the process proceeds to Step S425 in the imaging control processing program (main routine).

In Step S909, it is determined whether the moving operation for the left eye image 300B in the touch operation detected in Step S405 is a moving operation in the right direction. When the determination result in Step S909 is "Yes", the process proceeds to Step S911. On the other hand, when the determination result in Step S909 is "No", the process proceeds to Step S913 which will be described below.

Then, in Step S911, similarly to Step S515, the focus lens 302 is moved in the direction in which the focal position becomes further away from the imaging device 100 in the optical axis direction of the focus lens 302.

Figure 24:
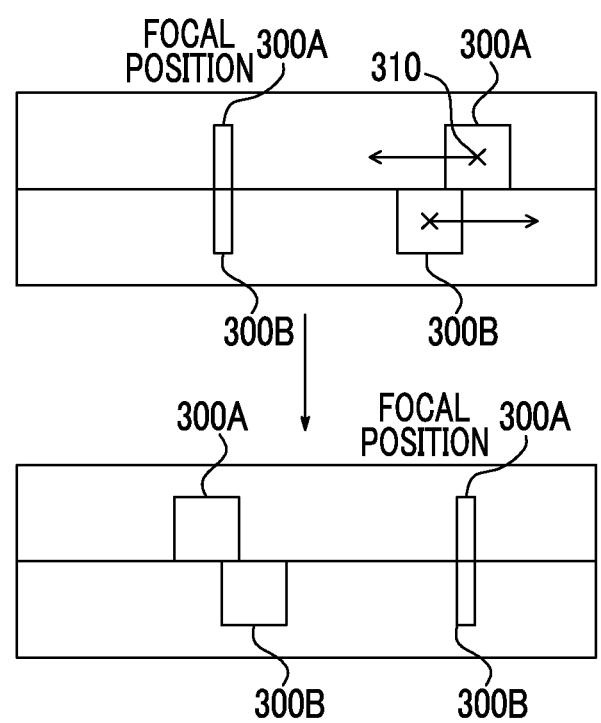
FIG. 24 is a front view illustrating another example of the display state of the split image when the opposite moving operation is performed in the imaging device according to the first embodiment.

For example, as illustrated on the upper side of FIG. 24, in the front-focused state, it is assumed that the designated position 310 on the right eye image 300A is moved to the left and the designated position 310 on the left eye image 300B is moved to the right by the operation of the user through the touch panel 215. In this case, as illustrated on the lower side of FIG. 24, the CPU 12 moves the focus lens 302 in the direction in which the focal position becomes further away from the imaging device 100 along the optical axis direction of the focus lens 302 such that the focus of the focus lens 302 becomes closer to the in-focus position.

Then, in Step S913, it is determined whether the touch on the touch panel 215 in the touch operation detected in Step S405 is maintained. When the determination result in Step S913 is "Yes", the process returns to Step S901. On the other hand, when the determination result in Step S913 is "No", the opposite movement processing routine program ends and the process proceeds to Step S425 in the imaging control processing program (main routine).

Figure 25A:
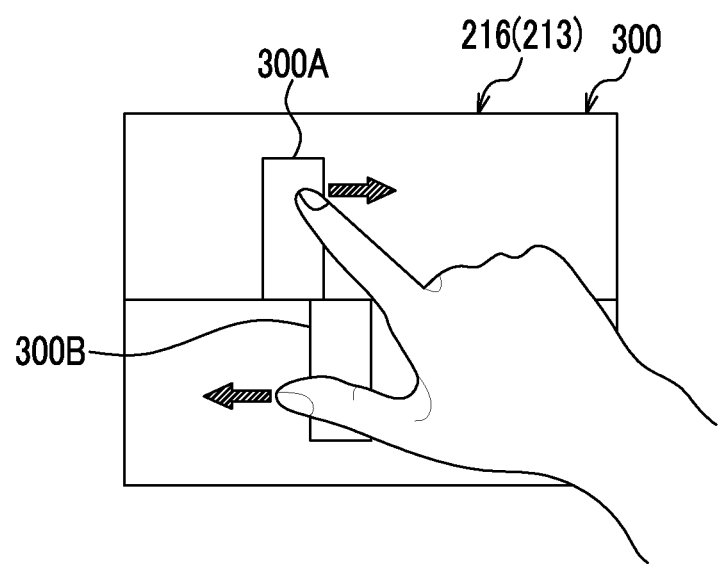
FIG. 25A is a front view illustrating a state in which the opposite moving operation is performed in the imaging device according to the first embodiment.
Figure 25B:
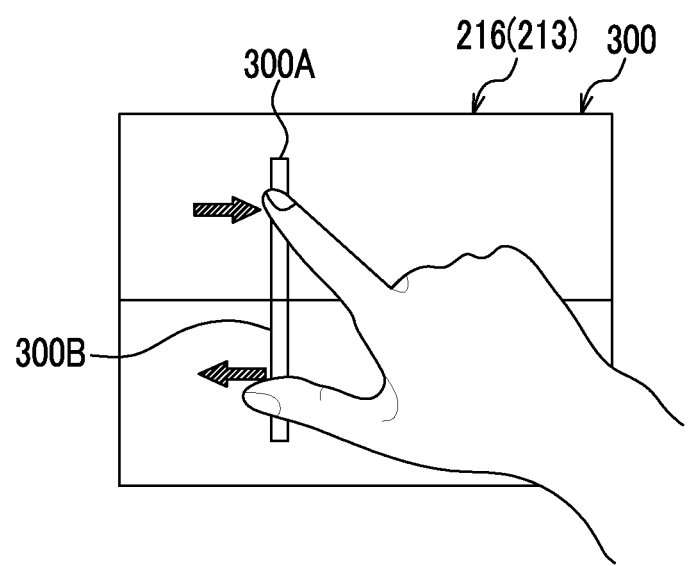
FIG. 25B is a front view illustrating the state in which the opposite moving operation is performed in the imaging device according to the first embodiment.

As such, for example, as illustrated in FIG. 25A, the user touches the right eye image 300A and the left eye image 300B with two fingers and moves the right eye image 300A and the left eye image 300B such that the positions thereof are aligned with each other in the intersection direction. At that time, the focus lens 302 is moved according to the positional relationship between the right eye image 300A and the left eye image 300B in the intersection direction. For example, as illustrated in FIG. 25B, when the positions of the right eye image 300A and the left eye image 300B are aligned with each other in the intersection direction, a captured image is focused by the focus lens 302. As such, the user can perform an intuitive operation using the split image 300 to perform focus control.

Figure 26:
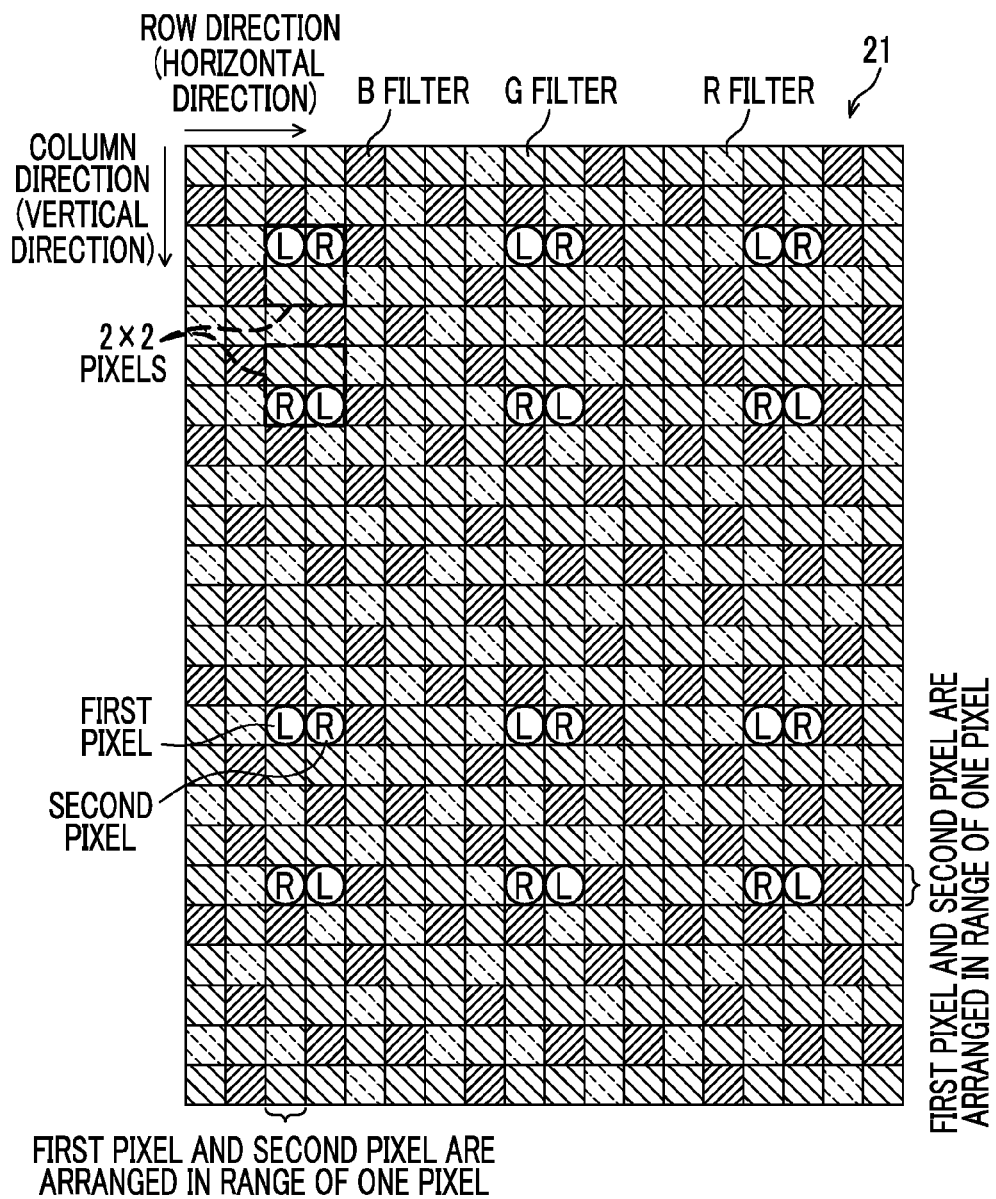
FIG. 26 is a diagram schematically illustrating an example of the array of color filters and the arrangement of light shielding members in the imaging element of the imaging device according to the first embodiment.
Figure 27:
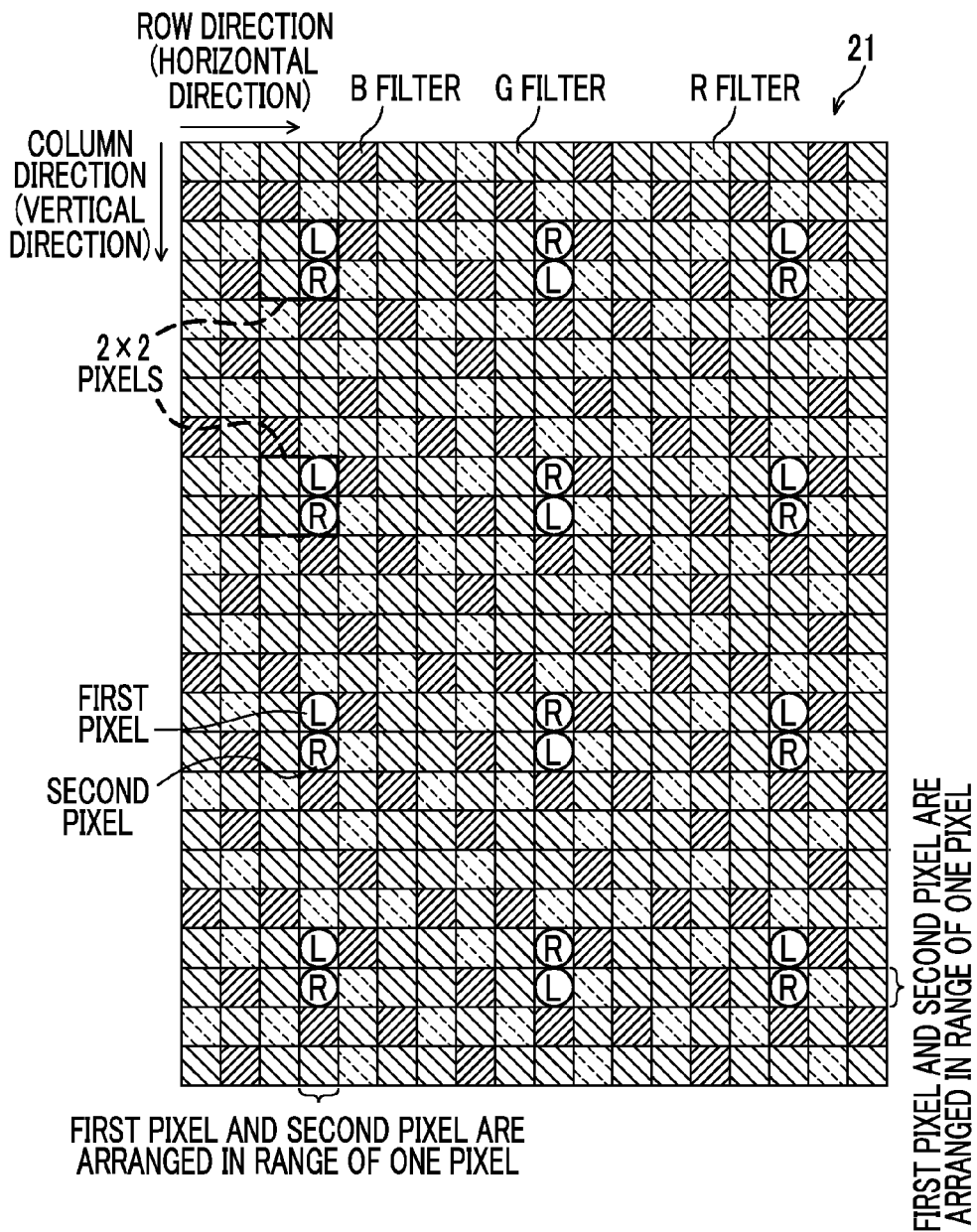
FIG. 27 is a diagram schematically illustrating an example of the array of color filters and the arrangement of light shielding members in the imaging element of the imaging device according to the first embodiment.

In the first embodiment, a single phase difference pixel is arranged for the G filters of 2×2 pixels. However, the invention is not limited thereto. For example, a pair of a first pixel L and a second pixel R may be provided for the G filters of the 2×2 pixels. For example, as illustrated in FIG. 26, a pair of the first pixel L and the second pixel R which are adjacent to each other in a row direction may be provided for the G filters of the 2×2 pixels. In addition, for example, as illustrated in FIG. 27, a pair of the first pixel L and the second pixel R which are adjacent to each other in a column direction may be provided for the G filters of the 2×2 pixels. In any case, as described in the first embodiment, it is preferable that the first pixel L and the second pixel R are located in the range of a predetermined number of pixels in at least one of the column direction and the row direction in the first pixel group and the second pixel group. FIGS. 26 and 27 illustrate an example in which the first pixel L and the second pixel R are arranged so as to be located in the range of one pixel in each of the column direction and the row direction in the first pixel group and the second pixel group.

Figure 28:
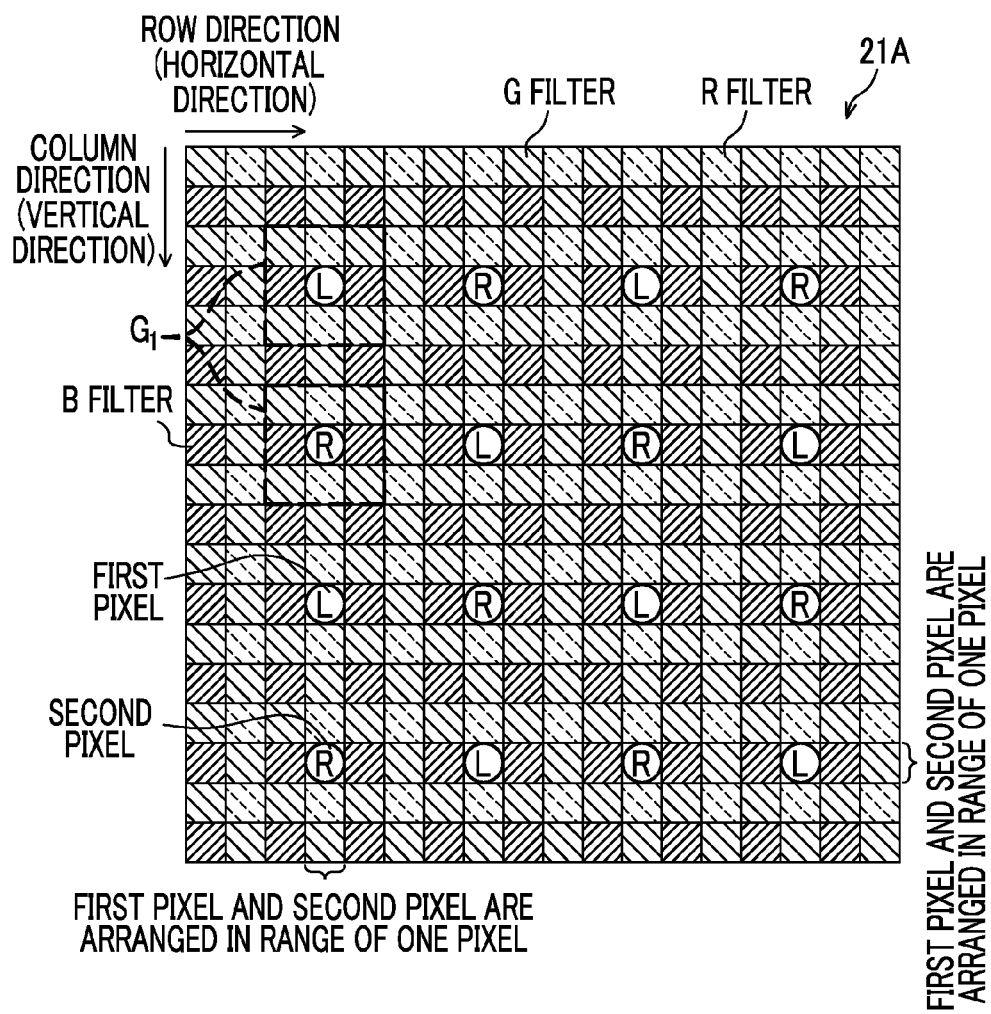
FIG. 28 is a diagram schematically illustrating an example of the array of color filters and the arrangement of light shielding members in the imaging element of the imaging device according to the first embodiment.
Figure 29:
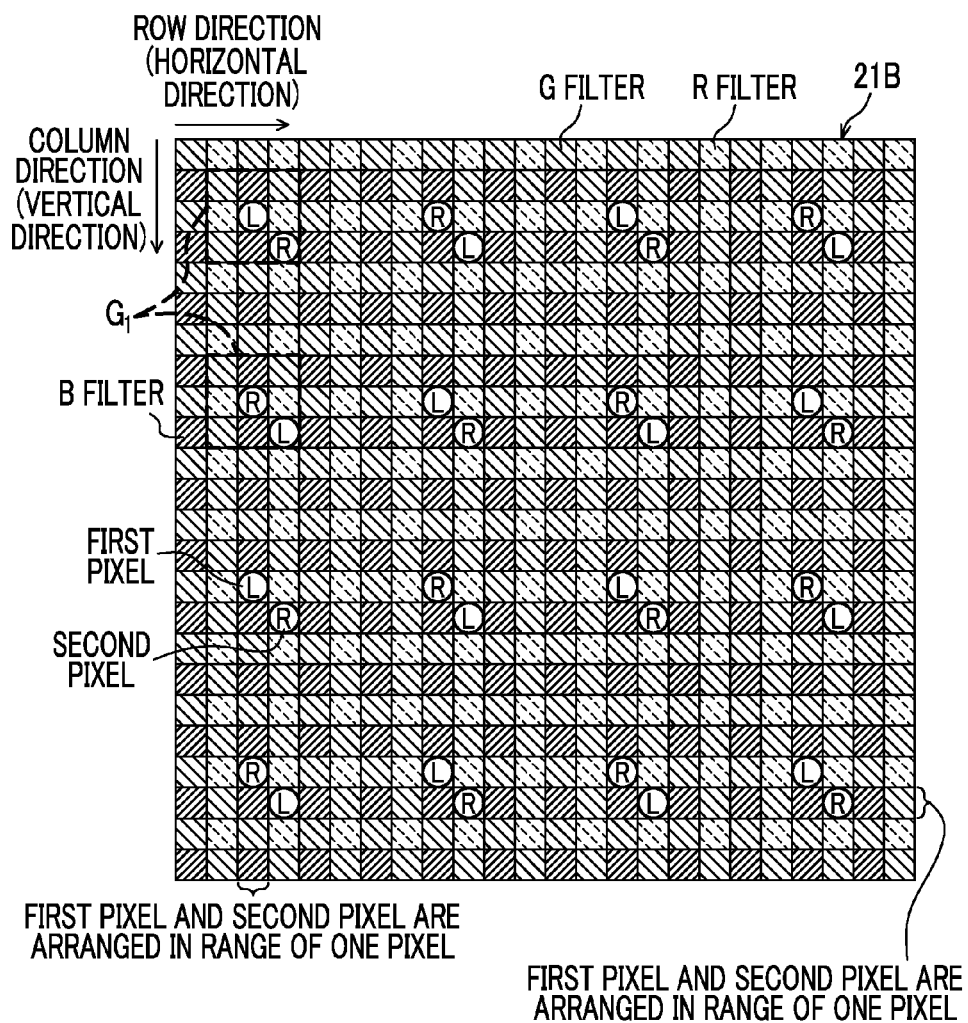
FIG. 29 is a diagram schematically illustrating an example of the array of color filters and the arrangement of light shielding members in the imaging element of the imaging device according to the first embodiment.
Figure 30:
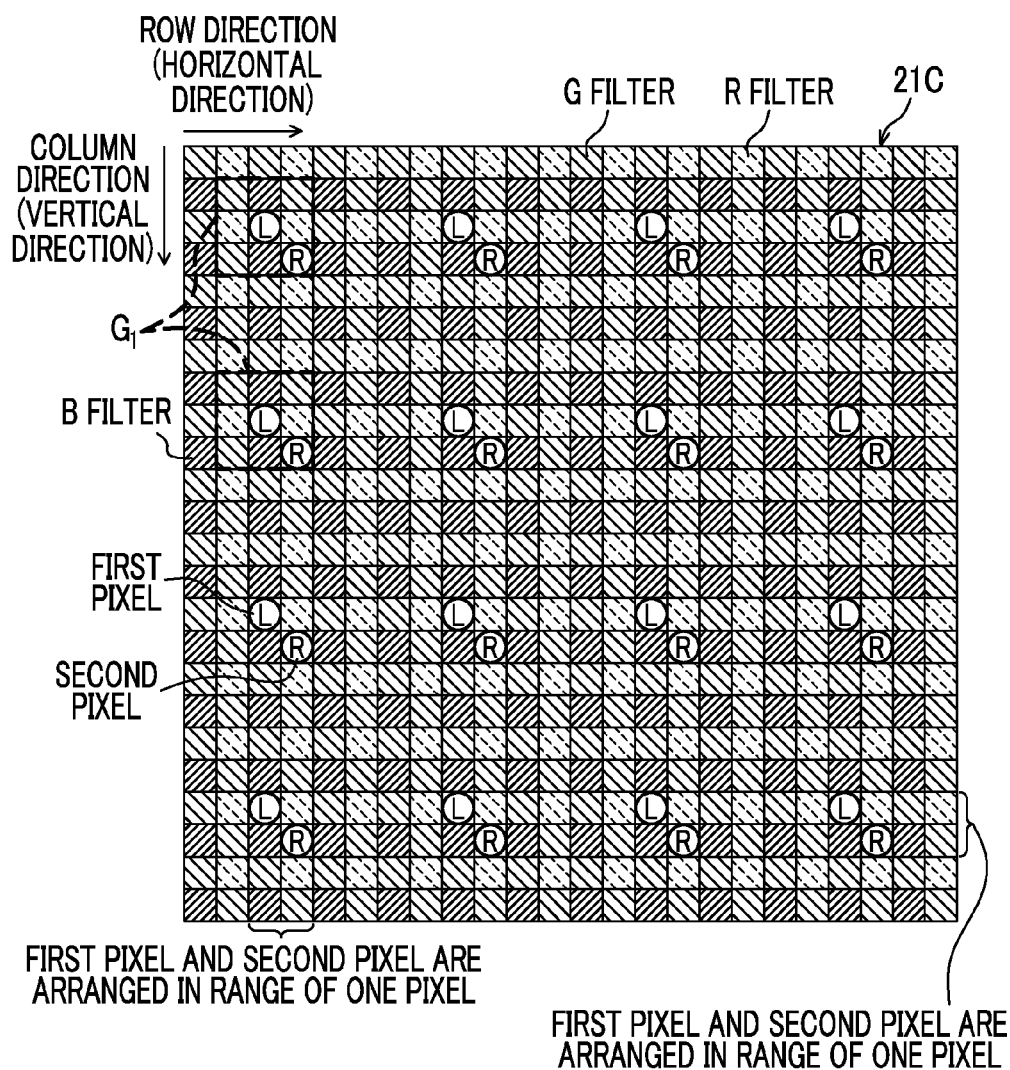
FIG. 30 is a diagram schematically illustrating an example of the array of color filters and the arrangement of light shielding members in the imaging element of the imaging device according to the first embodiment.

In the first embodiment, the color filter 21 is given as an example. However, the invention is not limited thereto. For example, as illustrated in FIGS. 28 to 30, the primary colors of color filters (an R filter, a G filter, and a B filter) may be arranged in a Bayer array. In the examples illustrated in FIGS. 28 to 30, the phase difference pixel is provided for the G filter.

For example, in a color filter 21A illustrated in FIG. 28, the phase difference pixel is arranged at the center of an array pattern G1 in which the G filters are provided at four corners and the center of a square matrix of 3×3 pixels. In addition, the first pixel L and the second pixel R are alternately arranged in the row direction and the column direction, with the G filter corresponding to one pixel interposed therebetween (such that the G filter corresponding to one pixel is interposed between the first pixel L and the second pixel R). In addition, the first pixel L and the second pixel R are arranged so as to be located in the range of one pixel in the column direction and the row direction in the first pixel group and the second pixel group. According to this structure, an image based on the phase difference pixel which is provided at the center of the array pattern G1 can be interpolated using an image based on the normal pixels which are provided at four corners of the array pattern G1. Therefore, it is possible to improve the accuracy of interpolation, as compared to a case in which the structure according to the invention is not provided.

In addition, the array patterns G1 do not overlap each other. That is, the first pixel L and the second pixel R are arranged at the position where the pixels included in the first and second images that are interpolated using the third image based on the pixels which are included in the third pixel group and are adjacent to each pixel included in the first and second pixel groups do not overlap each other in the unit of pixels. Therefore, it is possible to prevent an image based on a phase difference pixel from being interpolated using an image based on the normal pixels which are used to interpolate an image based on another phase difference pixel. Therefore, the accuracy of interpolation is expected to be further improved.

For example, in a color filter 21B illustrated in FIG. 29, the phase difference pixels are arranged at the center and the lower right corner of an array pattern G1 in the front view of FIG. 29. In addition, the first pixel L and the second pixel R are alternately arranged in the row direction and the column direction, with the G filters corresponding to two pixels interposed therebetween (such that the G filters corresponding to two pixels are interposed between the first pixel L and the second pixel R). Therefore, the first pixel L and the second pixel R are arranged so as to be located in the range of one pixel in the column direction and the row direction in the first pixel group and the second pixel group. The first pixel L and the second pixel R can be adjacent to each other. As a result, it is possible to prevent the occurrence of image deviation caused by factors other than defocus.

In addition, since the normal pixels provided with the filters (G filters) of the same color are adjacent to each phase difference pixel, it is possible to improve the accuracy of interpolation. The array patterns G1 do not overlap each other. That is, the first pixel L and the second pixel R are arranged at the position where pairs of pixels included in the first and second images that are interpolated using the third image based on the pixels which are included in the third pixel group and are adjacent to each pixel included in the first and second pixel groups do not overlap each other. Here, the term "pair of pixels" indicates, for example, a pair of the first pixel L and the second pixel R (a pair of phase difference pixels) included in each array pattern G1. Therefore, it is possible to prevent an image based on a pair of phase difference pixels from being interpolated with an image based on the normal pixels which are used to interpolate an image based on another pair of phase difference pixels. Therefore, the accuracy of interpolation is expected to be further improved.

For example, in a color filter 21C illustrated in FIG. 30, the first pixel L is arranged at the center of an array pattern G1 and the second pixel R is arranged at the lower right corner in the front view of FIG. 30. In addition, the first pixels L are arranged in the row direction and the column direction, with the G filters corresponding to two pixels interposed therebetween, and the second pixels R are arranged in the row direction and the column direction, with the G filters corresponding to two pixels interposed therebetween. Therefore, the first pixel L and the second pixel R are arranged so as to be located in the range of two pixels in the column direction and the row direction in the first pixel group and the second pixel group. The first pixel L and the second pixel R can be adjacent to each other. As a result, it is possible to prevent the occurrence of image deviation caused by factors other than defocus.

In addition, in the example illustrated in FIG. 30, similarly to the example illustrated in FIG. 29, the array patterns G1 do not overlap each other. Therefore, it is possible to prevent an image based on a phase difference pixel from being interpolated with an image based on the normal pixels which are used to interpolate an image based on another phase difference pixel. Therefore, the accuracy of interpolation is expected to be further improved.

Figure 31:
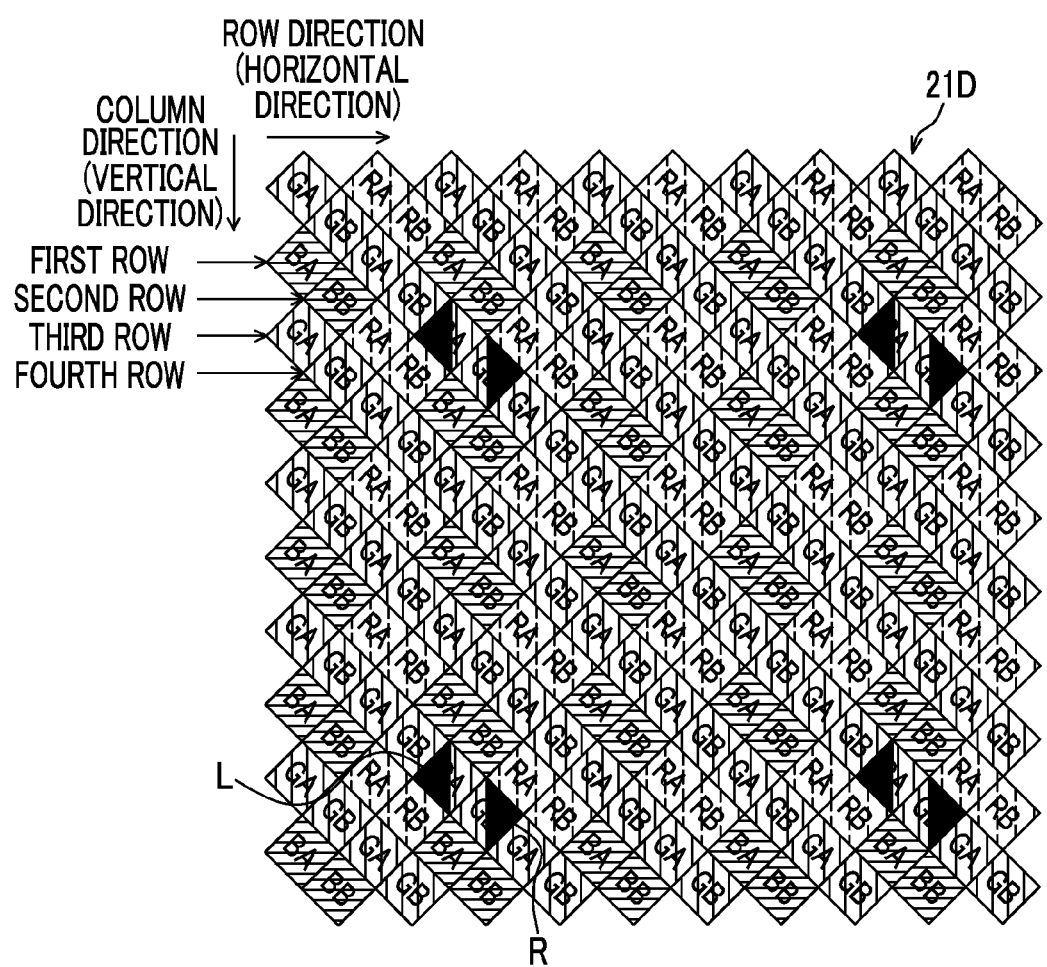
FIG. 31 is a diagram schematically illustrating an example of the array of color filters and the arrangement of light shielding members in the imaging element of the imaging device according to the first embodiment.

For example, a color filter 21D illustrated in FIG. 31 is given as another example of the structure of the color filter. FIG. 31 schematically illustrates an example of the array of the primary colors (an R filter, a G filter, and a B filter) of the color filter 21D and the arrangement of light shielding members in the imaging element 20. In the color filter 21D illustrated in FIG. 31, first to fourth rows are repeatedly arranged in the column direction. The first row means a row in which the B filter and the G filter are alternately arranged in the row direction. The second row means a row which is shifted from the first row by a half pitch (a distance corresponding to half of the pixel) in the row direction. The third row means a row in which the G filter and the R filter are alternately arranged in the row direction. The fourth row means a row which is shifted from the third row by a half pitch in the row direction.

The first row and the second row are adjacent to each other so as to be shifted by a half pitch in the column direction. The second row and the third row are adjacent to each other so as to be shifted by a half pitch in the column direction. The third row and the fourth row are adjacent to each other so as to be shifted by a half pitch in the column direction. The fourth row and the first row are adjacent to each other so as to be shifted by a half pitch in the column direction. Therefore, the first to fourth rows repeatedly appear every two pixels in the column direction.

For example, as illustrated in FIG. 31, the first pixel L and the second pixel R are allocated to the third and fourth rows, respectively. That is, the first pixel L is allocated to the third row and the second pixel R is allocated to the fourth row. The first pixel L and the second pixel R form a pair and are arranged adjacent to each other (at the minimum pitch). In addition, in the example illustrated in FIG. 31, the first pixel L is allocated to every six pixels in the row direction and the column direction and the second pixel R is allocated to every six pixels in the row direction and the column direction. According to this structure, the phase difference between the first pixel group and the second pixel group is calculated with higher accuracy than in a case in which the structure according to the invention is not provided.

In the example illustrated in FIG. 31, the G filter is allocated to the first pixel L and the second pixel R. Since the pixel provided with the G filter has a higher sensitivity than pixels provided with the filters of the other colors, it is possible to improve the accuracy of interpolation. In addition, since the G filter has continuity as compared to the filters of the other colors, the pixel having the G filter allocated thereto is easier to interpolate than the pixels having the filters of the other colors allocated thereto.

In the first embodiment, the split image is divided into two images in the up-down direction. However, the invention is not limited thereto. The split image may be divided into a plurality of images in the left-right direction or the oblique direction.

Figure 32:
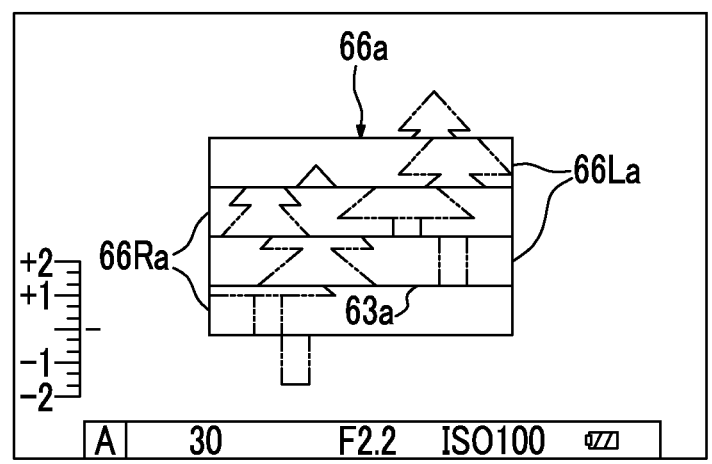
FIG. 32 is a front view illustrating an example of a method for dividing a display region of the split image according to the first embodiment.

For example, a split image 66a illustrated in FIG. 32 is divided into odd-numbered lines and even-numbered lines by a plurality of boundary lines 63a which are parallel to each other in the row direction. In the split image 66a, a linear (for example, a strip-shaped) phase difference image 66La which is generated on the basis of an output signal from the first pixel group is displayed in the odd-numbered line (can also be displayed in the even-numbered line). In addition, a linear (for example, a strip-shaped) phase difference image 66Ra which is generated on the basis of an output signal from the second pixel group is displayed in the even-numbered line.

Figure 33:
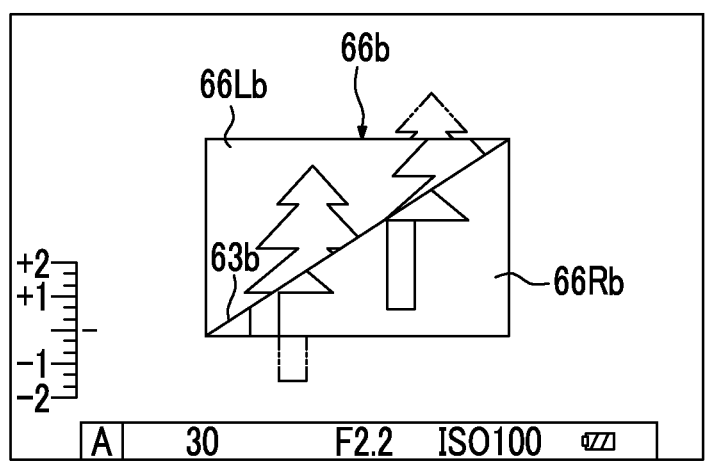
FIG. 33 is a front view illustrating an example of the method for dividing the display region of the split image according to the first embodiment.

A split image 66b illustrated in FIG. 33 is divided into two images by a boundary line 63b (for example, a diagonal line of the split image 66b) which has an angle of inclination in the row direction. In the split image 66b, a phase difference image 66Lb which is generated on the basis of an output signal from the first pixel group is displayed in one region.

In addition, a phase difference image 66Rb which is generated on the basis of an output signal from the second pixel group is displayed in the other region.

Figure 34A:
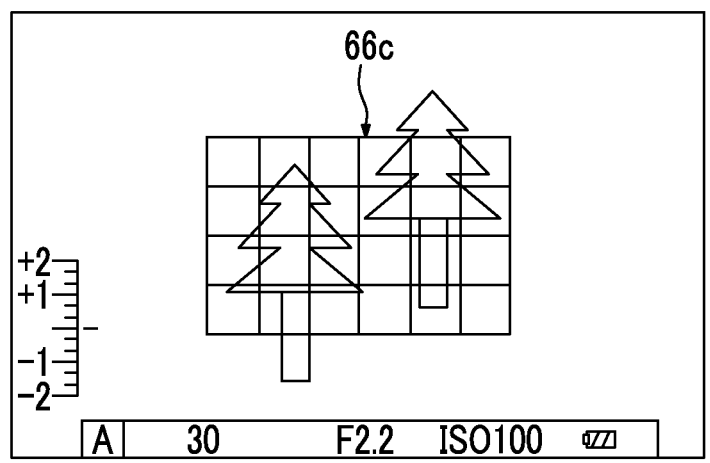
FIG. 34A is a front view illustrating an example of the method for dividing the display region of the split image according to the first embodiment.
Figure 34B:
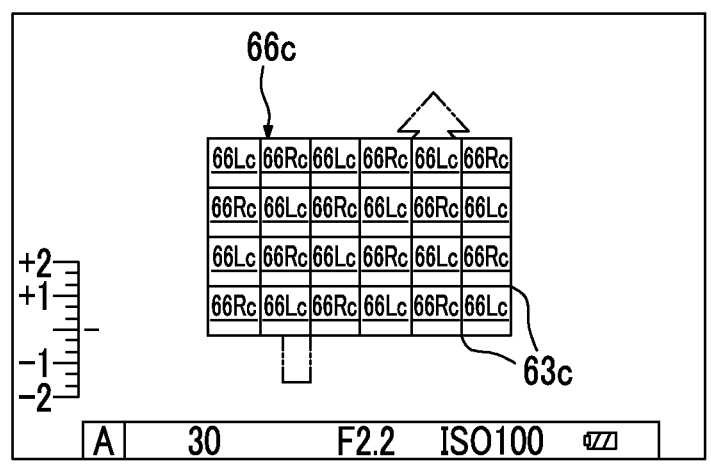
FIG. 34B is a front view illustrating an example of the method for dividing the display region of the split image according to the first embodiment.

A split image 66c illustrated in FIGS. 34A and 34B is divided by lattice-shaped boundary lines 63c which are parallel in the row direction and the column direction. In the split image 66c, phase difference images 66Lc which are generated on the basis of an output signal from the first pixel group are arranged in a checker pattern and then displayed. In addition, phase difference images 66Rc which are generated on the basis of an output signal from the second pixel group are arranged in a checker pattern and then displayed.

The split image is not limited thereto. A different focus check image may be generated from two phase difference images and then displayed. For example, two phase difference images may be superimposed and a composite image may be displayed. When the image is out of focus, it may be displayed as a double image. When the image is in focus, it may be clearly displayed.

Second Embodiment

In the first embodiment, in the scroll process, the designated position is moved in the direction of the parallax (horizontal direction) between the right eye image and the left eye image of the split image. However, the moving direction is not limited thereto. In this embodiment, a case in which an operation (circular motion) of moving the designated position in a circle as a modification of the moving direction is performed will be described in detail with reference to the drawings.

Since this embodiment has the same structure and operation as the first embodiment, the detailed description of the same structure and operation will not be repeated.

Figure 35:
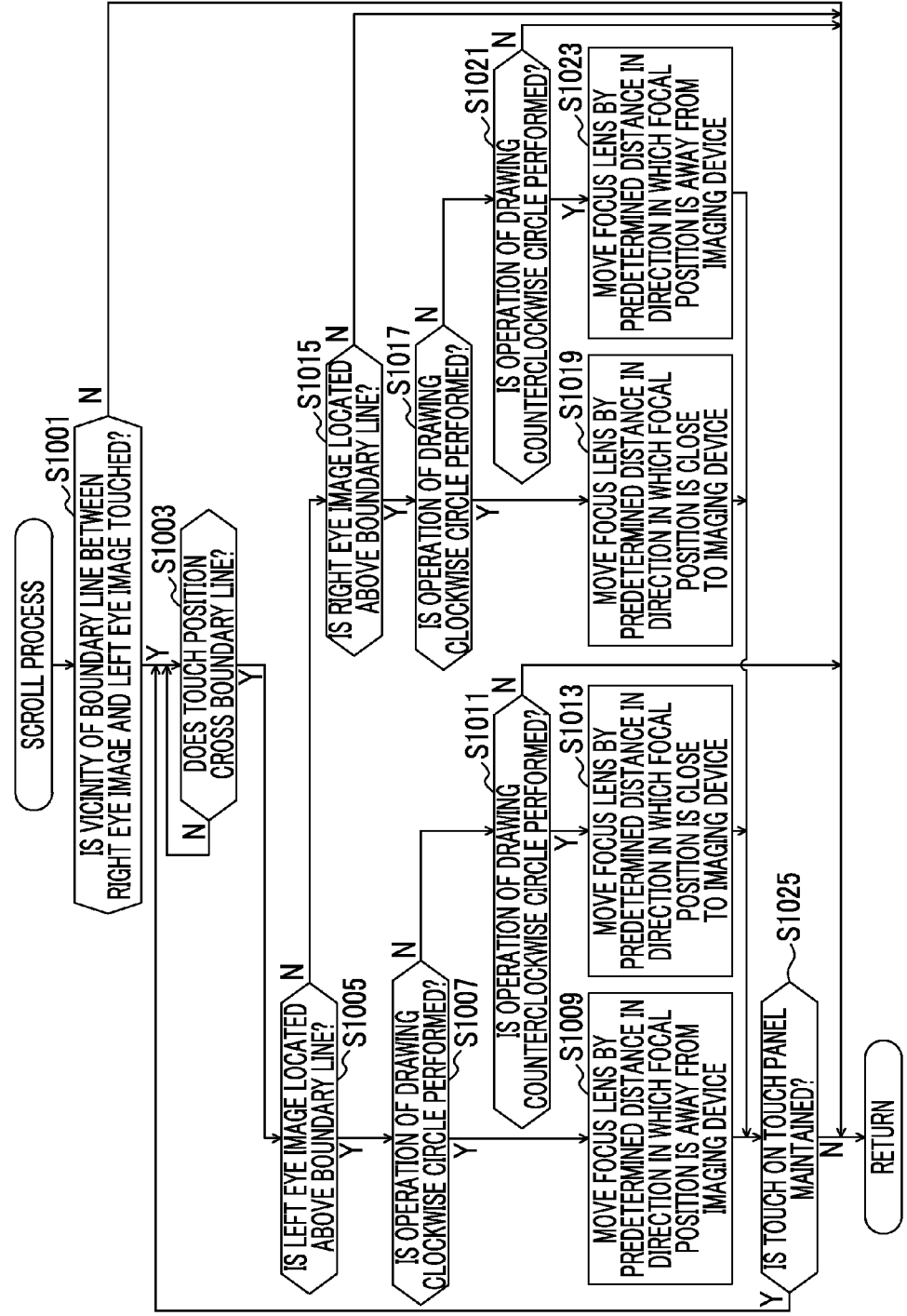
FIG. 35 is a flowchart illustrating the flow of the process of a scroll processing routine program according to a second embodiment.

An imaging control process according to this embodiment differs from the imaging control process (see FIG. 1) according to the first embodiment in that a scroll process illustrated in FIG. 35 is performed instead of the scroll process in Step S415 (see FIG. 12). FIG. 35 is a flowchart illustrating the flow of the process of a scroll processing routine program according to this embodiment which is executed by the CPU 12 while the imaging control processing program is being executed. In this embodiment, the program is stored in a predetermined storage area of the memory 26 in advance.

First, in Step S1001, it is determined whether the touch operation detected in Step S405 is a touch on the vicinity of a boundary line 311 (see FIG. 36) between the right eye image 300A and the left eye image 300B. In this embodiment, a range (a predetermined range across the boundary line 311) which has a width in the division direction and includes the boundary line 311 between the right eye image 300A and the left eye image 300B is predetermined. When the touched position is within this range, it is determined that the touch operation detected in Step S405 is a touch on the vicinity of the boundary line 311. A method for determining whether the touch operation is a touch on the vicinity of the boundary line 311 is not limited thereto. For example, a focus determination region may be determined as described in the first embodiment and it may be determined whether the boundary line 311 is included in the focus determination region.

When the determination result in Step S1001 is "Yes", the process proceeds to Step S1003. On the other hand, when the determination result in Step S1001 is "No", the scroll processing routine program ends and the process proceeds to Step S425 in the imaging control processing program (main routine).

In Step S1003, it is determined whether a touch position (designated position) crosses the boundary line 311. When the determination result is "No", the process is in a standby state. On the other hand, when the determination result is "Yes", the process proceeds to Step S1005.

Figure 36:
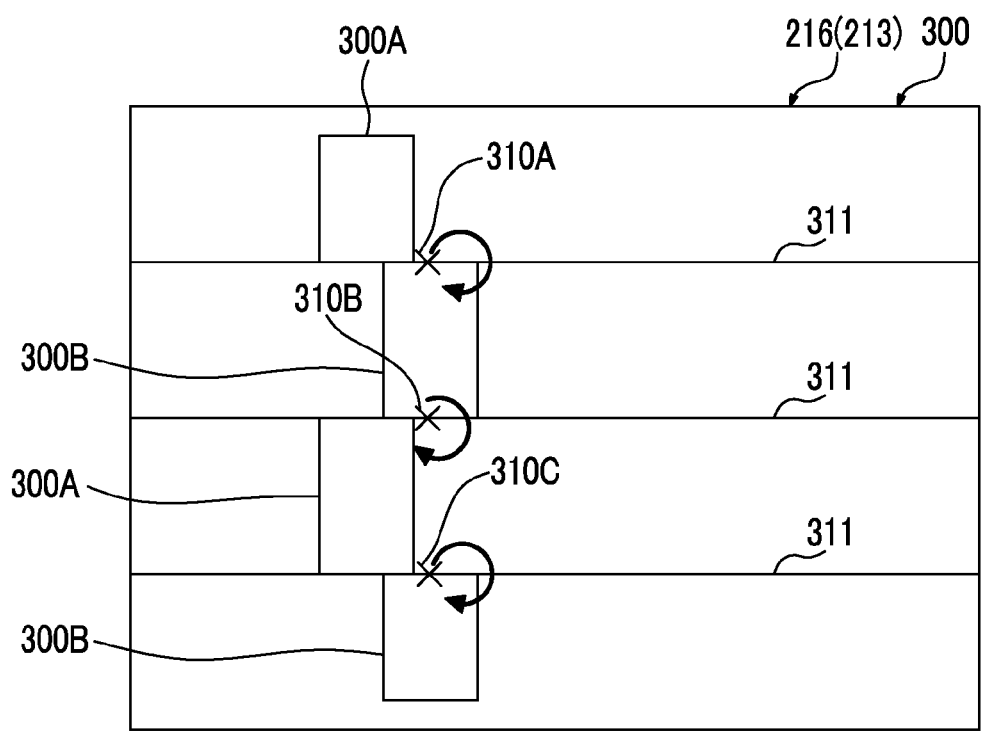
FIG. 36 is a front view illustrating an example of the display state of a split image when a scroll operation is performed in an imaging device according to the second embodiment.

In Step S1005, it is determined whether the left eye image 300B is located in a region above the boundary line 311. FIG. 36 is a front view illustrating an example of the display state of the split image when the scroll operation is performed in the imaging device 100 according to this embodiment. In addition, FIG. 36 illustrates a case in which a plurality of divided images are applied as the split image 300, similarly to the split image 66a according to the first embodiment illustrated in FIG. 33. For example, in the case illustrated in FIG. 36, when the touch position is a designated position 310B, the left eye image 300B is located in the region above the boundary line 311.

When the determination result in Step S1005 is "Yes", the process proceeds to Step S1007. On the other hand, when the determination result in Step S1005 is "No", the process proceeds to Step S1015.

In Step S1007, it is determined whether the touch operation is an operation of drawing a clockwise circle. In this embodiment, for example, the locus of the designated position 310 (the touch position of the user) is detected and it is detected whether the touch operation is an operation of drawing a circle and whether the circle is a clockwise circle or a counterclockwise circle, on the basis of the locus. When the determination result is "Yes" on the basis of the detection result, the process proceeds to Step S1009. On the other hand, when the detection result is "No", the process proceeds to Step S1011. FIG. 36 illustrates the locus when an operation of drawing a clockwise circle is performed.

In Step S1009, the CPU 12 moves the focus lens 302 by a predetermined distance in a direction (a direction in which the focal position becomes further away from the imaging device 100) in which the focus lens 302 becomes focused on an object further away from the imaging device than the current in-focus position in the optical axis direction of the focus lens 302. In the imaging device 100 according to this embodiment, for example, the distance of the focus lens 302 moved by one rotating operation is predetermined. As such, in the imaging device 100 according to this embodiment, when the scroll operation of drawing a clockwise circle is performed, with the left eye image 300B located in the region above the boundary line 311, this is regarded as the same operation as that when the left eye image 300B is scrolled in the right direction in the first embodiment.

Figure 37:
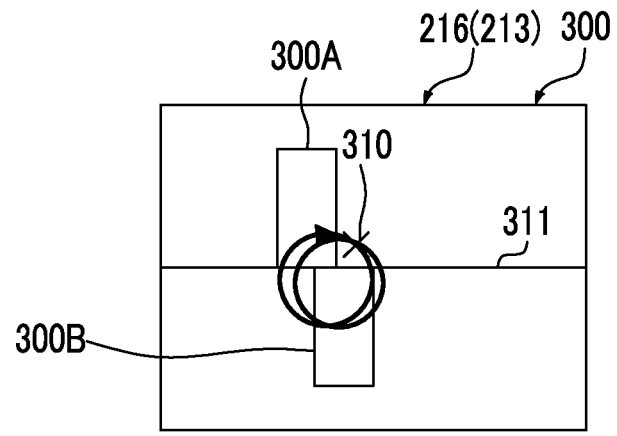
FIG. 37 is a front view illustrating an example of the display state of the split image when a scroll operation of drawing a circle (in the clockwise direction) is repeatedly performed in the imaging device according to the second embodiment.

Then, in Step S1025, it is determined whether the touch on the touch panel 215 in the touch operation detected in Step S405 is maintained. FIG. 37 is a front view illustrating an example of the display state of the split image when the scroll operation of drawing a circle (clockwise) is repeatedly performed. As in the example illustrated in FIG. 37, when the scroll operation of drawing a circle (clockwise) is repeatedly performed, the determination result is "Yes". When the determination result in Step S1025 is "Yes", the process returns to Step S1003. On the other hand, when the determination result in Step S1025 is "No", the scroll processing routine program ends and the process proceeds to Step S425 in the imaging control processing program (main routine).

In Step S1011, it is determined whether the touch operation is an operation of drawing a counterclockwise circle, contrary to Step S1007. In this embodiment, as described above, for example, the locus of the designated position 310 (the touch position of the user) is detected and it is detected whether the touch operation is an operation of drawing a circle and whether the circle is a clockwise circle or a counterclockwise circle, on the basis of the locus. When the determination result is "Yes" on the basis of the detection result, the process proceeds to Step S1013. On the other hand, when the determination result is "No", the scroll processing routine program ends and the process proceeds to Step S425 in the imaging control processing program (main routine).

In Step 1013, the focus lens 302 is moved by a predetermined distance in a direction (a direction in which the focal position becomes closer to the imaging device 100) in which the focus lens 302 is focused on an object closer to the imaging device than the current in-focus position in the optical axis direction of the focus lens 302 and the process proceeds to Step 1025. In the imaging device 100 according to this embodiment, for example, the distance of the focus lens 302 moved by one rotating operation is predetermined. As such, in the imaging device 100 according to this embodiment, when the scroll operation of drawing a counterclockwise circle is performed, with the left eye image 300B located above the boundary line 311, this is regarded as the same operation as that when the left eye image 300B is scrolled in the left direction in the first embodiment.

In Step S1015, it is determined whether the right eye image 300A is located in the region above the boundary line 311. In the case illustrated in FIG. 36, when the touch position is a designated position 310A or a designated position 310C, the right eye image 300A is located in the region above the boundary line 311.

When the determination result in Step S1015 is "Yes", the process proceeds to Step S1017. On the other hand, when the determination result in Step S1015 is "No", the scroll processing routine program ends and the process proceeds to Step S425 in the imaging control processing program (main routine).

In Step S1017, similarly to Step S1007, it is determined whether the touch operation is an operation of drawing a clockwise circle. When the determination result in Step S1017 is "Yes", the process proceeds to Step S1019. On the other hand, when the determination result in Step S1017 is "No", the process proceeds to Step S1021.

In Step S1019, similarly to Step S1013, the focus lens 302 is moved by a predetermined distance in a direction (a direction in which the focal position becomes closer to the imaging device 100) in which the focus lens 302 is focused on an object closer to the imaging device than the current in-focus position in the optical axis direction of the focus lens 302 and the process proceeds to Step 1025. As such, in the imaging device 100 according to this embodiment, when the scroll operation of drawing a clockwise circle is performed, with the right eye image 300A located above the boundary line 311, this is regarded as the same operation as that when the right eye image 300A is scrolled in the right direction in the first embodiment.

Figure 38:
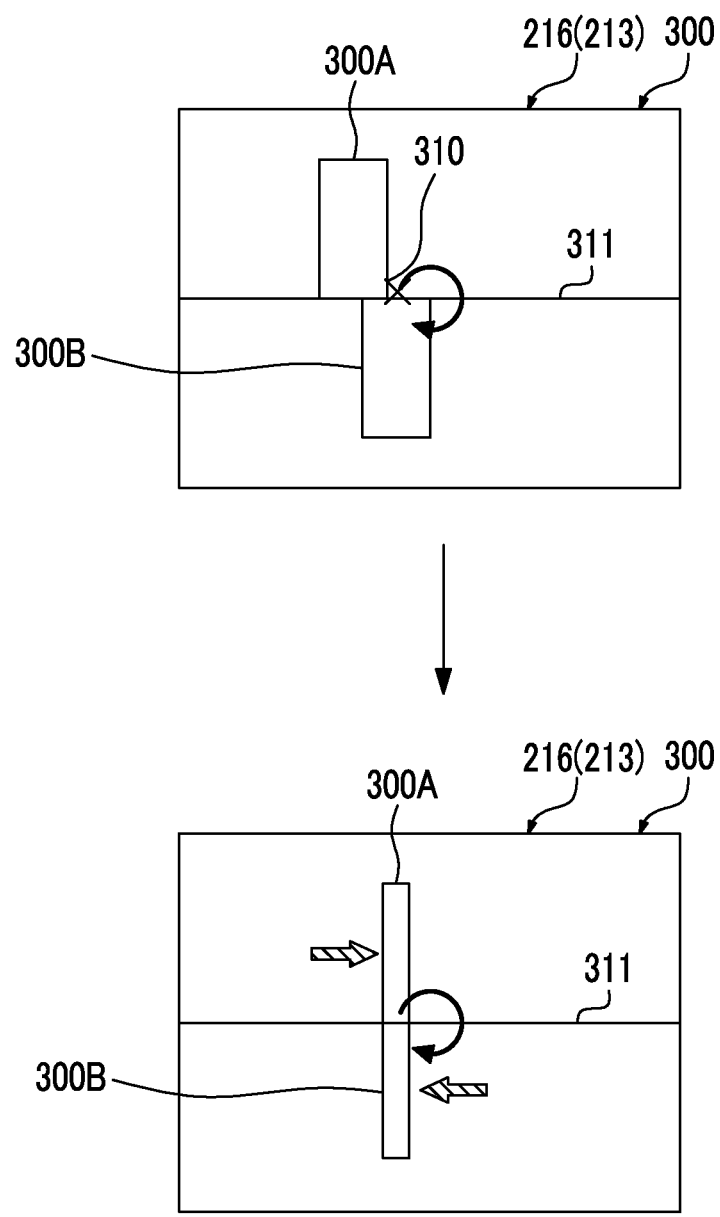
FIG. 38 is a front view illustrating an example of the display state of the split image when the scroll operation is performed in the imaging device according to the second embodiment.

For example, as illustrated on the upper side of FIG. 38, in the back-focused state, it is assumed that the designated position 310 is rotated clockwise by the operation of the user input through the touch panel 215, with the right eye image 300A located above the boundary line 311. In this case, as illustrated on the lower side of FIG. 38, the CPU 12 moves the focus lens 302 in the direction in which the focal position becomes closer to the imaging device 100 along the optical axis direction such that the focus of the focus lens 302 becomes closer to the in-focus position.

In Step S1021, similarly to Step S1011, it is determined whether the touch operation is an operation of drawing a counterclockwise circle. When the determination result in Step S1021 is "Yes", the process proceeds to Step S1023. When the determination result in Step S1021 is "No", the scroll processing routine program ends and the process proceeds to Step S425 in the imaging control processing program (main routine).

In Step S1023, similarly to Step S1009, the focus lens 302 is moved by a predetermined distance in the direction (the direction in which the focal position becomes further away from the imaging device 100) in which the focus lens 302 is focused on an object further away from the imaging device than the current in-focus position in the optical axis direction of the focus lens 302 and the process proceeds to Step S1025. As such, in the imaging device 100 according to this embodiment, when the scroll operation of drawing a counterclockwise circle is performed, with the right eye image 300A located above the boundary line 311, this is regarded as the same operation as that when the right eye image 300A is scrolled in the left direction in the first embodiment.

As described above, in the scroll process, the imaging device 100 according to this embodiment moves the focus lens 302 on the basis of the execution of the operation of drawing a circle.

The moving speed of the focus lens 302 may vary depending on the speed of the operation of drawing a circle. Hereinafter, Example 1 of the scroll process will be described.

Figure 39:
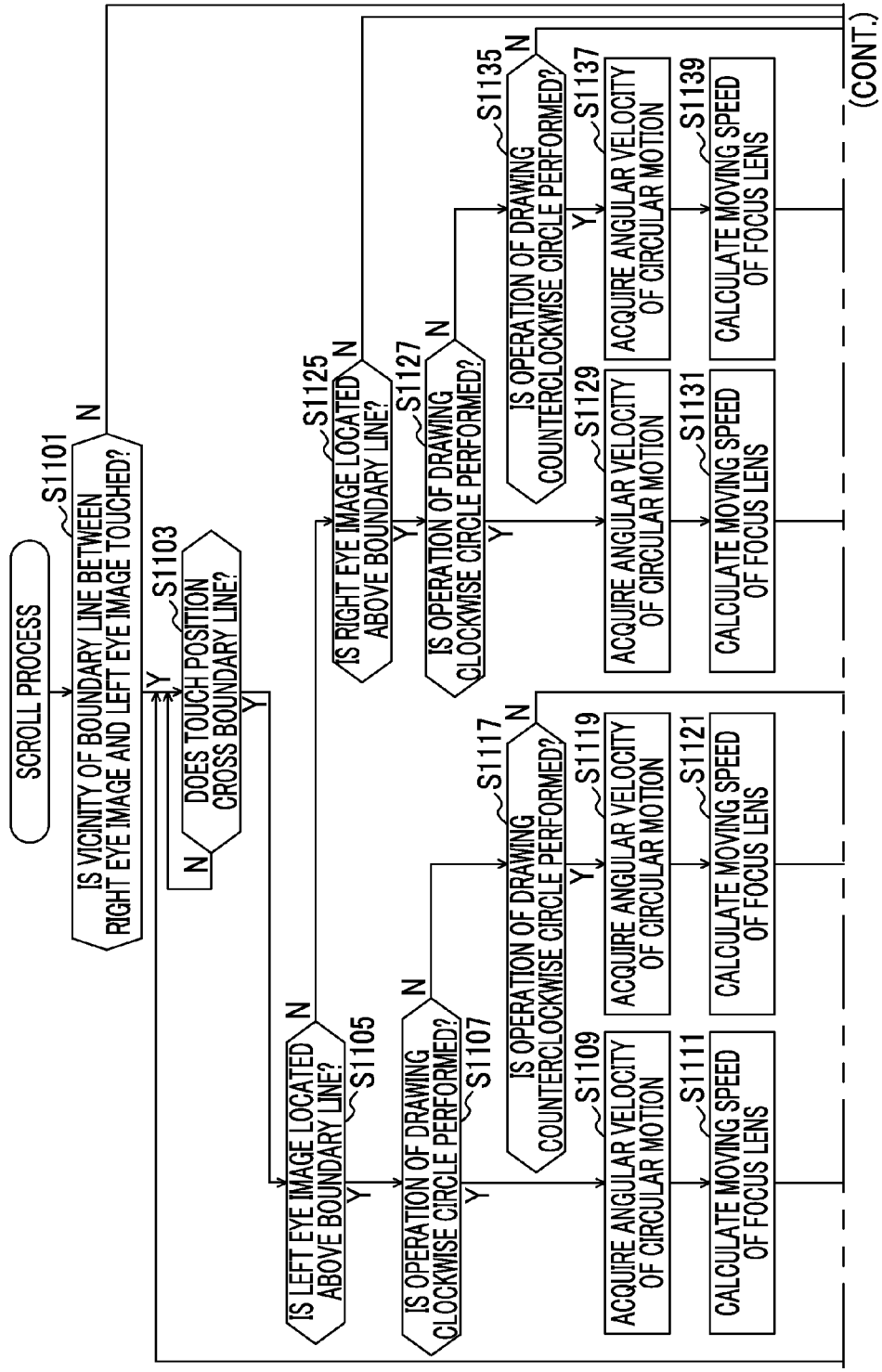
FIG. 39 is a flowchart illustrating the flow of the process of Example 2 of the scroll processing routine program according to the second embodiment.

Next, the operation of the imaging device 100 when Example 1 of the scroll process is performed will be described with reference to FIG. 39. FIG. 39 is a flowchart illustrating the flow of the process of a scroll processing routine program according to Example 1 which is executed by the CPU 12 while the imaging control processing program is being executed. In this embodiment, the program is stored in a predetermined storage area of the memory 26 in advance.

Since the scroll process according to Example 1 includes the same process as the scroll process according to this embodiment, the detailed description of the same process will not be repeated.

Processes in Steps S1101 to S1107 correspond to the processes in Steps S1001 to S1007 in the scroll process.

When the left eye image 300B is located in a region above the boundary line 311, it is determined in Step S1107 whether the touch operation is an operation of drawing a clockwise circle. When the determination result in Step S1107 is "Yes", the process proceeds to Step S1109. On the other hand, when the determination result in Step S1107 is "No", the process proceeds to Step S1117.

In Step S1109, the angular velocity of the circular motion of the designated position 310 is acquired. A method for acquiring the angular velocity is not particularly limited. However, for example, the same method as that for acquiring the moving speed in the first embodiment may be used.

Figure 40:
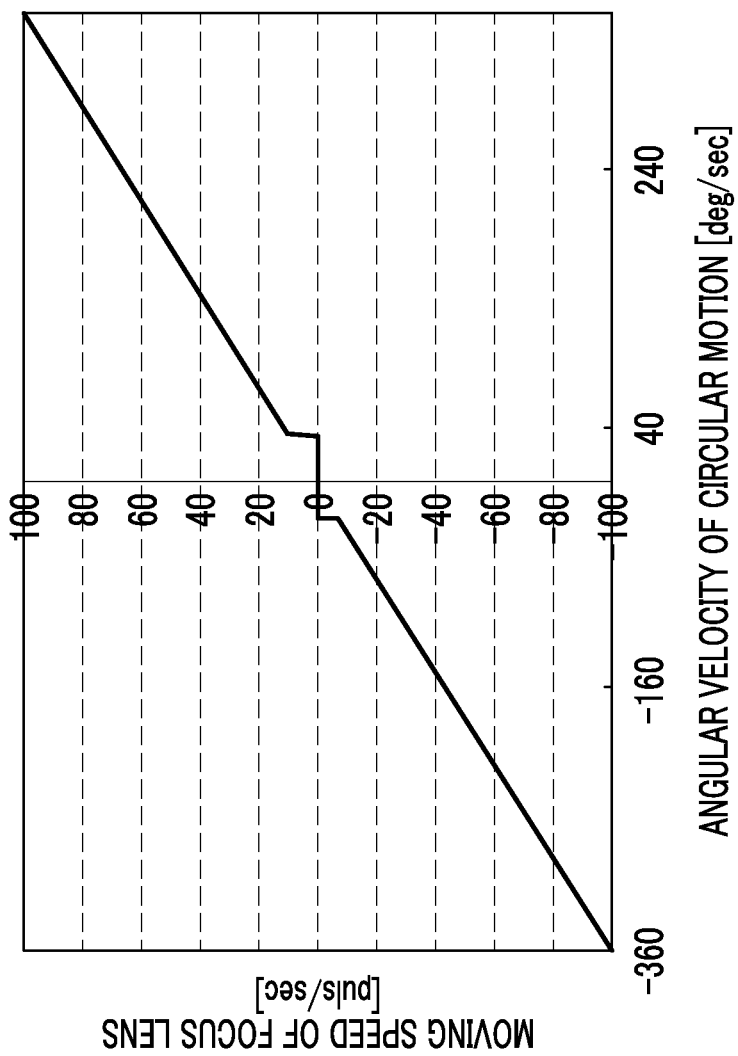
FIG. 40 is a graph illustrating an example of the correspondence relationship between the angular velocity of a circular motion and the moving speed of a focus lens in the imaging device according to the second embodiment.

Then, in Step S1111, the moving speed of the focus lens 302 is calculated. In the imaging device 100 according to this embodiment, the correspondence relationship between the angular velocity of the circular motion of the designated position 310 and the moving speed of the focus lens 302 is stored in a predetermined storage area of the memory 26 in advance. FIG. 40 is a graph illustrating an example of the correspondence relationship between the angular velocity of the circular motion and the moving speed of the focus lens 302 in the imaging device 100 according to this embodiment. In the graph illustrated in FIG. 40, the horizontal axis indicates the angular velocity of the circular motion and the vertical axis indicates the moving speed of the focus lens 302. In addition, for the angular velocity of the circular motion, the right direction is the positive direction and the left direction is the negative direction. For example, in the graph illustrated in FIG. 40, in the imaging device 100 according to this embodiment, as the angular velocity of the circular motion increases, the moving speed of the focus lens 302 increases. However, when the angular velocity of the circular motion is in the range of a third predetermined threshold value (in this embodiment, −40 deg/s) to a fourth predetermined threshold value (in this embodiment, 40 deg/s), the moving speed of the focus lens 302 is 0 (zero). The reason for this is as follows. When the moving speed in the moving operation is in the range of the third threshold value to the fourth threshold value, the possibility of the designated position 310 being moved by, for example, the shaking of fingers against the user's intention is higher than the possibility of the designated position 310 being moved by the user's intention. In this embodiment, a table (a table indicating the correspondence relationship between the angular velocity and the moving speed) corresponding to the graph illustrated in FIG. 40 is stored in the memory 26 in advance.

As such, in the imaging device 100 according to this embodiment, when the scroll operation of drawing a circle is performed through the touch panel 215, the moving speed of the focus lens 302 increases as the angular velocity of the circular motion increases. In addition, as the angular velocity of the circular motion decreases, the moving speed of the focus lens 302 decreases.

In Step S1111, the table indicating the correspondence relationship illustrated in FIG. 40 is read from the memory 26 and a moving speed corresponding to the moving speed acquired in Step S1109 is calculated from the correspondence relationship. As such, in the imaging device 100 according to this embodiment, the moving speed of the focus lens 302 is calculated on the basis of the table indicating the correspondence relationship between the angular velocity of the circular motion of the designated position 310 and the moving speed. However, the invention is not limited thereto. For example, a predetermined calculation formula which calculates the moving speed of the focus lens 302, using the angular velocity of the circular motion of the designated position 310 as a variable may be used to calculate the moving speed of the focus lens 302 on the basis of the angular velocity of the circular motion of the designated position 310.

Then, in Step S1113, the focus lens 302 is moved by a predetermined distance at the moving speed calculated in Step S1111 in the direction (the direction in which the focal position becomes further away from the imaging device 100) in which the focus lens 302 is focused on an object further away from the imaging device than the current in-focus position in the optical axis direction of the focus lens 302.

Then, Step S1115 corresponds to Step S1025 in the scroll process and it is determined whether the touch on the touch panel 215 is maintained. When the determination result in Step S1115 is "Yes", the process returns to Step S1103. On the other hand, when the determination result in Step S1115 is "No", the scroll processing routine program ends and the process proceeds to Step S425 in the imaging control processing program (main routine).

Step S1117 corresponds to Step S1011 in the scroll process. In Step S1117, it is determined whether the touch operation is an operation of drawing a counterclockwise circle. When the determination result in Step S1117 is "Yes", the process proceeds to Step S1119. On the other hand, when determination result in Step S1117 is "No", the scroll processing routine program ends and the process proceeds to Step S425 in the imaging control processing program (main routine).

In Step S1119, similarly to Step S1109, the angular velocity of the circular motion of the designated position 310 is acquired. Then, in Step S1121, similarly to Step S1111, the moving speed of the focus lens 302 is calculated.

Then, in Step S1123, the focus lens 302 is moved by a predetermined distance at the moving speed calculated in Step S1121 in the direction (the direction in which the focal position becomes closer to the imaging device 100) in which the focus lens 302 is focused on an object closer to the imaging device than the current in-focus position in the optical axis direction of the focus lens 302 and the process proceeds to Step S1115.

Processes in Steps S1125 and S1127 performed when the determination result in Step S1105 which determines whether the left eye image 300B is located in a region above the boundary line 311 is "No" correspond to the processes in Steps S1015 and S1017 in the scroll process, respectively.

When the right eye image 300A is located in the region above the boundary line 311, it is determined in Step S1127 whether the touch operation is an operation of drawing a clockwise circle. When the determination result is "Yes", the process proceeds to Step S1129. On the other hand, when the determination result is "No", the process proceeds to Step S1135.

In Step S1129, similarly to Step S1109, the angular velocity of the circular motion of the designated position 310 is acquired. Then, in Step S1131, similarly to Step S1111, the moving speed of the focus lens 302 is calculated.

Then, in Step S1133, the focus lens 302 is moved by a predetermined distance at the moving speed calculated in Step S1131 in the direction (the direction in which the focal position becomes closer to the imaging device 100) in which the focus lens 302 is focused on an object closer to the imaging device than the current in-focus position in the optical axis direction of the focus lens 302 and the process proceeds to Step S1115.

Step S1135 corresponds to Step S1021 in the scroll process. In Step S1135, it is determined whether the touch operation is an operation of drawing a counterclockwise circle. When the determination result in Step S1135 is "Yes", the process proceeds to Step S1137. On the other hand, when the determination result in Step S1135 is "No", the scroll processing routine program ends and the process proceeds to Step S425 in the imaging control processing program (main routine).

In Step S1137, similarly to Step S1109, the angular velocity of the circular motion of the designated position 310 is acquired. Then, in Step S1139, similarly to Step S1111, the moving speed of the focus lens 302 is calculated.

Then, in Step S1141, the focus lens 302 is moved by a predetermined distance at the moving speed calculated in Step S1139 in the direction (the direction in which the focal position becomes further away from the imaging device 100) in which the focus lens 302 is focused on an object further away from the imaging device than the current in-focus position in the optical axis direction of the focus lens 302 and the process proceeds to Step S1115.

As described above, in the scroll process according to Example 1, the imaging device 100 according to this embodiment moves the focus lens 302 on the basis of the execution of the operation of drawing a circle. In addition, the moving speed of the focus lens 302 may correspond to the angular velocity of the circular motion.

As such, since the moving speed of the focus lens 302 corresponds to the angular velocity of the circular motion, it is possible to operatively associate the operation of the user moving the designated position (operation speed) with the moving speed of the focus lens 302. Therefore, it is possible to reflect the intention of the user in the movement of the focus lens 302.

In this embodiment, the case in which the circular motion of moving the designated position 310 in a circle is performed across two divided images (a divided image for the right eye and a divided image for the left eye) has been described in detail. However, the invention is not limited thereto. For example, the circular motion may be performed so as to draw a circle across a plurality of divided images. In this case, for example, each scroll process may be performed whenever the drawing operation crosses the boundary line 311.

In this embodiment, the case in which the designated position 310 is moved in a circle has been described. However, the invention is not limited thereto. The locus of the designated position 310 may be divided into a moving operation in the intersection direction and a moving operation across the boundary line 311 (division direction). In addition, as in the scroll process according to this embodiment, the designated position 310 may be moved in a circle to give the user a feeling as if the focus ring 260 is manually rotated to adjust the focus (so-called manual focus).

Third Embodiment

The imaging control process according to each of the above-described embodiments may be combined with other processes for focusing using the split image. In this embodiment, other processes which are preferably combined with the imaging control process according to each of the above-described embodiments will be described in detail with reference to the drawings.

Figure 41:
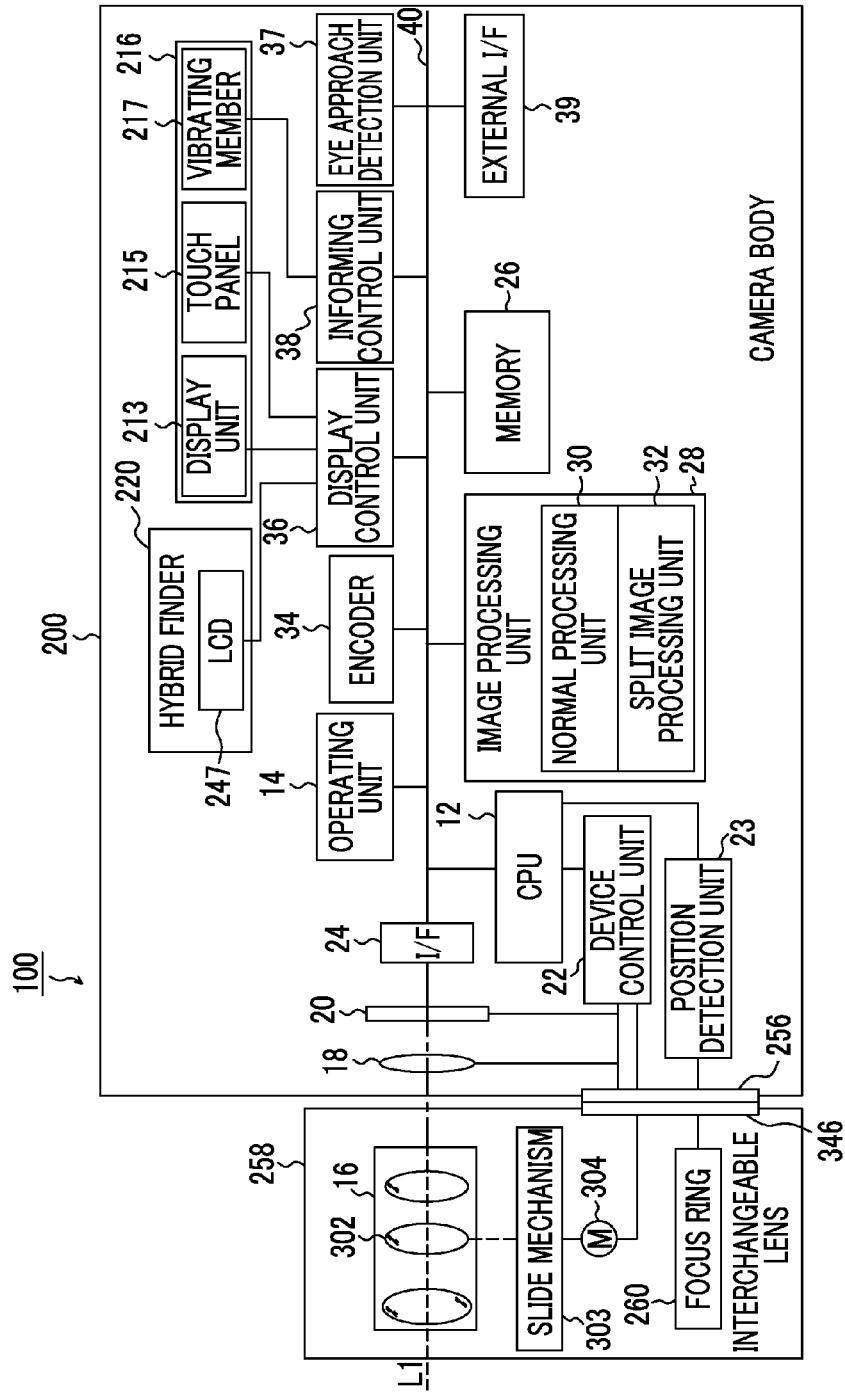
FIG. 41 is a block diagram illustrating an example of the structure of an electrical system of an imaging device according to a third embodiment.

In this embodiment, a focus informing process which informs the user that an image has been in focus will be described. FIG. 41 is a block diagram illustrating an example of the structure of an electrical system of an imaging device 100 according to this embodiment. As illustrated in FIG. 41, the imaging device 100 according to this embodiment includes an informing control unit 38 and a vibrating member 217 which inform the user that an image has been in focus, in addition to the structure of the imaging device 100 according to each of the above-described embodiments.

The informing control unit 38 is connected to the vibrating member 217 and performs control such that the vibrating member 217 vibrates when a right eye image 300A and a left eye image 300B are in focus. In the imaging device 100 according to this embodiment, the vibrating member 217 is provided in a portion of the touch panel 215 which is touched by the user.

Figure 42:
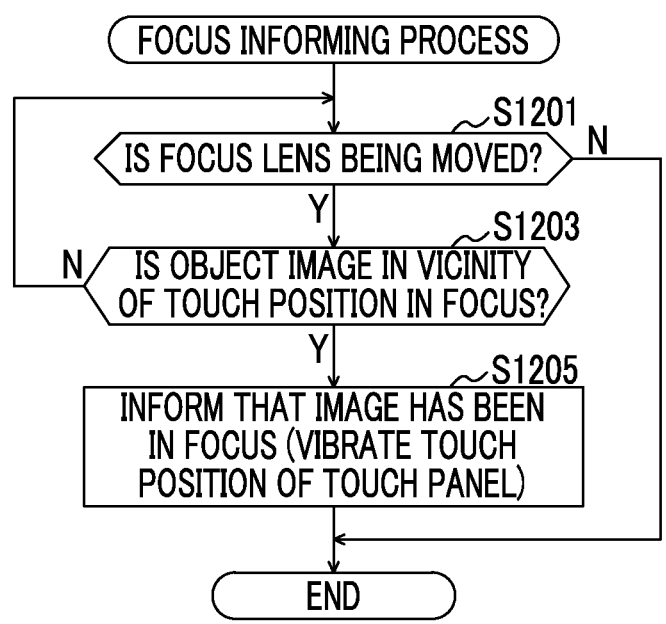
FIG. 42 is a flowchart illustrating the flow of the process of a focus informing processing routine program according to the third embodiment.

The operation of the imaging device 100 when the focus informing process is performed will be described with reference to FIG. 42. FIG. 42 is a flowchart illustrating the flow of the process of a focus informing processing routine program which is executed by the CPU 12 in combination with the execution of an imaging control processing program. In this embodiment, the program is stored in a predetermined storage area of the memory 26.

First, in Step S1201, it is determined whether the focus lens 302 is being moved. When the determination result in Step S1201 is "Yes", the process proceeds to Step S1203. On the other hand, when the determination result in Step S1201 is "No", the focusing control processing routine program ends.

In Step S1203, it is determined whether an object image (the right eye image 300A and the left eye image 300B) in the vicinity of a touch position (designated position 310) has been in focus. When the split image 300 includes a plurality of object images (the right eye image 300A and the left eye image 300B), in some cases, all of the object images are not in focus. For example, in the imaging device 100 according to this embodiment, the image of an object which is distant from the imaging device 100 or the image of an object which is close to the imaging device 100 is in focus. Therefore, in the imaging device 100 according to this embodiment, it is determined whether the object images (the right eye image 300A and the left eye image 300B) in the vicinity of the designated position 310 (the touch position of the user) in the embodiment is in focus. Specifically, in the imaging device 100 according to this embodiment, a predetermined region having the designated position 310 as the center or a predetermined region having, as the center, an intersection point between the designated position 310 and the boundary line 311 when the designated position 310 is moved toward the boundary line 311 in a division direction is provided and it is determined whether the right eye image 300A and the left eye image 300B included in the region have been in focus. A method for determining whether the images have been in focus may be the same as that in the imaging control process according to each of the above-described embodiments.

When the determination result in Step S1203 is "Yes", the process proceeds to Step S1205. On the other hand, when the determination result in Step S1203 is "No", the process proceeds to Step S1201.

In Step S1205, the vibrating member 217 is vibrated to inform that the images have been in focus and the focusing control processing routine program ends.

In the imaging device 100 according to this embodiment, as described above, a portion of the touch panel 215 which is touched by the user, specifically, a portion of the touch panel 215 corresponding to the designated position 310 is vibrated by the vibrating member 217. However, the portion vibrated by the vibrating member 217 is not limited thereto. For example, the entire touch panel 215 or the entire imaging device 100 (camera body 200) may be vibrated. As in the imaging device 100 according to this embodiment, when the portion touched by the user is vibrated, it is possible to reliably and rapidly inform the user that an image has been in focus.

As described above, in the focus informing process, the imaging device 100 according to this embodiment informs the user that the object images (the right eye image 300A and the left eye image 300B) have been in focus while the focus lens 302 is being moved.

In the focus informing process, when the object images are in focus, the movement of the focus lens 302 may be stopped. Hereinafter, Example 1 of the focus informing process will be described.

Figure 43:
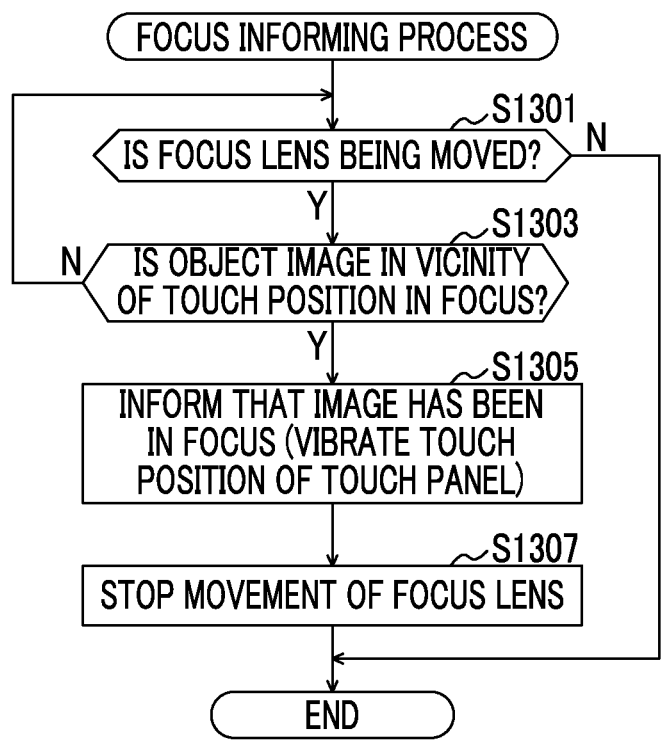
FIG. 43 is a flowchart illustrating the flow of the process of Example 1 of the focus informing processing routine program according to the third embodiment.

Next, the operation of the imaging device 100 when Example 1 of the focus informing process is performed will be described with reference to FIG. 43. FIG. 43 is a flowchart illustrating the flow of the process of a focus informing processing routine program according to Example 1 which is executed by the CPU 12 in combination with the execution of the imaging control processing program. In this embodiment, the program is stored in a predetermined storage area of the memory 26 in advance.

Since the focus informing process according to Example 1 includes the same processes as the focus informing process according to this embodiment, the detailed description thereof will not be repeated.

Steps S1301 to S1305 correspond to Steps S1201 to S1205 in the focus informing process, respectively.

When object images (the right eye image 300A and the left eye image 300B) in the vicinity of a touch position are in focus (the determination in Step S1303 is "Yes") during the movement of the focus lens 302 (the determination in Step S1301 is "Yes"), in Step S1305, the vibrating member 217 is vibrated to inform that the object images have been in focus. Then, the process proceeds to Step S1307.

In Step S1307, the movement of the focus lens 302 is stopped and the process ends.

As described above, in the focus informing process according to Example 1, the imaging device 100 according to this embodiment informs the user that the object images (the right eye image 300A and the left eye image 300B) have been in focus during the movement of the focus lens 302 and stops the movement of the focus lens 302.

As described above, in the scroll process according to Example 1, the imaging device 100 according to this embodiment may move the focus lens 302 on the basis of the execution of an operation of drawing a circle and set the moving speed of the focus lens 302 to a value corresponding to the angular velocity of the circular motion.

In this embodiment, a touch portion of the touch panel 215 is vibrated by the vibrating member 217 to perform the informing process. However, an informing method is not limited to the above-mentioned method. For example, a voice output unit, such as a speaker, may be provided instead of the vibrating member 217 or in addition to the vibrating member 217 and audio may be output to perform the informing process. In addition, for example, the colors of the right eye image 300A, the left eye image 300B, and the split image 300 may be changed. Information indicating that images have been in focus may be displayed on the display unit 213.

Fourth Embodiment

In the third embodiment, the focus informing process has been described as another process which is preferably combined with the imaging control process according to the first and second embodiments. However, in this embodiment, as another process, a process of controlling the enlargement and reduction of the split image 300 will be described in detail with reference to the drawings.

Figure 44:
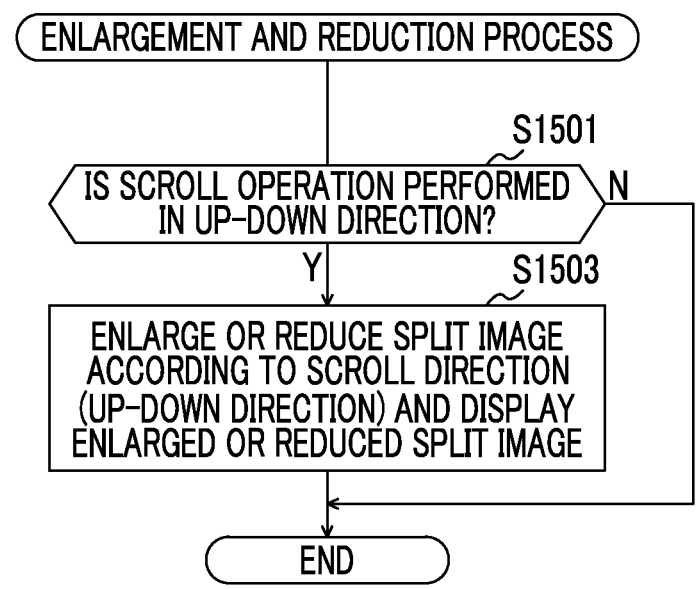
FIG. 44 is a flowchart illustrating the flow of the process of an enlargement and reduction control processing routine program according to a fourth embodiment.

FIG. 44 is a flowchart illustrating the flow of the process of an enlargement and reduction control processing routine program which is executed by the CPU 12 in combination with the execution of the imaging control processing program. In this embodiment, the program is stored in a predetermined storage area of the memory 26 in advance.

First, in Step S1501, it is determined whether a scroll operation is performed vertically (division direction). When the determination result in Step S1501 is "Yes", the process proceeds to Step S1503. On the other hand, when the determination result in Step S1501 is "No", the enlargement and reduction control processing routine program ends.

In Step S1503, the split image 300 displayed on the display unit 213 of the display input unit 216 is enlarged or reduced according to the scroll direction (the moving direction of the designated position 310; the upward direction and the downward direction) and then the enlargement and reduction control processing routine program ends.

In the imaging device 100 according to this embodiment, whether to enlarge or reduce the split image 300 is predetermined according to the scroll direction. In the imaging device 100 according to this embodiment, specifically, enlargement and reduction are predetermined such that the split image 300 is enlarged when the scroll direction is the upward direction and is reduced when the scroll direction is the downward direction. For example, predetermined enlargement and reduction ratios corresponding to one scroll operation may be predetermined as the enlargement and reduction ratios of the split image 300. In addition, for example, the enlargement ratio and the reduction ratio may be predetermined according to a scroll distance (the moving distance of the designated position 310). In this case, for example, the enlargement ratio and the reduction ratio are predetermined so as to increase as the scroll distance increases.

As described above, in the enlargement and reduction control process, the imaging device 100 according to this embodiment enlarges or reduces the split image 300 according to the scroll direction, on the basis of the execution of the scroll operation in the up-down direction (division direction).

As such, since the split image 300 is enlarged or reduced, it is easy to see an object image (the right eye image 300A and the left eye image 300B) and it is easy for the user to check the focus state.

In the imaging device 100 according to the first embodiment, in the imaging control process, the operation of moving the designated position 310 in order to control the focus state is a moving operation in the horizontal direction. Therefore, in the imaging device 100 according to this embodiment, since the direction of the moving operation (scroll operation) is different in the control of the focus state in the imaging control process and the enlargement and reduction control process, it is possible to clearly distinguish between the two processes. In the imaging device 100 according to the second embodiment, in the imaging control process, the operation of moving the designated position 310 in order to control the focus state includes a moving operation in the horizontal direction and a moving operation in the up-down direction (division direction). In this case, when the moving operation in the horizontal direction is not performed within a predetermined period of time before and after the moving operation in the up-down direction (division direction), it may be determined that the operation is performed for the enlargement and reduction control process according to this embodiment.

The enlargement and reduction control process is not limited to the processes according to each of the above-described embodiments. Hereinafter, examples of the enlargement and reduction control process will be described.

Figure 45:
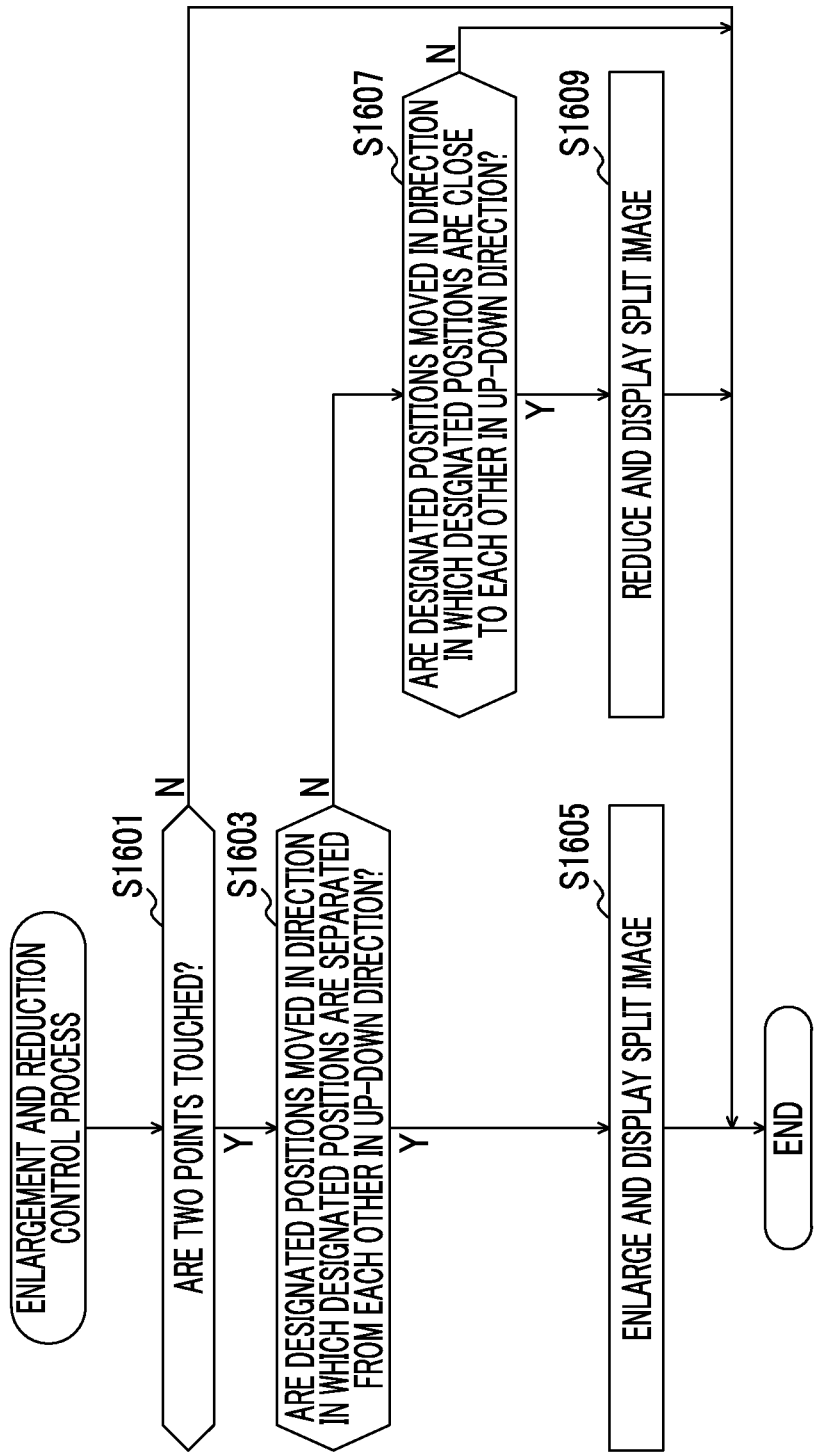
FIG. 45 is a flowchart illustrating the flow of the process of Example 1 of the enlargement and reduction control processing routine program according to the fourth embodiment.

Next, the operation of the imaging device 100 when Example 1 of the enlargement and reduction control process is performed will be described with reference to FIG. 45. FIG. 45 is a flowchart illustrating the flow of the process of an enlargement and reduction control processing routine program according to Example 1 which is executed by the CPU 12 in combination with the execution of the imaging control processing program. In this embodiment, the program is stored in a predetermined storage area of the memory 26 in advance.

Since the enlargement and reduction control process according to Example 1 includes the same processes as the enlargement and reduction control process according to this embodiment, the detailed description thereof will not be repeated.

In Step S1601, it is determined whether two points on the split image 300 are touched. That is, it is determined whether there are two designated positions 310. When the determination result in Step S1601 is "Yes", the process proceeds to Step S1603. On the other hand, when the determination result in Step S1601 is "No", the enlargement and reduction control processing routine program ends.

Figure 46:
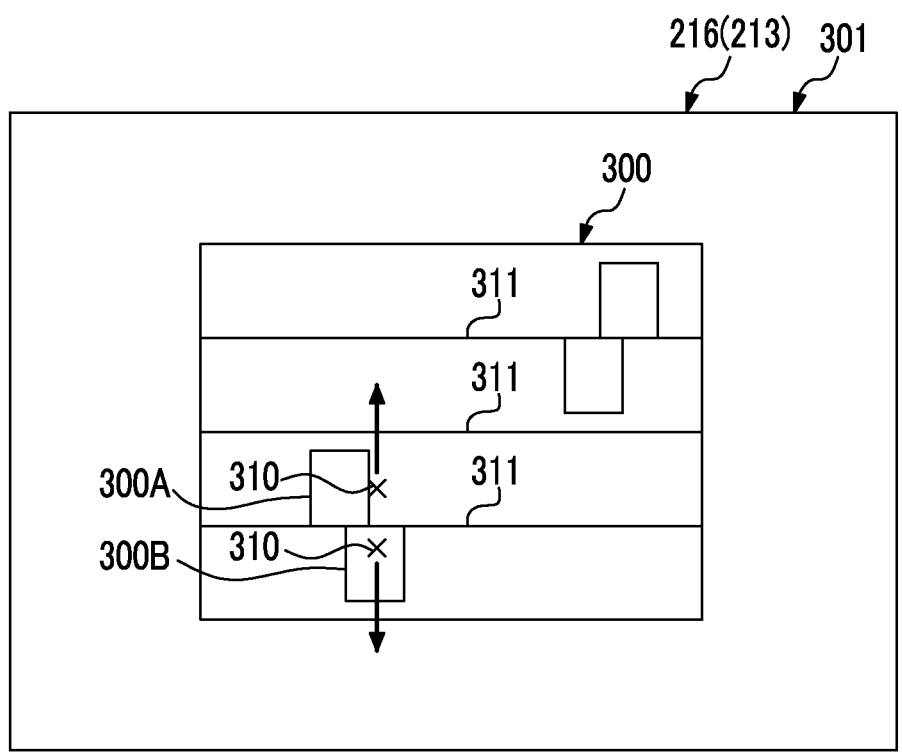
FIG. 46 is a front view illustrating an example of the display state of a split image when a split image enlargement operation is performed in an imaging device according to the fourth embodiment.

In Step S1603, it is determined whether a scroll operation (so-called pinch-open operation (pinch-out operation)) of moving the designated positions 310 so as to separate from each other in the up-down direction is performed. When the determination result in Step S1603 is "Yes", the process proceeds to Step S1605. On the other hand, when the determination result in Step S1603 is "No", the process proceeds to Step S1607. FIG. 46 is a front view illustrating an example of the display state of a split image when a split image enlargement operation is performed in the imaging device 100 according to this embodiment.

Figure 47:
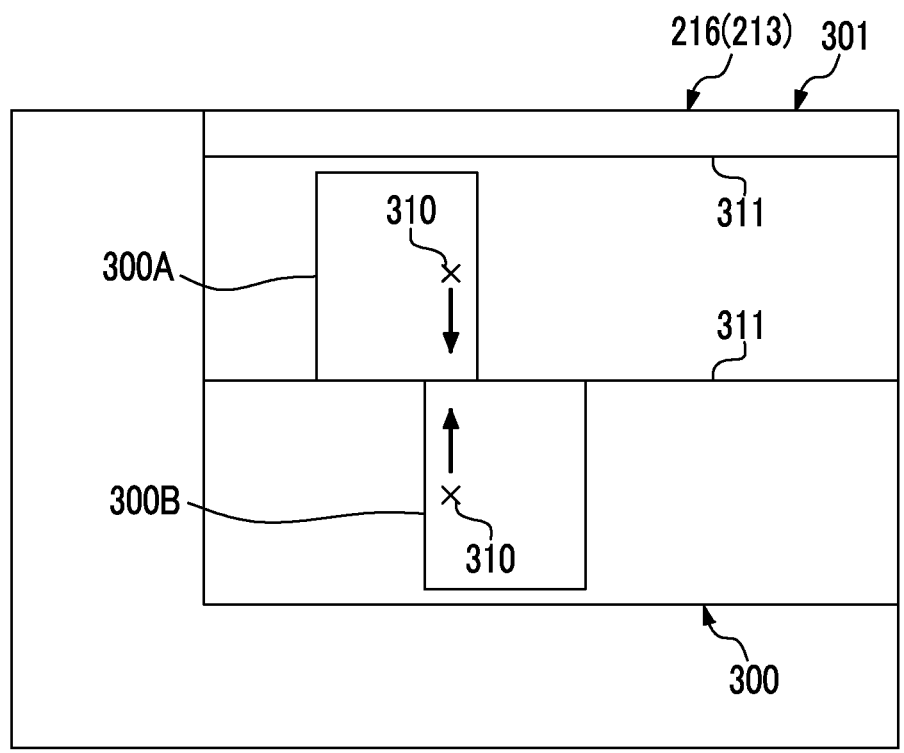
FIG. 47 is a front view illustrating an example of the display state of the split image when a split image reduction operation is performed in the imaging device according to the fourth embodiment.

In Step S1605, the split image 300 displayed on the display unit 213 of the display input unit 216 is enlarged and then the enlargement and reduction control processing routine program ends. FIG. 47 which will be described below illustrates a state in which the split image 300 is enlarged and displayed on the display unit 213. The enlargement ratio may be the same as that in Step S1503 of the enlargement and reduction control process.

In Step 1607, it is determined whether a scroll operation (so-called pinch-close operation (pinch-in operation)) of moving the designated positions 310 so as to become closer to each other in the up-down direction is performed. When the determination result in Step S1607 is "Yes", the process proceeds to Step S1609. On the other hand, when the determination result in Step S1603 is "No", the enlargement and reduction control processing routine program ends. FIG. 47 is a front view illustrating an example of the display state of a split image when a split image reduction operation is performed in the imaging device 100 according to this embodiment. FIG. 47 illustrates a case in which the size of the enlarged split image 300 is larger than the size of the entire display region of the display unit 213.

In Step 1609, the split image 300 displayed on the display unit 213 of the display input unit 216 is reduced and then the enlargement and reduction control processing routine program ends. The reduction ratio may be the same as that in Step S1503 of the enlargement and reduction control process.

As described above, in the enlargement and reduction control process according to Example 1, when there are two designated positions 310, the imaging device 100 according to this embodiment enlarges or reduces the split image 300 according to whether the designated positions 310 separate from each other or become closer to each other in the up-down direction (division direction).

As such, when there are two designated positions 310, the split image 300 is enlarged or reduced. Therefore, it is possible to reduce an operation error which is not intended by the user, as compared to a case in which one point is touched.

Figure 48:
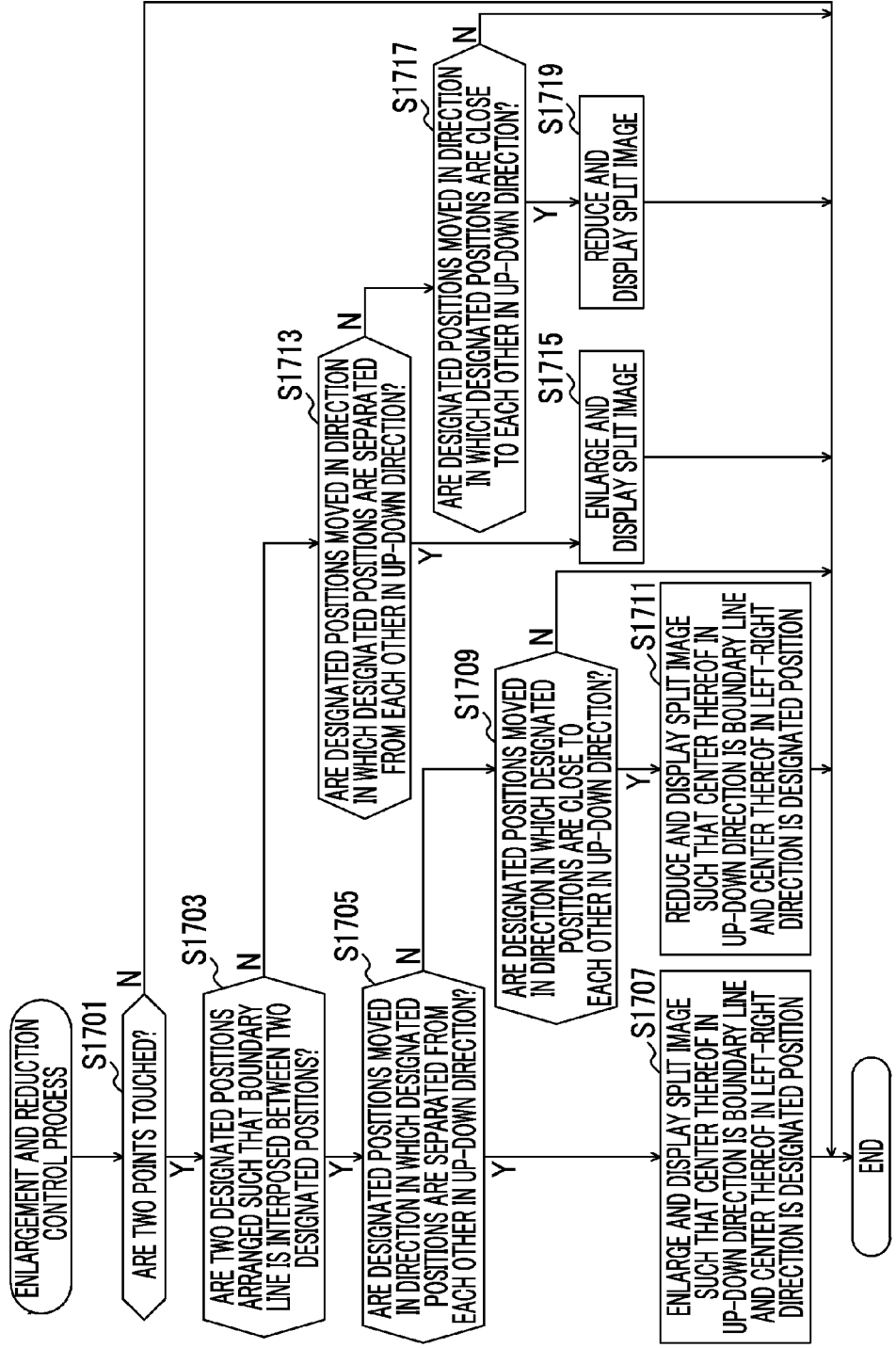
FIG. 48 is a flowchart illustrating the flow of the process of Example 2 of the enlargement and reduction control processing routine program according to the fourth embodiment.

Next, the operation of the imaging device 100 when Example 2 of the enlargement and reduction control process is performed will be described with reference to FIG. 48. FIG. 48 is a flowchart illustrating the flow of the process of an enlargement and reduction control processing routine program according to Example 2 which is executed by the CPU 12 in combination with the execution of the imaging control processing program. In this embodiment, the program is stored in a predetermined storage area of the memory 26 in advance.

Since the enlargement and reduction control process according to Example 2 includes the same processes as the enlargement and reduction control process according to this embodiment, the detailed description thereof will not be repeated.

Step S1701 corresponds to Step S1601 in the enlargement and reduction control process according to Example 1. In Step S1701, it is determined whether two points on the split image 300 are touched (there are two designated positions 310). When the determination result is "Yes", the process proceeds to Step S1703. On the other hand, when the determination result is "No", the enlargement and reduction control processing routine program ends.

In Step S1703, it is determined whether the designated positions 310 are located with the boundary line 311 interposed therebetween. For example, it is determined whether a line connecting the two designated positions 310 intersects the boundary line 311. FIGS. 46 and 47 illustrate the case in which the designated positions 310 are located with the boundary line 311 interposed therebetween. The distance from the boundary line 311 to each designated position 310 is not particularly limited. The distances from the boundary line 311 to the two designated positions 310 may be different from each other. When the determination result in Step S1703 is "Yes", the process proceeds to Step S1705. When the determination result in Step S1703 is "No", the process proceeds to Step S1713.

Step S1705 corresponds to Step S1603 in the enlargement and reduction control process according to Example 1. In Step S1705, it is determined whether a scroll operation of moving the designated positions 310 so as to separate from each other in the up-down direction is performed. When the determination result is "Yes", the process proceeds to Step S1707. On the other hand, when the determination result is "No", the process proceeds to Step S1709.

In Step S1707, the split image 300 displayed on the display unit 213 of the display input unit 216 is enlarged such that the center of the split image 300 in the up-down direction (division direction) is the boundary line 311 interposed between the designated positions 310 and the center of the split image 300 in the left-right direction (horizontal direction) is the designated position 310. Then, the enlargement and reduction control processing routine program ends. When the two designated positions 310 are different in the left-right direction, for example, a midpoint between the two designated positions 310 in the left-right direction may be used as the center or one of the two designated positions 310 may be used as the center. In addition, when a plurality of boundary lines 311 are interposed between the two designated positions 310, for example, the boundary line 311 which is closer to the center of the gap between the two designated positions 310 in the up-down direction may be used as the center.

Step S1709 corresponds to Step S1607 in the enlargement and reduction control process according to Example 1. In Step S1709, it is determined whether a scroll operation of moving the designated positions 310 so as to become closer to each other in the up-down directions is performed. When the determination result in Step S1709 is "Yes", the process proceeds to Step S1711. On the other hand, when the determination result in Step S1709 is "No", the enlargement and reduction control processing routine program ends.

In Step S1711, the split image 300 displayed on the display unit 213 of the display input unit 216 is reduced such that the center of the split image 300 in the up-down direction (division direction) is the boundary line 311 interposed between the designated positions 310 and the center of the split image 300 in the left-right direction (horizontal direction) is the designated positions 310. Then, the enlargement and reduction control processing routine program ends. When the two designated positions 310 are different in the left-right direction, for example, a midpoint between the two designated positions 310 in the left-right direction may be used as the center or one of the two designated positions 310 may be used as the center, similarly to Step S1707. In addition, when a plurality of boundary lines 311 are interposed between the two designated positions 310, for example, the boundary line 311 which is closer to the center of the gap between the two designated positions 310 in the up-down direction may be used as the center, similarly to Step S1707.

In Step S1713, similarly to Step S1705, it is determined whether a scroll operation of moving the designated positions 310 so as to separate from each other in the up-down direction is performed. When the determination result is "Yes", the process proceeds to Step S1715. On the other hand, when the determination result is "No", the process proceeds to Step S1717.

Step S1715 corresponds to Step S1605 in the enlargement and reduction control process according to Example 1. In Step S1715, the entire split image 300 displayed on the display unit 213 of the display input unit 216 is enlarged and then the enlargement and reduction control processing routine program ends.

In Step S1717, similarly to Step S1709, it is determined whether a scroll operation of moving the designated positions 310 so as to become closer to each other in the up-down directions is performed. When the determination result in Step S1717 is "Yes", the process proceeds to Step S1719. On the other hand, when the determination result in Step S1717 is "No", the enlargement and reduction control processing routine program ends.

Step S1719 corresponds to Step S1609 in the enlargement and reduction control process according to Example 1. In Step S1719, the entire split image 300 displayed on the display unit 213 of the display input unit 216 is reduced and then the enlargement and reduction control processing routine program ends.

As described above, in the enlargement and reduction control process according to Example 2, when two positions 310 are designated, with the boundary line 311 interposed therebetween, the imaging device 100 according to this embodiment enlarges or reduces the split image 300 such that the center of the split image 300 in the up-down direction (division direction) is the boundary line 311 interposed between the designated positions 310 and the center of the split image 300 in the left-right direction (horizontal direction) is the designated positions 310.

As such, in enlargement and reduction, the center of the split image in the up-down direction (division direction) is the boundary line 311 interposed between the designated positions 310 and the center of the split image in the left-right direction (horizontal direction) is the designated positions 310. Therefore, the user can enlarge or reduce the split image 300 (object image) whose focus state is to be checked. As a result, in the imaging device 100 according to this embodiment, it is possible to achieve the operation that is intended by the user.

Figure 49:
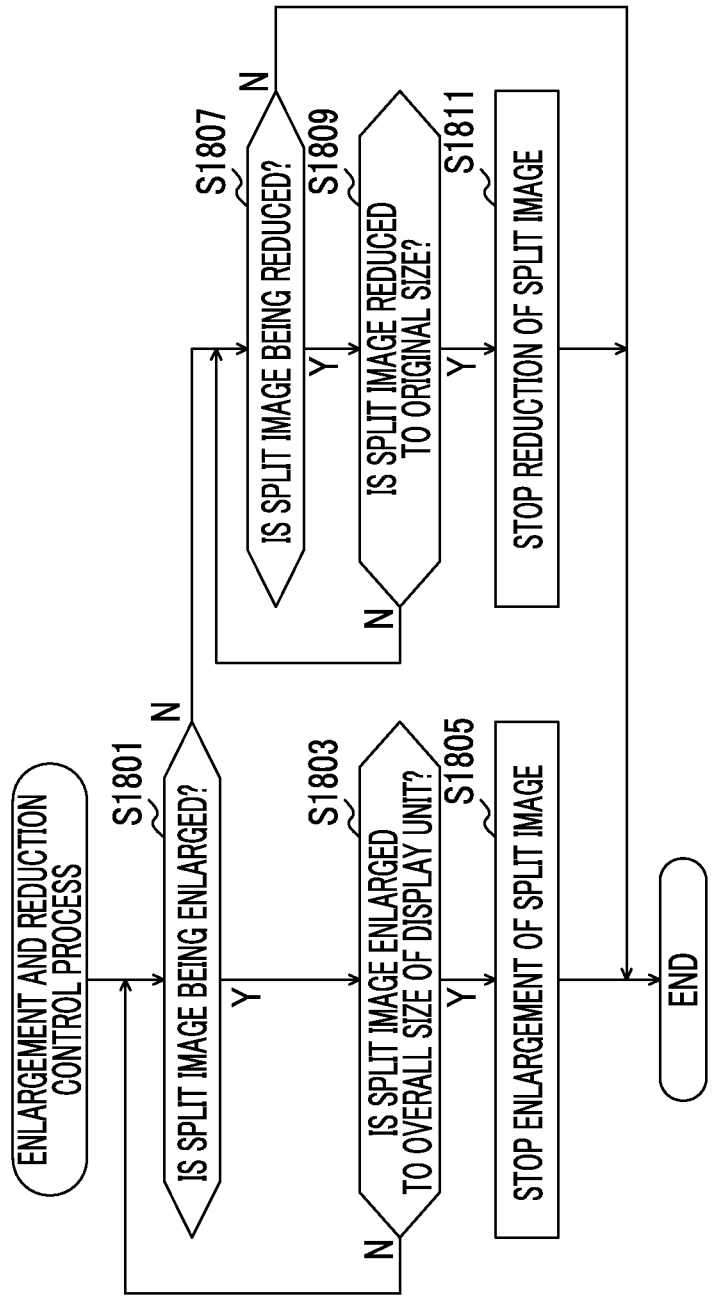
FIG. 49 is a flowchart illustrating the flow of the process of the enlargement and reduction control processing routine program according to the fourth embodiment.

Next, an enlargement and reduction control process which is preferably combined with each of the above-mentioned enlargement and reduction control processes will be described in detail with reference to FIG. 49. FIG. 49 is a flowchart illustrating the flow of the process of an enlargement and reduction control processing routine program which is executed by the CPU 12 in combination with the execution of each of the above-mentioned enlargement and reduction control processing programs. In this embodiment, the program is stored in a predetermined storage area of the memory 26 in advance.

The enlargement and reduction control process illustrated in FIG. 49 is performed during the enlargement or reduction of the split image 300.

In Step S1801, it is determined whether the split image 300 is being enlarged. When the determination result in Step S1801 is "Yes", the process proceeds to Step S1803. On the other hand, when the determination result in Step S1801 is "No", the process proceeds to Step S1807.

In Step S1803, it is determined whether the split image 300 is enlarged to the size of the entire display region of the display unit 213. When the determination result in Step S1803 is "No", the process proceeds to Step S1801. On the other hand, when the determination result in Step S1803 is "Yes", the process proceeds to Step S1805.

In Step S1805, the enlargement of the split image 300 is stopped and then the enlargement and reduction control processing routine program ends.

In Step S1807, it is determined whether the split image 300 is being reduced. When the determination result in Step S1807 is "Yes", the process proceeds to Step S1809. On the other hand, when the determination result in Step S1807 is "No", the enlargement and reduction control processing routine program ends.

In Step S1809, it is determined whether the split image 300 is reduced to the original size. Here, the "original size" is the size of the split image 300 which is predetermined as an initial state in the imaging device 100. For example, the original size is the size of the split image 300 displayed on the display unit 213 when the imaging device 100 is turned on. The "original size" is not limited thereto. For example, when the split image 300 is enlarged and then reduced, the original size may be the size before enlargement. When the determination result in Step S1809 is "No", the process proceeds to Step S1807. On the other hand, when the determination result in Step S1809 is "Yes", the process proceeds to Step S1811.

In Step S1811, the reduction of the split image 300 is stopped and then the enlargement and reduction control processing routine program ends.

As described above, in the imaging device 100 according to this embodiment, in the enlargement and reduction control process, the maximum value of the enlargement ratio of the split image 300 is the entire display region of the display unit 213 and the maximum value of the reduction ratio is the size of the split image 300 which is predetermined as the initial state in the imaging device 100.

As such, in the case in which the split image 300 is enlarged and a portion of the object image in the normal image 301 becomes the split image 300, even when the split image 300 is displayed at the maximum enlargement ratio, the user can slightly reduce the split image and check an object image in the periphery of the field of view.

The flow of the imaging control process described in each of the above-described embodiments is an illustrative example. Therefore, unnecessary steps may be removed, new steps may be added, or the order of the process may be changed, without departing from the scope and spirit of the invention. In addition, each process included in the imaging control process described in each of the above-described embodiments may be implemented by a software configuration obtained by the execution of a program by a computer or a hardware configuration. Furthermore, each process may be implemented by a combination of the hardware configuration and the software configuration.

When the computer executes the program to implement the imaging control process described in each of the above-described embodiments, the program may be stored in a predetermined storage area (for example, the memory 26) in advance. However, the program is not necessarily stored in the memory 26 at the beginning. For example, the program may be stored in an arbitrary "portable storage medium", such as a solid state drive (SSD), a CD-ROM, a DVD disk, a magneto-optical disk, or an IC card which is connected to the computer and is then used, in advance. Then, the computer may acquire the program from the portable storage medium and execute the program. In addition, each program may be stored in another computer or a server apparatus connected to the computer through, for example, the Internet or a local area network (LAN) and the computer may acquire the program and execute the program.

Fifth Embodiment

In the first embodiment, the imaging device 100 is given as an example. However, for example, a mobile phone, a smart phone, a personal digital assistant (PDA), or a portable game machine with a camera function may be given as an example of a mobile terminal apparatus which is a modification example of the imaging device 100. Hereinafter, the smart phone will be described in detail as an example with reference to the drawings.

Figure 50:
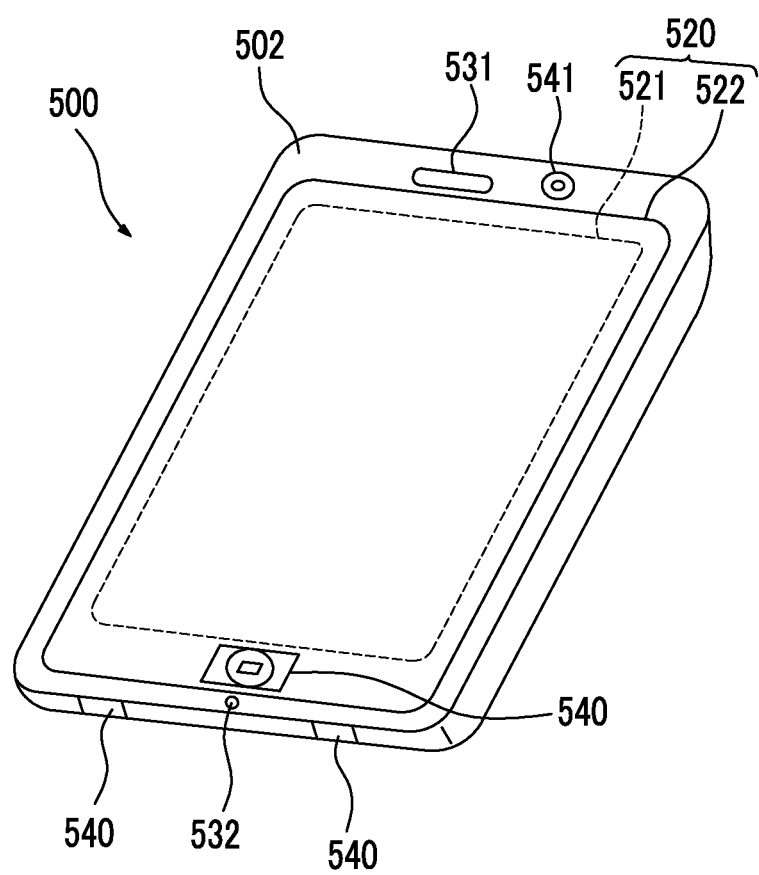
FIG. 50 is a perspective view illustrating an example of the outward appearance of a smart phone according to a fifth embodiment.

FIG. 50 is a perspective view illustrating an example of the outward appearance of a smart phone 500. The smart phone 500 illustrated in FIG. 50 includes a housing 502 with a flat panel shape and a display input unit 520 having a display panel 521 as a display unit and an operation panel 522 as an input unit which are integrally formed on one surface of the housing 502. The housing 502 includes a speaker 531, a microphone 532, an operating unit 540, and a camera unit 541. However, the configuration of the housing 502 is not limited thereto. For example, the display unit and the input unit may be independently provided, or the housing 502 may have a folding structure or a sliding mechanism.

Figure 51:
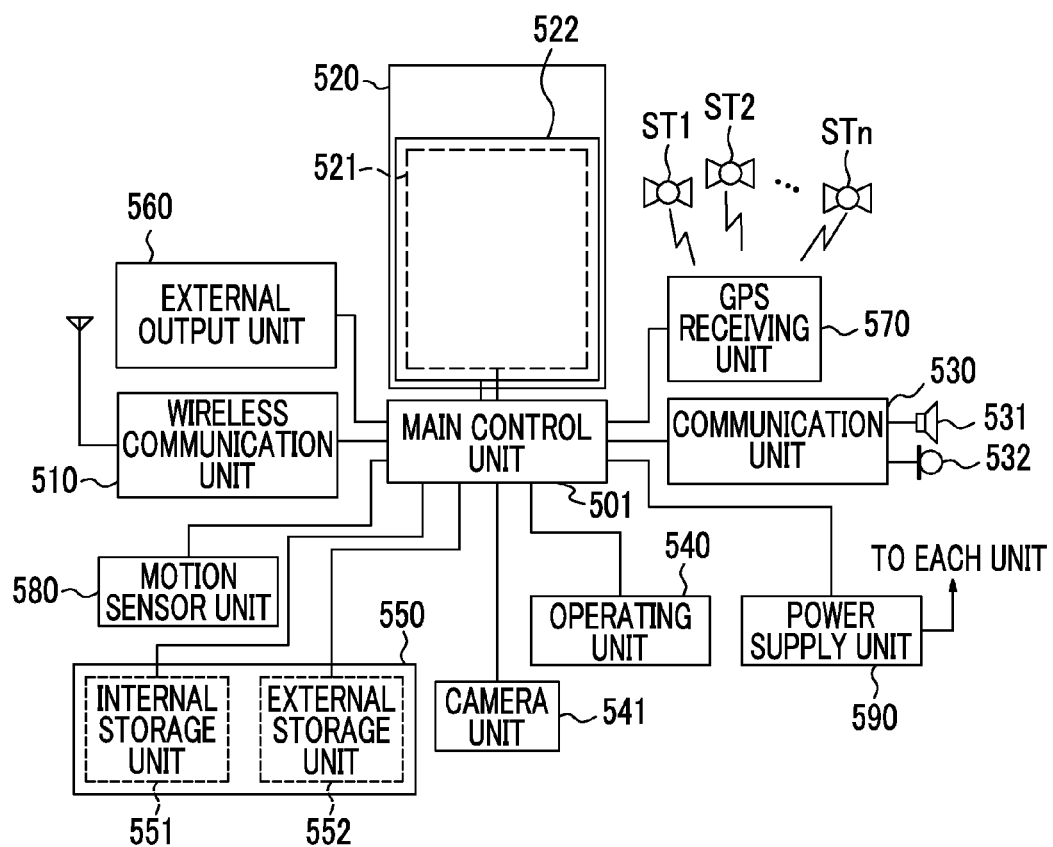
FIG. 51 is a block diagram illustrating an example of the structure of a main portion of an electrical system of the smart phone according to the fifth embodiment.

FIG. 51 is a block diagram illustrating an example of the structure of the smart phone 500 illustrated in FIG. 50. As illustrated in FIG. 51, the smart phone 500 includes, as main components, a wireless communication unit 510, the display input unit 520, a communication unit 530, the operating unit 540, the camera unit 541, a storage unit 550, and an external input/output unit 560. In addition, the smart phone 500 includes, as main components, a global positioning system (GPS) receiving unit 570, a motion sensor unit 580, a power supply unit 590, and a main control unit 501. The smart phone 500 has, as a main function, a wireless communication function which performs mobile wireless communication through a base station apparatus and a mobile communication network.

The wireless communication unit 510 performs wireless communication with the base station apparatus which is accommodated in the mobile communication network in response to an instruction from the main control unit 501. The wireless communication is used to transmit and receive various types of file data, such as voice data and image data, and electronic mail data or to receive, for example, web data and streaming data.

The display input unit 520 is a so-called touch panel and includes the display panel 521 and the operation panel 522. Therefore, the display input unit 520 displays, for example, images (still images and moving images) or text information to visually transmit information to the user and detects a user operation for the displayed information under the control of the main control unit 501. It is preferable that the display panel 521 is a 3D display panel when a generated 3D image is viewed.

The display panel 521 uses, for example, a liquid crystal display (LCD) or an organic electro-luminescence display (OELD) as a display device. The operation panel 522 is a device that is provided such that an image displayed on a display surface of the display panel 521 is visually recognized and detects one or a plurality of coordinates selected by a finger of the user or a stylus. When the device is operated by a finger of the user or a stylus, a detection signal which is generated by the operation is output to the main control unit 501. Then, the main control unit 501 detects an operation position (coordinates) on the display panel 521 on the basis of the received detection signal.

As illustrated in FIG. 50, the display panel 521 and the operation panel 522 of the smart phone 500 are integrated to form the display input unit 520 and the operation panel 522 is arranged so as to completely cover the display panel 521. When this arrangement is used, the operation panel 522 may have a function of detecting the user's operation in a region other than the display panel 521. In other words, the operation panel 522 may include a detection region (hereinafter, referred to as a display region) for an overlap portion which overlaps the display panel 521 and a detection region (hereinafter, referred to as a non-display region) for an outer edge portion which does not overlap the display panel 521.

The size of the display region may be exactly equal to the size of the display panel 521. However, the sizes are not necessarily equal to each other. The operation panel 522 may include two sensitive regions, that is, an outer edge portion and an inner portion other than the outer edge portion. The width of the outer edge portion is appropriately designed according to the size of the housing 502. Examples of a position detecting method which is used in the operation panel 522 include a matrix switching method, a resistive layer method, a surface elastic wave method, an infrared method, an electromagnetic induction method, and a capacitive sensing method. Any method may be used.

The communication unit 530 includes the speaker 531 and the microphone 532. The communication unit 530 converts the voice of the user which is input through the microphone 532 into voice data which can be processed by the main control unit 501 and outputs the converted voice data to the main control unit 501. In addition, the communication unit 530 decodes voice data received by the wireless communication unit 510 or the external input/output unit 560 and outputs the decoded voice data from the speaker 531. As illustrated in FIG. 50, for example, the speaker 531 and the microphone 532 can be mounted on the same surface as the display input unit 520.

The operating unit 540 is a hardware key which uses, for example, a key switch and receives instructions from the user. For example, as illustrated in FIG. 50, the operating unit 540 is a push button switch which is mounted on the side surface of the housing 502 of the smart phone 500, is turned on when it is pressed by, for example, a finger, and is turned off by the restoring force of a spring when the finger is taken off.

The storage unit 550 stores a control program or control data of the main control unit 501, application software, address data which is associated with, for example, the names or phone numbers of communication partners, and transmitted and received electronic mail data. In addition, the storage unit 550 stores web data which is downloaded by web browsing or downloaded content data. In addition, the storage unit 550 temporarily stores, for example, streaming data. The storage unit 550 includes an internal storage unit 551 which is provided in the smart phone and an external storage unit 552 which has a detachable external memory slot. The internal storage unit 551 and the external storage unit 552 forming the storage unit 550 may be implemented by a storage medium, such as a flash memory or a hard disk. Examples of the storage medium can include a multimedia-card-micro-type memory, a card-type memory (for example, a MicroSD (registered trademark) memory), a random access memory (RAM), and a read only memory (ROM).

The external input/output unit 560 functions as an interface with all of the external apparatuses connected to the smart phone 500 and is directly or indirectly connected to other external apparatuses by communication or a network. Examples of the communication with other external apparatuses include universal serial bus (USB) communication and IEEE1394. Examples of the network includes the Internet, a wireless LAN, a Bluetooth (registered trademark) network, a radio frequency identification (RFID) network, and an infrared data association (IrDA (registered trademark)) network. In addition, other examples of the network include an ultra wideband (UWB: registered trademark) network and a ZigBee (registered trademark) network.

Examples of the external apparatus connected to the smart phone 500 include a wired/wireless headset, a wired/wireless external charger, a wired/wireless data port, and a memory card which is connected through a card socket. Other examples of the external apparatus include a subscriber identity module (SIM) card/user identity module (UIM) card and an external audio/video apparatus which is connected through an audio/video input/output (I/O) terminal. In addition to the external audio/video apparatus, a wirelessly connected external audio/video apparatus may be given as an example of the external apparatus. For example, a smart phone which is connected wirelessly or in a wired manner, a personal computer which is connected wirelessly or in a wired manner, a PDA which is connected wirelessly or in a wired manner, and an earphone can be applied, instead of the external audio/video apparatus.

The external input/output unit can transmit data which is received from the external apparatus to each component of the smart phone 500 or can transmit data in the smart phone 500 to the external apparatus.

The GPS receiving unit 570 receives GPS signals transmitted from GPS satellites ST1 to STn and performs a position measurement process on the basis of the received GPS signals to detect a position including the latitude, longitude, and height of the smart phone 500, in response to an instruction from the main control unit 501. When the GPS receiving unit 570 can acquire positional information from the wireless communication unit 510 or the external input/output unit 560 (for example, the wireless LAN), it can detect the position using the positional information.

The motion sensor unit 580 includes, for example, a triaxial acceleration sensor and detects the physical movement of the smart phone 500 in response to an instruction from the main control unit 501. When the physical movement of the smart phone 500 is detected, the moving direction or acceleration of the smart phone 500 is detected. The detection result is output to the main control unit 501.

The power supply unit 590 supplies power which is stored in a battery (not illustrated) to each unit of the smart phone 500 in response to an instruction from the main control unit 501.

The main control unit 501 includes a microprocessor, operates on the basis of the control program or control data stored in the storage unit 550, and controls the overall operation of each unit of the smart phone 500. The main control unit 501 has an application processing function and a mobile communication control function of controlling each unit of a communication system in order to perform voice communication or data communication through the wireless communication unit 510.

The application processing function is implemented by the operation of the main control unit 501 based on the application software which is stored in the storage unit 550. Examples of the application processing function include an infrared communication function which controls the external input/output unit 560 such that data communication with an opposing apparatus is performed, an electronic mail function which transmits and receives electronic mail, and a web browsing function which browses web pages.

The main control unit 501 has, for example, an image processing function which displays an image on the display input unit 520 on the basis of image data (still image or moving image data) such as received data or downloaded streaming data. The image processing function means the function of the main control unit 501 decoding the image data, performing image processing on the decoding result, and displaying the image on the display input unit 520.

The main control unit 501 performs display control for the display panel 521 and operation detection control which detects the operation of the user through the operating unit 540 and the operation panel 522.

The main control unit 501 performs the display control to display a software key, such as an icon for starting application software or a scroll bar, or to display a window for creating electronic mail. The scroll bar means a software key for receiving an instruction to move a displayed portion of an image that is too large to fit into the display region of the display panel 521.

The main control unit 501 performs the operation detection control to detect the operation of the user input through the operating unit 540 or to receive an operation for the icon or the input of a character string to an input field of the window through the operation panel 522. In addition, the main control unit 501 performs the operation detection control to receive a request to scroll the displayed image through the scroll bar.

In addition, the main control unit 501 performs the operation detection control to determine whether the position of an operation for the operation panel 522 is an overlap portion (display region) which overlaps the display panel 521 or an outer edge portion (non-display region) which does not overlap the display panel 521 other than the overlap portion. The main control unit 501 has a touch panel control function that receives the determination result and controls a sensitive region of the operation panel 522 or the display position of the software key.

The main control unit 501 can detect a gesture operation for the operation panel 522 and can perform a predetermined function according to the detected gesture operation. The gesture operation does not mean a simple touch operation of the related art, but means an operation which draws a trace using a finger, an operation which designates a plurality of positions at the same time, or a combination thereof which draws a trace for at least one of the plurality of positions.

The camera unit 541 is a digital camera which captures an image using an imaging element, such as a CMOS or a CCD, and has the same functions as the imaging device 100 illustrated in FIG. 1.

The camera unit 541 can switch the operation mode between the manual focus mode and the automatic focus mode. When the manual focus mode is selected, the user can operate, for example, a focus icon button displayed on the operating unit 540 or the display input unit 520 to focus the focus lens 302 of the camera unit 541. In the manual focus mode, a live view image having a split image combined therewith is displayed on the display panel 521 such that the user can check a focus state in the manual focus mode. In addition, the hybrid finder 220 illustrated in FIG. 9 may be provided in the smart phone 500.

The camera unit 541 converts captured image data into image data which is compressed in, for example, a joint photographic coding experts group (JPEG) format under the control of the main control unit 501. Then, the camera unit 541 records the converted image data in the storage unit 550 or outputs the converted image data through the external input/output unit 560 or the wireless communication unit 510. As illustrated in FIG. 50, the camera unit 541 is mounted on the same surface as the display input unit 520 in the smart phone 500. However, the mounting position of the camera unit 541 is not limited thereto. For example, the camera unit 541 may be mounted on the rear surface of the display input unit 520 or a plurality of camera units 541 may be mounted. When a plurality of camera units 541 are mounted, the camera units 541 which are used to capture images may be switched such that a single camera unit captures images or the plurality of camera units 541 may be simultaneously used to capture images.

The camera unit 541 can be used for various functions of the smart phone 500. For example, the image captured by the camera unit 541 can be displayed on the display panel 521 or the image captured by the camera unit 541 can be used as one of the operation inputs of the operation panel 522. When the GPS receiving unit 570 detects the position, the position may be detected with reference to the image from the camera unit 541. In addition, the optical axis direction of the camera unit 541 in the smart phone 500 may be determined or the current usage environment may be determined, with reference to the image from the camera unit 541, using the triaxial acceleration sensor or without using the triaxial acceleration sensor. Of course, the image from the camera unit 541 may be used in the application software.

For example, various kinds of information may be added to the image data of a still image or a moving image and the image data may be stored in the storage unit 550 or may be output through the external input/output unit 560 or the wireless communication unit 510. The "various kinds of information" include the positional information which is acquired by the GPS receiving unit 570 and the voice information which is acquired by the microphone 532 (for example, the main control unit may convert the voice information into text information using voice-text conversion) in image data of a still image or a moving image. In addition, the "various kinds of information" include, for example, the posture information which is acquired by the motion sensor unit 580.

In each of the above-described embodiments, the imaging element 20 includes the first to third pixel groups. However, the invention is not limited thereto. For example, an imaging element may include only the first pixel group and the second pixel group. A digital camera including this type of imaging element can generate a three-dimensional image (3D image) on the basis of the first image output from the first pixel group and the second image output from the second pixel group and can also generate a two-dimensional image (2D image). In this case, the two-dimensional image can be generated by, for example, performing an interpolation process between the pixels of the same color in the first image and the second image. In addition, the first image or the second image may be used as the two-dimensional image, without performing the interpolation process.

In each of the above-described embodiments, when the first to third images are input to the image processing unit 28, both the normal image and the split image are displayed on the moving screen of the display device at the same time. However, the invention is not limited thereto. For example, the display control unit 36 may perform control such that the continuous display of the normal images as a moving image on the display device is prevented and the split images are continuously displayed as a moving image on the display device. Here, the term "preventing the display of the normal image" means, for example, that no normal image is displayed on the display device. Specifically, the term "preventing the display of the normal image" means that the normal image is generated, but is not output and displayed on the display device or that the normal image is not generated and displayed on the display device. The entire screen of the display device (for example, the display region of the display unit 213) may be used to display the split image or the entire display region of the split image may be used to display the split image. Here, an example of the "split image" can be a split image based on the image output from the phase difference pixel group (for example, the first image output from the first pixel group and the second image output from the second pixel group) when a specific imaging element is used. An example of the "case in which the specific imaging element is used" is a case in which an imaging element including only the phase difference pixel group (for example, the first pixel group and the second pixel group) is used. Another example of the "case in which the specific imaging element is used" can be a case in which an imaging element in which the ratio of the phase difference pixels (for example, the first pixel group and the second pixel group) to the normal pixels is a predetermined value is used.

Various conditions are considered as the conditions for preventing the display of the normal image and displaying the split image. For example, when an instruction to display the normal image is cancelled with the display of the split image being instructed, the display control unit 36 may control such that the normal image is not displayed on the display device and the split image is displayed on the display device. In addition, for example, when the user looks through the hybrid finder 220, the display control unit 36 may perform control such that the normal image is not displayed on the display device and the split image is displayed on the display device. For example, when the release switch 211 is in the halfway pressed state, the display control unit 36 may perform control such that the normal image is not displayed on the display device and the split image is displayed on the display device. For example, when an operation of pressing the release switch 211 is not performed, the display control unit 36 may perform control such that the normal image is not displayed on the display device and the split image is displayed on the display device. For example, when a face detection function which detects the face overshoot of the object is performed, the display control unit 36 may perform control such that the normal image is not displayed on the display device and the split image is displayed on the display device. Here, the modification example in which the display control unit 36 prevents the display of the normal image has been described. However, the invention is not limited thereto. For example, the display control unit 36 may perform control such that the entire split image is overwritten on the normal image.

In each of the above-described embodiments, in the imaging device 100 or the smart phone 500 provided with the imaging lens 16 including the focus lens 302, the CPU 12 or the main control unit 501 included in each device performs the imaging control process. However, the invention is not limited thereto. For example, an external device, such as a personal computer or a smart phone, may perform remote control for an imaging device provided with an imaging lens including a focus lens to perform the above-mentioned imaging control process.

The imaging control process according to each of the above-described embodiments may be applied to a case in which the object image is not in focus, that is, is out of focus, in addition to the case in which the object image is in focus.

EXPLANATION OF REFERENCES

12: CPU
20: imaging element
26: memory
28: image processing unit
30: normal processing unit
32: split image processing unit
36: display control unit
38: informing control unit
100: imaging device
213: display unit
217: vibrating member
241: LCD

What is claimed is:
1. An image processing device comprising:
a generation unit that generates, on the basis of a first image based on an image signal output from a first pixel group and a second image based on an image signal output from a second pixel group in an imaging element including the first and second pixel groups on which an object image that passes through first and second regions of an imaging lens including a focus lens and is pupil-divided is formed, a display image for checking a focus and includes a first divided image that is selected from a plurality of divided images obtained by dividing the first image in a predetermined division direction and a second divided image that is selected from divided images other than a divided image indicating a divided region corresponding to the first divided image among a plurality of divided images obtained by dividing the second image in the division direction;
a display unit that includes a display region and a touch panel which is provided on a surface of the display region;
a display control unit that performs control such that the display image generated by the generation unit is displayed on the display unit;
a first detection unit that detects whether an operation of selecting the first divided image or the second divided image on the display image is performed through the touch panel, with the display image displayed on the display unit;

a second detection unit that detects whether a moving operation in a direction intersecting the division direction on the display image is performed through the touch panel; and a focusing control unit that controls a moving unit which moves the focus lens in an optical axis direction such that the focus lens is moved in response to the moving operation when the selection operation and the moving operation are sequentially detected by the first detection unit and the second detection unit, wherein the focusing control unit performs a first determination process which determines whether the selection operation detected by the first detection unit is an operation of selecting the first divided image or an operation of selecting the second divided image and a second determination process which determines whether the moving operation detected by the second detection unit is a moving operation in a first direction or a moving operation in a second direction along the intersection direction, determines a moving direction of the focus lens on the basis of the result of the first determination process and the result of the second determination process, and controls the moving unit such that the focus lens is moved.

2. The image processing device according to claim 1, wherein the generation unit further generates a second display image for checking an imaging range on the basis of the image signal output from the imaging element, and the display control unit performs control such that the second display image generated by the generation unit is further displayed on the display unit.

3. The image processing device according to claim 2, wherein the imaging element further includes a third pixel group on which the object image that has passed through the imaging lens is formed without being pupil-divided and which outputs a third image, and the generation unit generates the second display image on the basis of the third image output from the third pixel group.

4. The image processing device according to claim 1, wherein the first image is a right eye image, the second image is a left eye image, and the focusing control unit controls the moving unit such that the focus lens is moved in a direction in which an in-focus position becomes closer to the imaging element than a current in-focus position when the result of the first determination process is the operation of selecting the right eye image and the result of the second determination process is the moving operation in a right direction as viewed from an operator who observes the display unit and such that the focus lens is moved in a direction in which the in-focus position becomes further away from the imaging element than the current in-focus position when the result of the first determination process is the operation of selecting the right eye image and the result of the second determination process is the moving operation in a left direction as viewed from the operator who observes the display unit.

5. The image processing device according to claim 1, wherein the first image is a right eye image, the second image is a left eye image, and the focusing control unit controls the moving unit such that the focus lens is moved in a direction in which an in-focus position becomes further away from the imaging element than a current in-focus position when the result of the first determination process is the operation of selecting the left eye image and the result of the second determination process is the moving operation in a right direction as viewed from an operator who observes the display unit and such that the focus lens is moved in a direction in which the in-focus position becomes closer to the imaging element than the current in-focus position when the result of the first determination process is the operation of selecting the left eye image and the result of the second determination process is the moving operation in a left direction as viewed from the operator who observes the display unit.

6. The image processing device according to claim 1, further comprising:

a third detection unit that detects whether a moving operation which passes through a boundary line between the first divided image and the second divided image is performed through the touch panel, wherein the first divided image and the second divided image are arranged in the display image so as to be adjacent to each other in the division direction, and the focusing control unit controls the moving unit such that the focus lens is moved in response to the moving operation when the selection operation and the moving operations are sequentially detected by the first detection unit and the second and third detection units.

7. The image processing device according to claim 6, wherein the focusing control unit performs a third determination process which determines the position of at least one of the first divided image and the second divided image relative to the boundary line, a fourth determination process which determines whether the moving operation detected by the second detection unit is a moving operation in a first direction or a moving operation in a second direction along the intersection direction, and a fifth determination process which determines whether the moving operation detected by the third detection unit is a moving operation in a third direction or a moving operation in a fourth direction along the division direction, and the focusing control unit determines a moving direction of the focus lens on the basis of the result of the third determination process, the result of the fourth determination process, and the result of the fifth determination process, and controls the moving unit such that the focus lens is moved.

8. The image processing device according to claim 7, wherein the first image is a right eye image, the second image is a left eye image, and when the result of the third determination process indicates that the position of the second divided image is above the boundary line as viewed from an operator who observes the display unit, the focusing control unit controls the moving unit such that the focus lens is moved in a direction in which an in-focus position becomes further away from the imaging element than a current in-focus position when any of the following occurs:

the moving operations are sequentially detected by the second detection unit and the third detection unit, the result of the fourth determination process is a moving operation in a right direction as viewed from the operator who observes the display unit, and the result of the fifth determination process is a moving operation in a downward direction as viewed from the operator who observes the display unit;

the moving operations are sequentially detected by the second detection unit and the third detection unit, the result of the fourth determination process is a moving operation in a left direction as viewed from the operator who observes the display unit, and the result of the fifth determination process is a moving operation in an upward direction as viewed from the operator who observes the display unit;

the moving operations are sequentially detected by the third detection unit and the second detection unit, the result of the fourth determination process is the moving operation in the left direction, and the result of the fifth determination process is the moving operation in the downward direction; and the moving operations are sequentially detected by the third detection unit and the second detection unit, the result of the fourth determination process is the moving operation in the right direction, and the result of the fifth determination process is the moving operation in the upward direction.

9. The image processing device according to claim 7, wherein the first image is a right eye image, the second image is a left eye image, and when the result of the third determination process indicates that the position of the second divided image is above the boundary line as viewed from an operator who observes the display unit, the focusing control unit controls the moving unit such that the focus lens is moved in a direction in which an in-focus position becomes closer to the imaging element than a current in-focus position during any of the following:

the moving operations are sequentially detected by the second detection unit and the third detection unit, the result of the fourth determination process is a moving operation in a left direction as viewed from the operator who observes the display unit, and the result of the fifth determination process is a moving operation in a downward direction as viewed from the operator who observes the display unit;

the moving operations are sequentially detected by the second detection unit and the third detection unit, the result of the fourth determination process is a moving operation in a right direction as viewed from the operator who observes the display unit, and the result of the fifth determination process is a moving operation in an upward direction as viewed from the operator who observes the display unit;

the moving operations are sequentially detected by the third detection unit and the second detection unit, the result of the fourth determination process is the moving operation in the left direction, and the result of the fifth determination process is the moving operation in the upward direction; and the moving operations are sequentially detected by the third detection unit and the second detection unit, the result of the fourth determination process is the moving operation in the right direction, and the result of the fifth determination process is the moving operation in the downward direction.

10. The image processing device according to claim 7, wherein the first image is a right eye image, the second image is a left eye image, and when the result of the third determination process indicates that the position of the first divided image is above the boundary line as viewed from an operator who observes the display unit, the focusing control unit controls the moving unit such that the focus lens is moved in a direction in which an in-focus position becomes closer to the imaging element than a current in-focus position during any of the following:

the moving operations are sequentially detected by the second detection unit and the third detection unit, the result of the fourth determination process is a moving operation in a right direction as viewed from the operator who observes the display unit, and the result of the fifth determination process is a moving operation in a downward direction as viewed from the operator who observes the display unit;

the moving operations are sequentially detected by the second detection unit and the third detection unit, the result of the fourth determination process is a moving operation in a left direction as viewed from the operator who observes the display unit, and the result of the fifth determination process is a moving operation in an upward direction as viewed from the operator who observes the display unit;

the moving operations are sequentially detected by the third detection unit and the second detection unit, the result of the fourth determination process is the moving operation in the left direction, and the result of the fifth determination process is the moving operation in the downward direction; and the moving operations are sequentially detected by the third detection unit and the second detection unit, the result of the fourth determination process is the moving operation in the right direction, and the result of the fifth determination process is the moving operation in the upward direction.

11. The image processing device according to claim 7, wherein the first image is a right eye image, the second image is a left eye image, and when the result of the third determination process indicates that the position of the first divided image is above the boundary line as viewed from an operator who observes the display unit, the focusing control unit controls the moving unit such that the focus lens is moved in a direction in which an in-focus position becomes further away from the imaging element than a current in-focus position during any of the following:

the moving operations are sequentially detected by the second detection unit and the third detection unit, the result of the fourth determination process is a moving operation in a left direction as viewed from the operator who observes the display unit, and the result of the fifth determination process is a moving operation in a downward direction as viewed from the operator who observes the display unit;

the moving operations are sequentially detected by the second detection unit and the third detection unit, the result of the fourth determination process is a moving operation in a right direction as viewed from the operator who observes the display unit, and the result of the fifth determination process is a moving operation in an upward direction as viewed from the operator who observes the display unit;

the moving operations are sequentially detected by the third detection unit and the second detection unit, the result of the fourth determination process is the moving operation in the left direction, and the result of the fifth determination process is the moving operation in the upward direction; and the moving operations are sequentially detected by the third detection unit and the second detection unit, the result of the fourth determination process is the moving operation in the right direction, and the result of the fifth determination process is the moving operation in the downward direction.

12. The image processing device according to claim 1, wherein, when the selection operation detected by the first detection unit is an operation of selecting both the first divided image and the second divided image and the moving operation detected by the second detection unit is an operation of moving the first divided image and the second divided image in different directions along the intersection direction, the focusing control unit determines the moving direction of the focus lens on the basis of the directions of the operation of moving the first divided image and the operation of moving the second divided image and controls the moving unit such that the focus lens is moved.

13. The image processing device according to claim 12, wherein the first image is a right eye image,
the second image is a left eye image, and
the focusing control unit controls the moving unit such that the focus lens is moved in a direction in which an in-focus position becomes closer to the imaging element than a current in-focus position when the selection operation detected by the first detection unit is the operation of selecting both the first divided image and the second divided image, the right eye image moving operation detected by the second detection unit is a moving operation in a right direction along the intersection direction as viewed from an operator who observes the display unit, and the left eye image moving operation detected by the second detection unit is a moving operation in a left direction along the intersection direction as viewed from the operator who observes the display unit, and such that the focus lens is moved in a direction in which the in-focus position becomes further away from the imaging element than the current in-focus position when the selection operation detected by the first detection unit is the operation of selecting both the first divided image and the second divided image, the right eye image moving operation detected by the second detection unit is the moving operation in the left direction, and the left eye image moving operation detected by the second detection unit is the moving operation in the right direction.

14. The image processing device according to claim 1, wherein, while a touch operation on the touch panel in the moving operation detected by the second detection unit is maintained, the focusing control unit controls the moving unit such that the focus lens is moved in the optical axis direction, with the movement of a touch position in the touch operation.

15. The image processing device according to claim 1, wherein the focusing control unit controls the moving unit such that the focus lens is continuously moved in a moving direction corresponding to the moving operation in the optical axis direction.

16. The image processing device according to claim 1, wherein the focusing control unit controls the moving unit such that the focus lens is moved at a moving speed corresponding to an operation speed in the moving operation.

17. The image processing device according to claim 1, wherein the focusing control unit controls the moving unit such that the focus lens is moved by the amount of movement corresponding to the amount of operational movement in the moving operation.

18. The image processing device according to claim 16, wherein, when the operation speed is less than a first predetermined threshold value, the focusing control unit does not control the moving unit such that the focus lens is moved.

19. The image processing device according to claim 15, further comprising:
a fourth detection unit that detects whether a touch operation is performed at any position in the display region through the touch panel after the selection operation for the touch panel is cancelled once while the focus lens is being moved by the moving unit,
wherein, when the touch operation is detected by the fourth detection unit, the focusing control unit controls the moving unit such that the movement of the focus lens is stopped.

20. The image processing device according to claim 15, wherein, after the movement of the focus lens starts, the focusing control unit controls the moving unit such that a moving speed of the focus lens is reduced according to the movement and the focus lens is stopped.

21. The image processing device according to claim 1, wherein the focusing control unit controls the moving unit such that the focus lens is moved in the optical axis direction according to a touch position in a touch operation while the touch operation on the touch panel in the moving operation detected by the second detection unit is maintained when a movement time in the moving operation detected by the second detection unit is equal to or greater than a second predetermined threshold value, and such that the focus lens is continuously moved in a moving direction corresponding to the touch position in the optical axis direction when the movement time is less than the second threshold value.

22. The image processing device according to claim 1, further comprising:
a fifth detection unit that detects a focus state of the display image while the focus lens is being moved by the focusing control unit,
wherein the focusing control unit controls the moving unit such that the movement of the focus lens is stopped when the fifth detection unit detects that the display image is in focus.

23. The image processing device according to claim 1, further comprising:
a fifth detection unit that detects a focus state of the display image while the focus lens is being moved by the focusing control unit; and
an informing unit that, when the fifth detection unit detects that the display image is in focus, informs that the display image has been in focus.

24. The image processing device according to claim 23, wherein the informing unit vibrates a touched portion of the touch panel to inform that the display image has been in focus.

25. The image processing device according to claim 22, wherein the fifth detection unit detects the focus state of the display image on the basis of the contrast of the display image.

26. The image processing device according to claim 22, wherein the fifth detection unit detects the focus state of the display image on the basis of a phase difference between the first divided image and the second divided image in the display image.

27. The image processing device according to claim 1, further comprising:

a third detection unit that detects whether a moving operation which passes through a boundary line between the first divided image and the second divided image is performed through the touch panel, wherein the first divided image and the second divided image are arranged in the display image so as to be adjacent to each other in the division direction, and when the third detection unit detect the moving operations which are not sequential with respect to the detection of the moving operations by the second detection unit, the display control unit performs control such that the display image is enlarged or reduced according to the direction of the moving operation detected by the third detection unit.

28. The image processing device according to claim 1, further comprising:

a third detection unit that detects whether a moving operation which passes through a boundary line between the first divided image and the second divided image is performed through the touch panel, wherein the first divided image and the second divided image are arranged in the display image so as to be adjacent to each other in the division direction, when the third detection unit detect the moving operations which are not sequentially detected by the second detection unit, the display control unit performs control such that the display image is enlarged when the third detection unit detects two touch positions in a touch operation on the touch panel and detects a moving operation in a direction in which the two touch positions separate from each other, and the display control unit performs control such that the display image is reduced when the third detection unit detects two touch positions in a touch operation on the touch panel and detects a moving operation in a direction in which the two touch positions become closer to each other.

29. The image processing device according to claim 27, wherein the display control unit stops the control for enlarging the display image when the size of the display image is equal to the size of the entire display region due to the control for enlarging the display image.

30. The image processing device according to claim 27, wherein the display control unit performs control such that a portion of the display image is displayed in the display region when the size of the display image is larger than the size of the entire display region due to the control for enlarging the display image.

31. The image processing device according to claim 27, wherein, when the display image is reduced after the enlargement of the display image, when the size of the display image is equal to the size before the enlargement, the display control unit stops the control for reducing the display image.

32. An imaging device comprising:
the image processing device according to claim 1;
the imaging lens;
an imaging element including the first and second pixel groups; and
a storage unit that stores an image which is generated on the basis of an image signal output from the imaging element.

33. A non-transitory computer readable medium storing a program that causes an image processing device to function as:

the generation unit that generates, on the basis of the first image based on the image signal output from the first pixel group and the second image based on the image signal output from the second pixel group in the imaging element including the first and second pixel groups on which the object image that passes through first and second regions of the imaging lens including the focus lens and is pupil-divided is formed, the display image which is used to check the focus and includes the first divided image that is selected from the plurality of divided images obtained by dividing the first image in the predetermined division direction and the second divided image that is selected from divided images other than the divided image indicating the divided region corresponding to the first divided image among the plurality of divided images obtained by dividing the second image in the division direction;

the display control unit that performs control such that the display image generated by the generation unit is displayed on the display unit including the display region and the touch panel which is provided on the surface of the display region;

the first detection unit that detects whether the operation of selecting the first divided image or the second divided image on the display image is performed through the touch panel, with the display image displayed on the display unit;

the second detection unit that detects whether the moving operation in the direction intersecting the division direction on the display image is performed through the touch panel; and the focusing control unit that controls the moving unit which moves the focus lens in the optical axis direction such that the focus lens is moved in response to the moving operation when the selection operation and the moving operation are sequentially detected by the first detection unit and the second detection unit, wherein the focusing control unit performs the first determination process which determines whether the selection operation detected by the first detection unit is the operation of selecting the first divided image or the operation of selecting the second divided image and the second determination process which determines whether the moving operation detected by the second detection unit is the moving operation in the first direction or the moving operation in the second direction along the intersection direction, determines the moving direction of the focus lens on the basis of the result of the first determination process and the result of the second determination process, and controls the moving unit such that the focus lens is moved.

34. An image processing method using an image processing device comprising:

a generation step of generating, on the basis of the first image based on the image signal output from the first pixel group and the second image based on the image signal output from the second pixel group in the imaging element including the first and second pixel groups on which the object image that passes through first and second regions of the imaging lens including the focus lens and is pupil-divided is formed, the display image which is used to check the focus and includes the first divided image that is selected from the plurality of divided images obtained by dividing the first image in the predetermined division direction and the second divided image that is selected from divided images other than the divided image indicating the divided region corresponding to the first divided image among the plurality of divided images obtained by dividing the second image in the division direction;

a display control step of performing control such that the display image generated in the generation step is displayed on the display unit including the display region and the touch panel which is provided on the surface of the display region;

a first detection step of detecting whether the operation of selecting the first divided image or the second divided image on the display image is performed through the touch panel, with the display image displayed on the display unit;

a second detection step of detecting whether the moving operation in the direction intersecting the division direction on the display image is performed through the touch panel; and a focusing control step of controlling the moving unit which moves the focus lens in the optical axis direction such that the focus lens is moved in response to the moving operation when the selection operation and the moving operation are sequentially detected in the first detection step and the second detection step, wherein the focusing control step performs the first determination process which determines whether the selection operation detected by the first detection step is the operation of selecting the first divided image or the operation of selecting the second divided image and the second determination process which determines whether the moving operation detected by the second detection step is the moving operation in the first direction or the moving operation in the second direction along the intersection direction, determines the moving direction of the focus lens on the basis of the result of the first determination process and the result of the second determination process, and controls the moving unit such that the focus lens is moved.

* * * * *